(12) United States Patent
Lee et al.

(10) Patent No.: US 8,349,486 B2
(45) Date of Patent: Jan. 8, 2013

(54) LITHIUM SECONDARY BATTERY UNIT SET WITH BUS BAR, AND LITHIUM SECONDARY BATTERY SET WITH BUS BAR

(75) Inventors: Seungjun Lee, Daejeon (KR); Jungsik Yun, Daejeon (KR); Hyosung Lee, Daejeon (KR); Jeonkeun Oh, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 13/061,660

(22) PCT Filed: Aug. 31, 2009

(86) PCT No.: PCT/KR2009/004861
§ 371 (c)(1),
(2), (4) Date: May 5, 2011

(87) PCT Pub. No.: WO2010/027168
PCT Pub. Date: Mar. 11, 2010

(65) Prior Publication Data
US 2012/0003520 A1    Jan. 5, 2012

(30) Foreign Application Priority Data
Sep. 3, 2008    (KR) .................. 10-2008-0086759

(51) Int. Cl.
*H01M 2/26* (2006.01)
*H01M 10/48* (2006.01)
*H01M 10/50* (2006.01)

(52) U.S. Cl. ............. 429/159; 429/7; 429/120; 429/158
(58) Field of Classification Search .................. None
See application file for complete search history.

(56) References Cited

U.S. PATENT DOCUMENTS

| | | | |
|---|---|---|---|
| 7,074,517 B2 * | 7/2006 | Higashino | 429/66 |
| 7,427,453 B2 | 9/2008 | Kim | |
| 7,611,798 B2 | 11/2009 | Yoon et al. | |
| 7,914,922 B2 * | 3/2011 | Sanada et al. | 429/152 |
| 2006/0214631 A1 | 9/2006 | Yoon et al. | |
| 2010/0196753 A1 * | 8/2010 | Heo et al. | 429/158 |

FOREIGN PATENT DOCUMENTS

| | | |
|---|---|---|
| KR | 1020050000594 A | 1/2005 |
| KR | 1020060090464 A | 8/2006 |
| KR | 1020060090469 A | 8/2006 |
| KR | 1020070043501 A | 4/2007 |

* cited by examiner

*Primary Examiner* — John S Maples
(74) *Attorney, Agent, or Firm* — The Webb Law Firm

(57) ABSTRACT

The present invention relates to a lithium secondary battery unit set where a plurality of lithium secondary batteries are stacked, and a lithium secondary battery set including a plurality of lithium secondary battery unit sets. The present invention relates to a lithium secondary battery unit set with a bus bar and a lithium secondary battery set with a bus bar. The lithium secondary battery unit set with a bus bar: accommodates and protects a plurality of lithium secondary batteries comprising a pouch and an electrode tab; facilitates the changes of voltage and capacity as the stacked structure of the lithium secondary batteries becomes free; prevents the flow of overcurrent during charging and discharging; and enables uniform temperature distribution of the stacked batteries.

20 Claims, 27 Drawing Sheets

(Prior Art)

(a)

(b)

(a)

(b)

(a)

(b)

(a)

(b)

(a)

(b)

_US 8,349,486 B2_

LITHIUM SECONDARY BATTERY UNIT SET WITH BUS BAR, AND LITHIUM SECONDARY BATTERY SET WITH BUS BAR

TECHNICAL FIELD

The present invention relates to a lithium secondary battery unit set formed by stacking a plurality of lithium secondary batteries and a lithium secondary battery set including a plurality of lithium secondary battery unit sets, and more particularly, to a lithium secondary battery unit set with a bus bar and a lithium secondary battery set with a bus bar capable of receiving and protecting a plurality of lithium secondary batteries configured to include pouches and electrode tabs, facilitating a change in voltage and capacitance by freely forming a stacking structure of a lithium secondary battery, breaking the flow of overcurrent at the time of charging and discharging, and making temperature distribution of stacked batteries uniform.

BACKGROUND ART

Generally, unlike a primary battery, research into a rechargeable secondary battery has actively progressed with the development of high-tech fields such as a digital camera, a cellular phone, a notebook computer, a hybrid car, or the like. An example of a secondary battery may include a nickel-cadmium battery, a nickel-metal hydride battery, a nickel-hydrogen battery, and a lithium secondary battery. Among others, the lithium secondary battery operated at a voltage of 3.6V or more is used as a power supply for portable electronic devices or is used for a high-output hybrid car by connecting several lithium secondary batteries in series. The lithium secondary battery has an operating voltage three times or more than that of the nickel-cadmium battery or the nickel-metal hydride battery and has excellent energy density per unit weight, such that the use thereof has been rapidly increased.

The lithium secondary battery may be manufactured in various types. An example of a representative type may include a cylinder type and a prismatic type that are mainly used for the lithium ion battery. A lithium polymer battery, which has been recently spotlighted, is manufactured in a pouched type having flexibility, such that the shape of the lithium polymer battery is relatively free. In addition, the lithium polymer battery is light while having excellent stability, such that it is advantageous in slimness and lightness of a portable electronic device.

FIG. 1 shows a structure of a pouched type lithium secondary battery according to the related art. A pouched type lithium secondary battery 50 according to the related art is configured to include a battery unit 51 and a case 10 providing a space 11 in which the battery unit 51 is received.

The battery unit 51 has a shape where an anode plate, a separator, and a cathode plate are sequentially disposed to be wound in one direction or a plurality of sheets of anode plates, separators, and a plurality of sheets of cathode plates are stacked. Each electrode plate of the battery unit 51 is electrically connected to anode and cathode tabs 52a and 52b. Ends of the anode and cathode tabs 52a and 52b are protruded to the outside through a sealing surface 12 of the case 10. Ends of the protruded anode and cathode tabs 52a and 52b are connected to terminals of a protective circuit board (not shown).

The outer surfaces of the anode and cathode tabs 52a and 52b are each wound with a sealing tape 13 in order to prevent an electrical short between the case 10 and the electrode tabs 52a and 52b at a portion where they contact the sealing surface 12. Unlike a cylinder type or a prismatic type can structure of which the thick film is molded into a metal material, the case 10 is a pouched type case having an intermediate layer formed of a metal foil and inner and outer skin layers formed of an insulation film that are attached to both surfaces of the metal foil. The pouched type case has excellent formability and can be freely bent. As described above, the case 10 is provided with a space 11 in which the battery unit 51 can be received and the sealing surface 12 provided on a surface that is hot-melted along the edge of the space 11. FIG. 2 is a diagram showing a cross section taken along A-A of FIG. 1. The case 10 is a composite film that is configured to include an intermediate layer formed of a metal foil, i.e., an aluminum foil and an inner skin layer and an outer skin layer attached to an inner surface and an outer surface of the intermediate layer and formed of an insulation film to protect the intermediate layer.

The space 11 formed in the case 10 receives the battery unit 51 disposed in an order of an anode plate 51a, a separator 51c, and a cathode plate 51b. An anode tab 52a and a cathode tab 52b are drawn out from the anode and cathode plates 51a and 51b. The ends of the drawn electrode tabs 52a and 52b may be exposed to the outside through the sealing surface 12 of the case 10 and the sealing tape 13 is wound on the outer surfaces of the electrode tabs 52a and 52b at the sealing surface 12.

In the pouched type lithium secondary battery 50 having the above structure, the battery unit 51 is completed by electrically connecting the anode and cathode tabs 52a and 52b to the anode plates 51a and the cathode plate 51b and then, winding the anode plate 51a, the separator 51c, and the cathode plate 51b in one direction in the state where they are sequentially disposed. The completed battery unit 51 is mounted in the case 10 formed with the space 11 through a drawing process and ends of each electrode tabs 52a and 52b are exposed to the outside of the case 10 when being mounted. In this state, the pouched type lithium secondary battery 50 is completed by hot-melting the sealing surface 12 of the case 10 by applying predetermined heat and pressure thereto. Whether the completed pouched type lithium secondary battery 50 is abnormal is determined by a series of formation process such as charging, aging, discharging, etc., in order to stabilize the battery structure.

In this connection, Korean Laid-Open Patent Publication No. 2005-000594 discloses a method of casing a pouched type lithium secondary battery. The pouched type lithium secondary battery of the above document has a structure capable of easily detecting a difference in open loop voltage due to a short-circuit occurring when the cathode tab contacts the metal layer of the case, since the inner skin layer of the case is broken due to the application of the same positive potential to the metal layer of the case and the anode tab.

Meanwhile, when the high-output lithium battery such as the hybrid car, etc., is required, the pouches shown in FIGS. 1 and 2 is stacked several tens to several hundreds and are connected in series in order to obtain high voltage.

Since the pouched type lithium polymer battery is formed of a soft aluminum pouch that may be easily warped or bent, it should be protected with a solid case device to be used over a long period of time. However, the related art used a scheme of connecting the anode tabs and the cathode tabs of each pouch by a printed circuit board (PCB) formed with circuit patterns for connecting the pouches in series and receiving them in the case.

However, according to the method of configuring the high-output lithium battery by stacking the lithium polymer pouch according to the related art, the lithium polymer pouch having a soft structure may not be completely protected and the scheme of stacking the pouches several times and connecting them by the PCB is also incomplete, such that the high-output lithium battery is not strong to the change in environment such as external impacts, etc. A need exists for a method capable of more firmly and stably stacking the pouch units configuring the lithium battery used as the high-output power supply and reliably connecting the pouch units in series and parallel.

DISCLOSURE

The present invention proposes to solve the above problems. An object of the present invention is to provide a lithium secondary battery unit set more firmly and stably receiving a plurality of secondary batteries.

Another object of the present invention is to provide a high-output lithium secondary battery unit set capable of directly connecting a plurality of lithium secondary batteries without using a separate connection device and freely changing capacitance and voltage of interconnected lithium secondary batteries. In addition, another object of the present invention is to provide a lithium secondary battery unit set capable of preventing overheating at the time of charging and discharging a plurality of interconnected lithium secondary batteries.

Further, another object of the present invention is to provide a lithium secondary battery unit set capable of preventing overcurrent from flowing at the time of charging and discharging a plurality of interconnected lithium secondary batteries.

Further, another object of the present invention is to provide a lithium secondary battery unit set capable of solving problems due to the degradation in temperature of lithium secondary batteries stacked to be adjacent to a specific group receiving part by not receiving the lithium secondary batteries in the specific group receiving part.

Moreover, another object of the present invention is to provide a lithium secondary battery set including a plurality of lithium secondary battery unit sets.

Technical Solution

A lithium secondary battery unit set with a bus bar according to Exemplary Embodiment of the present invention includes: a left end frame and a right end frame; a plurality of main frames having a first exposed tab support part formed at the top end thereof, the lower left of the first tab support part being formed with left receiving parts that are opened left and the lower right of the first tab support part being formed with right receiving parts that are opened right, and adjacently formed between the left end frame and the right end frame; a center frame having a second exposed tab support part formed at the top end thereof and having a left main frame fastened to the left thereof and a right main frame fastened to the right thereof to be mounted between the right receiving part of the left main frame and the left receiving part of the right main frame in two adjacent main frames among the plurality of main frames; a first type lithium secondary battery having a left electrode tab bent to the left of circumferential surface of a pouch and a right electrode tab bent to the right thereof, each of which is formed to be protruded and received in each left receiving part of a left group receiving part disposed to be adjacent to the left of a specific group receiving part including two receiving parts adjacent to each other among the plurality of left receiving parts and the plurality of right receiving parts and each left receiving part of a right group receiving part disposed to be adjacent to the right of the specific group receiving part; a second type lithium secondary battery having a left electrode tab having opposite polarity and formed to be protruded in a direction opposite to a right electrode tab of the first type lithium secondary battery and a right electrode tab having opposite polarity and formed to be protruded in a direction opposite to a left electrode tab of the first type lithium secondary battery and received in each right receiving part of the left group receiving part and each right receiving part of the right group receiving part; a first fastening member seated on the first tab support part to fixedly connect the right electrode tab of the first type lithium secondary battery and the left electrode tab of the second type lithium secondary battery in order to be conducted in series; a second fastening member seated on the second tab support part to fixedly connect the right electrode tab of the second type lithium secondary battery and the left electrode tab of the first type lithium secondary battery in order to be conducted in series; a left bus bar connected to the right electrode tab of the lithium secondary battery received in the right receiving part of the left group receiving part to be conducted to each other by a left bus bar fastening member seated on the tab support part disposed between the left group receiving part and the specific group receiving part; a right bus bar connected to the left electrode tab of the lithium secondary battery received in the left receiving part of the right group receiving part to be conducted to each other by a right bus bar fastening member seated on the tab support part disposed between the specific group receiving part and the right group receiving part; and an overcurrent circuit breaker connected to the left bus bar and the right bus bar in order to be conducted in series.

The first fastening member may include a first lower fixing plate of which a bolt is formed to be protruded upwardly, a first upper fixing plate through which the bolt of the first lower fixing plate penetrates, and a first fastener fastened to the bolt end of the first lower fixing plate penetrating through the first upper fixing plate, the second fastening member may include a second lower fixing plate of which a bolt is formed to be protruded upwardly, a second upper fixing plate through which the bolt of the second lower fixing plate penetrates, and the second fastener fastened to the bolt end of the second lower fixing plate penetrating through the second upper fixing plate, the left bus bar fastening member may include a left bus bar fixing plate of which the bolt is formed to be protruded upwardly and a left bus bar fastener fastened to the bolt end of the left bus bar fixing plate penetrating through the left bus bar fixing plate, the left bus bar may include a left bus bar fastening plate seated on the left bus bar fixing plate to have the bolt of the left bus bar fixing plate penetrate therethrough, the right bus bar fastening member may include a right bus bar fixing plate of which the bolt is formed to be protruded upwardly and a right bus bar fastener fastened to the bolt end of the right bus bar fixing plate penetrating through the right bus bar fixing plate, and the right bus bar may include a right bus bar fastening plate seated on the right bus bar fixing plate to have the bolt of the right bus bar fixing plate penetrate therethrough.

A dummy electrode tab having the same material as the left electrode tab of the first type lithium secondary battery may be fixed between the left bus bar fixing plate and the left bus bar fastening plate and a dummy electrode tab having the same material as the right electrode tab of the second type lithium secondary battery may be fixed between the right bus bar fixing plate and the right bus bar fastening plate.

The left end frame may have a third exposed tab support part formed at the top end thereof and may be fastened to the left of the left main frame among the plurality of main frames, the right end frame may have a fourth exposed tab support part formed at the top end thereof and may be fastened to the right of the right main frame among the plurality of main frames, the third tab support part may be seated with a third fastening member including a third lower fixing plate of which the bolt is formed to be protruded upwardly, a third upper fixing plate through which the bolt of the third lower fixing plate penetrates, and a third fastener fastened to the bolt end of the third lower fixing plate penetrating through the third upper fixing plate, the fourth tab support part may be seated with a fourth fastening member including a fourth lower fixing plate of which the bolt is formed to be protruded upwardly, a fourth upper fixing plate through which the bolt of the fourth lower fixing plate penetrates, and a fourth fastener fastened to the bolt end of the fourth lower fixing plate penetrating through the fourth upper fixing plate, the third fastening member may fix the left electrode tab of the first type lithium secondary battery received in the left main frame among the plurality of main frames between the third lower fixing plate and the third upper fixing plate, and the fourth fastening member may fix the left electrode tab of the second type lithium secondary battery received in the right main frame among the plurality of main frames between the fourth lower fixing plate and the fourth upper fixing plate.

A dummy electrode tab having the same material as the right electrode tab of the second type lithium secondary battery may be fixed between the third lower fixing plate and the third upper fixing plate and a dummy electrode tab having the same material as the left electrode tab of the first type lithium secondary battery may be fixed between the fourth lower fixing plate and the fourth upper fixing plate.

Each left receiving part of the left group receiving part and each left receiving part of the right group receiving part may receive the left electrode tab and the right electrode tab, respectively, to be vertically stacked in order to conduct the n first type lithium secondary batteries to each other in parallel and each right receiving part of the left group receiving part and each right receiving part of the right group receiving part may receive the left electrode tab and the right electrode tab, respectively, to be vertically stacked in order to conduct the n second type lithium secondary batteries to each other in parallel.

The first upper fixing plate, the second upper fixing plate, the third upper fixing plate, the fourth upper fixing plate may each be attached with fixing plate connectors and the left bus bar fastening plate and the right bus bar fastening plate may each be attached with fastening plate connectors, and each of the fixing plate connector and the fastening plate connector may be inserted with a connector of a voltage measuring line side connected to a voltage measurement device, where n is a natural number of 2 or more.

The left bus bar may include a linear type left bus bar extension bent from the left bus bar fastening plate and coated with an insulator, the right bus bar may include a linear type extension bent from the right bus bar fastening plate and coated with an insulator, the top ends of each main frame may be provided with "U"-letter first bus bar guide pipes guiding the left bus bar extension and the right bus bar extension on a horizontal extension line of the first tab support part, and the top ends of each center frame may be provided with "U"-letter second bus bar guide pipes guiding the left bus bar extension and the right bus bar extension on a horizontal extension line of the second tab support part.

Any one of the one end of the left bus bar extension and the right bus bar extension may be bent vertically so that the left bus bar extension and the right bus bar extension are vertically stacked one on another.

The other end of the left bus bar extension may be provided with a left bus bar fastening tab bent forwardly and backwardly to be fixed to the left end frame or the right end frame and connected to the overcurrent circuit breaker, the other end of the right bus bar extension may be provided with a right bus bar fastening tab bent in an opposite direction to a direction in which the left bus bar fastening tab is bent to be fixed to the end frame to which the left bus bar fastening tab is fixed among the left end frame and the right end frame and connected to the overcurrent circuit breaker.

The lithium secondary battery unit set with a bus bar may further include protective covers mounted on the top portions of each of the first fastening member and the second fastening member, wherein the top ends of each main frame may be provided with first protective cover fixing members formed to be protruded upwardly and fastened to the protective cover in an opposite direction to the first tab support part based on the first bus bar guide pipe and the top ends of each center frame may be provided with second protective cover fixing members formed to be protruded upwardly and fastened to the protective cover in an opposite direction to the second tab support part based on the second bus bar guide pipe.

The left receiving part and the right receiving part forming the specific group receiving part may receive a thermal pad that is a heat transfer path between the lithium secondary battery received in the right receiving part of the left group receiving part and the lithium secondary battery received in the left receiving part of the right group receiving part.

Each main frame may include linear type base plates, a front vertical plate mounted upwardly from the front side end of the base plate and having an air hole formed at the central portion thereof, a back vertical plate mounted upwardly from the back side end of the base plate and having an air hole formed at the central portion thereof, a front spacing protrusion disposed on the top portion of the front vertical plate and protruded forwardly, a back spacing protrusion disposed on the top portion of the back vertical plate and protruded backwardly, wherein the front spacing protrusion and the back spacing protrusion are each formed to have seating grooves, in which a linear type pipe is seated in left and right directions, drawn therein from above.

The specific group receiving part may be the left receiving part and the right receiving part that are formed in any one specific main frame disposed between the left main frame and the right main frame among the plurality of main frames.

The front vertical plate and the back vertical plate may be provided left grooves and right grooves drawn in from the left end and right end, respectively, the center frame may be provided with a temperature sensor front insertion groove communicating with a through hole that penetrates through the left surface and the right surface while being drawn in the inner side from the front outer surface and may be provided with the right groove of the front vertical plate of the left main frame and the left groove of the front vertical plate of the right main frame among the adjacent main frames, and a temperature sensor back insertion groove communicating with a through hole that penetrates through the left surface and the right surface while being drawn in the inner side from the back outer surface and may be provided with the right groove of the back vertical plate of the left main frame and the left groove of the back vertical plate of the right main frame among the adjacent main frames.

The front spacing protrusion may include a small width part formed at the back end and a large width part formed at the front end while being protruded left and right connecting with the small width part, the back spacing protrusion may include a small width part formed at the front end and a large width part formed at the back end while being protruded left and right connecting with the small width part, a portion of the seating groove of the front spacing protrusion may be formed at the small width part of the front spacing protrusion and the remaining thereof may be formed at the large width part and a portion of the seating groove of the back spacing protrusion may be formed at the small width part of the back spacing protrusion and the remaining thereof may be formed at the large width part, a temperature measurement line guided through a clearance formed by the small width part of the front spacing protrusion of the left main frame and the small width part of the front spacing protrusion of the right main frame among the two adjacent main frames, among temperature measurement lines connected to a temperature measurement device, may be connected to a temperature sensor inserted into the temperature sensor front insertion groove, and the temperature measurement line guided through a clearance formed by the small width part of the back spacing protrusion of the left main frame and the small width part of the back spacing protrusion of the right main frame among the two adjacent main frames, among the temperature measurement lines connected to the temperature measurement device may be connected to the temperature sensor inserted into the temperature sensor back insertion groove.

The front spacing protrusion may include a small width part formed at the back end and a large width part formed at the front end while being protruded left and right connecting with the small width part, the back spacing protrusion may include a small width part formed at the front end and a large width part formed at the back end while being protruded left and right connecting with the small width part, a portion of the seating groove of the front spacing protrusion may be formed at the small width part of the front spacing protrusion and the remaining thereof may be formed at the large width part, a portion of the seating groove of the back spacing protrusion may be formed at the small width part of the back spacing protrusion and the remaining thereof may be formed at the large width part, the voltage measurement line guided through the clearance formed by the small width part of the front spacing protrusion of the left main frame and the small width part of the front spacing protrusion of the right main frame among the main frames mounted to be adjacent to each other, among the left group main frame formed with the left group receiving part and the right group main frame formed with the fright group receiving part, may be connected to the second fastening member seated in the center frame disposed between the left main frame and the right main frame to be conducted to each other, the voltage measurement line guided through the clearance formed by the small width part of the front spacing protrusion of the right main frame and the small width part of the front spacing protrusion of the specific main frame among the right group main frames may be connected to the left bus bar fastening member to be conducted to each other, the voltage measurement line guided through the clearance formed by the small width part of the front spacing protrusion of the left main frame and the small width part of the front spacing protrusion of the specific main frame among the right group main frames may be connected to the right bus bar fastening member to be conducted to each other, and the voltage measurement line guided through the clearance formed by the small width part of the back spacing protrusion of the left main frame and the small width part of the back spacing protrusion of the right main frame among the main frames mounted to be adjacent to each other among the left group main frames and the right group main frames may be connected to the first fastening member seated in the left main frame to be conducted to each other.

The lithium secondary battery unit set with a bus bar may further include a lithium secondary battery housing provided with a housing air inlet and a housing air outlet and enclosing the lithium secondary battery set, wherein the housing air inlet is formed on any one of the extension line to the front air passage formed between the housing inner surface and the front vertical plate or the extension line to the back air passage formed between the housing inner surface and the back vertical plate and the housing air outlet on the remaining one of the extension line of the front air passage formed between the housing inner surface and the front vertical plate or the extension line to the back air passage formed between the housing inner surface and the back vertical plate.

The lithium secondary battery unit set with a bus bar may further include a lithium secondary battery housing provided with a housing air inlet and a housing air outlet and enclosing the lithium secondary battery set, wherein the housing air inlet is formed on any one of the front surface and the back surface of the housing and the housing air outlet is formed on the other surface of the front surface and the back surface of the housing.

A lithium secondary battery unit set with a bus bar according to another exemplary embodiment of the present invention includes: a plurality of lithium secondary battery unit sets mounted front and back to be adjacent to each other; and a lithium secondary battery housing provided with a housing air inlet and a housing air outlet and enclosing the plurality of lithium secondary battery unit set, wherein the two lithium secondary battery unit sets adjacent to each other among the plurality of lithium secondary battery unit sets are mounted so that the back end of the back spacing protrusion of the front lithium secondary battery unit set contacts the front end of the front spacing protrusion of the back lithium secondary battery unit set, the housing air inlet and the housing air outlet are each formed at least any one of the extension line of the front air passage formed between the housing inner surface and the front vertical plate of the lithium secondary battery unit set disposed at the most front side among the plurality of lithium secondary battery unit sets, the extension line of the back air passage formed between the housing inner surface and the back vertical plate of the lithium secondary battery unit set disposed at the most back side among the lithium secondary battery unit sets, and an extension line of an intermediate air passage formed between the back vertical plate and the front vertical plate of the two adjacent lithium secondary battery unit sets.

A lithium secondary battery set with a bus bar according to another exemplary embodiment of the present invention includes: a plurality of lithium secondary battery unit sets mounted front and back to be adjacent to each other; and a lithium secondary battery housing provided with a housing air inlet and a housing air outlet and enclosing the plurality of lithium secondary battery unit set, wherein the two lithium secondary battery unit sets adjacent to each other among the plurality of lithium secondary battery unit sets are mounted so that the back end of the back spacing protrusion of the front lithium secondary battery unit set contacts the front end of the front spacing protrusion of the back lithium secondary unit set, wherein the housing air inlet is formed on any one of the front surface and the back surface of the housing and the housing air outlet is formed on the remaining one of the front surface and the back surface of the housing.

The housing air inlet may be mounted in plural, the housing air inlets may each be formed in front of the air outlet formed with each front vertical plate of the lithium secondary battery set disposed at the most front side among the lithium secondary battery unit sets, the housing air outlet may be mounted in plural, and the housing air outlets may each be formed at the back of the air outlet formed with each back vertical plate of the lithium secondary battery unit set disposed at the most back side among the lithium secondary battery unit sets.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
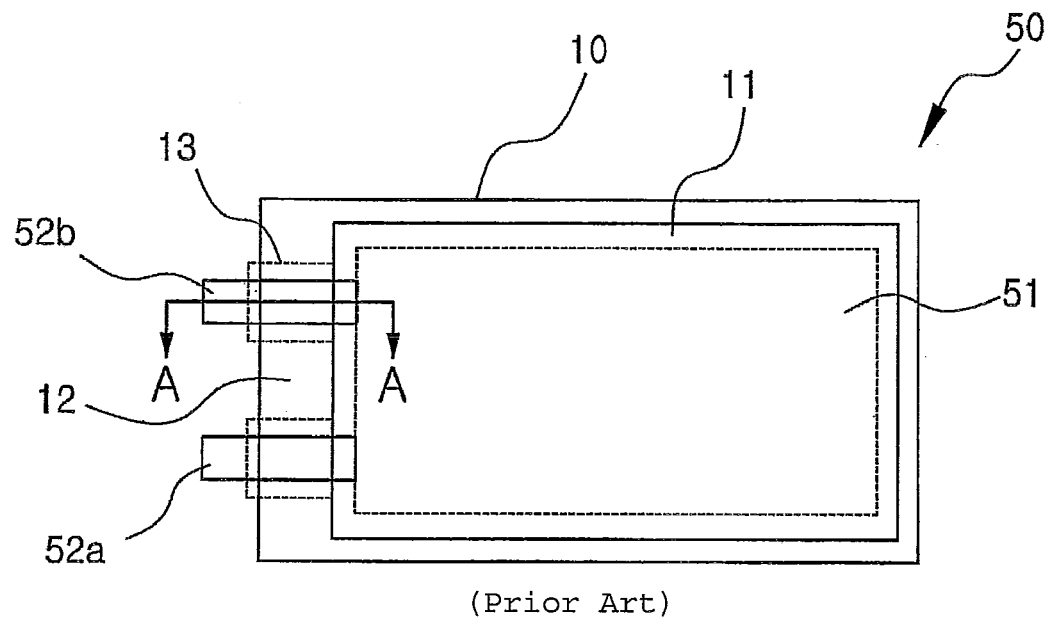
FIG. 1 is a front view showing a lithium secondary battery according to the related art.
Figure 2:
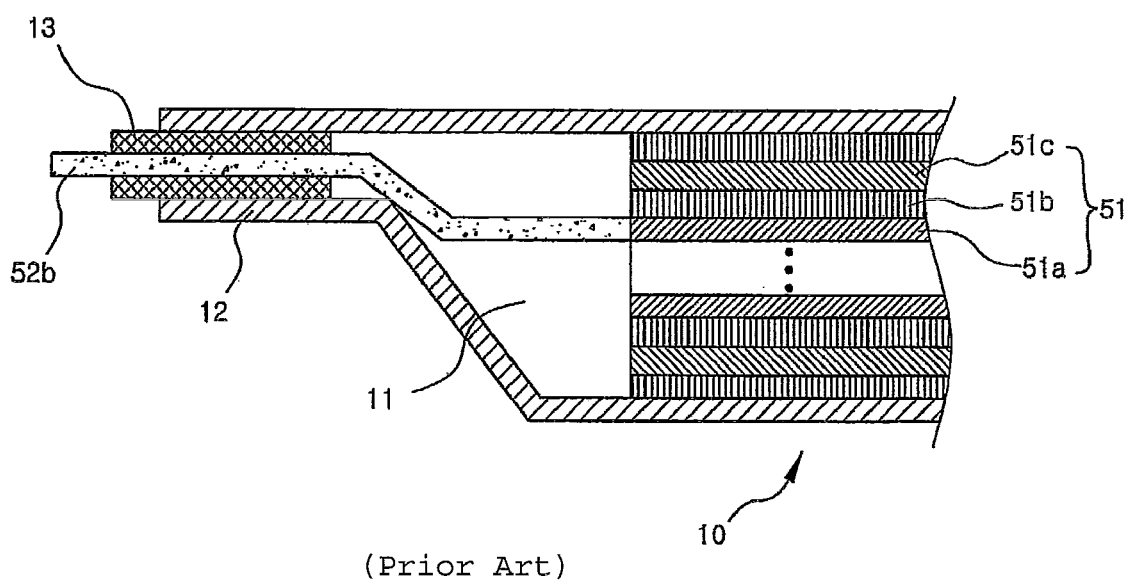
FIG. 2 is a cross-sectional view taken along line A-A of FIG. 1.

110: LEFT END FRAME
110-6: FRONT SPACING PROTRUSION
110-7: BACK SPACING PROTRUSION
110-10: BUS BAR GUIDE PIPE
110-12: LOWER FRONT COUPLING PROTRUSION
110-13: LOWER BACK COUPLING PROTRUSION
120: RIGHT END FRAME
120-2g: TEMPERATURE SENSOR FRONT INSERTION GROOVE
120-3g: TEMPERATURE SENSOR BACK INSERTION GROOVE
120-12: LOWER FRONT COUPLING PROTRUSION
120-12p: HOLLOW FASTENING PROTRUSION
120-13: LOWER BACK COUPLING PROTRUSION
120-13p: HOLLOW FASTENING PROTRUSION
120-6: FRONT SPACING PROTRUSION
120-6p: HOLLOW FASTENING PROTRUSION
120-6g: SEATING GROOVE\
120-6s: SMALL WIDTH PART
120-6l: LARGE WIDTH PART
120-6sl: LEFT PROTRUSION
120-7: BACK SPACING PROTRUSION
120-7p: HOLLOW FASTENING PROTRUSION
120-7g: SEATING GROOVE
120-7s: SMALL WIDTH PART
120-7l: LARGE WIDTH PART
120-7sl: LEFT PROTRUSION
120-8: FOURTH TAB SUPPORT PART
120-8p: SEATING PROTRUSION
120-9: FOURTH VIRTUAL TAB SUPPORT PART
120-9p: VIRTUAL SEATING PROTRUSION

120-10: BUS BAR GUIDE PIPE
130+1, ..., 130+r, 130+(r+1), ..., 130+n: MAIN FRAME
130+r: LEFT MAIN FRAME
130+(r+1): RIGHT MAIN FRAME
130-1: BASE PLATE
130-2: FRONT VERTICAL PLATE
130-2h: AIR HOLE
130-2lg: LEFT GROOVE
130-2rg: RIGHT GROOVE
130-3: BACK VERTICAL PLATE
130-3h: AIR HOLE
130-3rg: RIGHT GROOVE
130-3lg: LEFT GROOVE
130-5: BACK VERTICAL SUPPORTER
130-5h: AIR HOLE
130-6: FRONT SPACING PROTRUSION
130-6g: SEATING GROOVE
130-6s: SMALL WIDTH PART
130-6l: LARGE WIDTH PART
130-6h: FASTENING HOLE
130-7: BACK SPACING PROTRUSION
130-7g: SEATING GROOVE
130-7s: SMALL WIDTH PART
130-7l: LARGE WIDTH PART
130-7h: FASTENING HOLE
130-8: FIRST TAB SUPPORT PART
130-8p: SEATING PROTRUSION
130-9: FIRST PROTECTIVE COVER FIXING PART
130-9h: FASTENING HOLE
130-10: BUS BAR GUIDE PIPE
130-12: LOWER FRONT COUPLING PROTRUSION
130-12h: FASTENING HOLE
130-13: LOWER BACK COUPLING PROTRUSION
130-13h: FASTENING HOLE
LS: LEFT RECEIVING PART
RS: RIGHT RECEIVING PART
230+r: CENTER FRAME
230-2g: TEMPERATURE SENSOR FRONT INSERTION GROOVE
230-3g: TEMPERATURE SENSOR BACK INSERTION GROOVE
230-6: UPPER FRONT COUPLING PROTRUSION
230-6p: HOLLOW FASTENING PROTRUSION
230-7: UPPER BACK COUPLING PROTRUSION
230-7p: HOLLOW FASTENING PROTRUSION
230-8: SECOND TAB SUPPORT PART
230-8p: SEATING PROTRUSION
230-9: SECOND PROTECTIVE COVER FIXING PART
230-9h: FASTENING HOLE
230-10: BUS BAR GUIDE PIPE
230-12: LOWER FRONT COUPLING PROTRUSION
230-12p: HOLLOW FASTENING PROTRUSION
230-13: LOWER BACK COUPLING PROTRUSION
230-13p: HOLLOW FASTENING PROTRUSION
fh: FRONT THROUGH HOLE
130-6t1: FIRST CLEARANCE
310+i: FIRST TYPE LITHIUM SECONDARY BATTERY
310+(r+1): FIRST TYPE LITHIUM SECONDARY BATTERY
310-LT: LEFT ELECTRODE TAB
310-lth: FASTENING GROOVE
310-RT: RIGHT ELECTRODE TAB
310-rth: FASTENING GROOVE
320+i: SECOND TYPE LITHIUM SECONDARY BATTERY
320+r: SECOND TYPE LITHIUM SECONDARY BATTERY
320-LT: LEFT ELECTRODE TAB
320-lth: FASTENING GROOVE
320-RT: RIGHT ELECTRODE TAB
320-rth: FASTENING GROOVE
410+i: FIRST FASTENING MEMBER
410-1: FIRST LOWER FIXING PLATE
410-2: FIRST UPPER FIXING PLATE
410-2c: FIXING PLATE CONNECTOR
410-3: FIRST FASTENER
420+j: SECOND FASTENING MEMBER
420-1: SECOND LOWER FIXING PLATE
420-2: SECOND UPPER FIXING PLATE
420-2c: FIXING PLATE CONNECTOR
420-3: SECOND FASTENER
430: THIRD FASTENING MEMBER
430-1: THIRD LOWER FIXING PLATE
430-2: THIRD UPPER FIXING PLATE
430-2c: FIXING PLATE CONNECTOR
430-3: THIRD FASTENER
430-dt: DUMMY ELECTRODE TAB
440: FOURTH FASTENING MEMBER
440-1: FOURTH LOWER FASTENING PLATE
440-2: FOURTH UPPER FIXING PLATE
440-2c: FIXING PLATE CONNECTOR
440-3: FOURTH FASTENER
440-dt: DUMMY ELECTRODE TAB
500: PROTECTIVE COVER
510: FIRST PROTECTIVE COVER PART
512: FIRST FASTENING PLATE
512-1: SUPPORTER
512-3: FASTENING PROTRUSION
520: SECOND PROTECTIVE COVER PART
522: SECOND FASTENING PLATE
522-1: SUPPORTER
522-3: FASTENING PROTRUSION
610: LOWER HOUSING
620: UPPER HOUSING
622: HOUSING AIR INLET
624: HOUSING AIR OUTLET
710: LEFT BUS BAR
711: LEFT BUS BAR FASTENING PLATE
711c: FASTENING PLATE CONNECTOR
712: LEFT BUS BAR EXTENSION
713: LEFT BUS BAR FASTENING TAB
713h: FASTENING GROOVE
720: RIGHT BUS BAR
721: RIGHT BUS BAR FASTENING PLATE
721c: FASTENING PLATE CONNECTOR
722: RIGHT BUS BAR EXTENSION
723: RIGHT BUS BAR FASTENING TAB
723h: FASTENING GROOVE
810: LEFT BUS BAR FASTENING MEMBER
810-dt: DUMMY ELECTRODE TAB
811: LEFT BUS BAR FIXING PLATE
813: LEFT BUS BAR FASTENER
820: RIGHT BUS BAR FASTENING MEMBER
820-dt: DUMMY ELECTRODE TAB
821: RIGHT BUS BAR FIXING PLATE
823: RIGHT BUS BAR FASTENER
910: LEFT THERMAL PAD
910lp: LEFT PROTRUSION
910rp: RIGHT PROTRUSION
920: RIGHT THERMAL PAD
920lp: LEFT PROTRUSION 1000+f: FRONT LITHIUM SECONDARY BATTERY UNIT SET
1000+r: BACK LITHIUM SECONDARY BATTERY UNIT SET
1002: HOLLOW AIR PASSAGE
1004-f: FRONT AIR PASSAGE
1004-r: BACK AIR PASSAGE
1610: LOWER HOUSING
1620: UPPER HOUSING
1622: HOUSING AIR INLET
1624: HOUSING AIR OUTLET
1624-f, 1624-r: HOUSING AIR OUTLET

BEST MODE

Exemplary Embodiment 1

Figure 3:
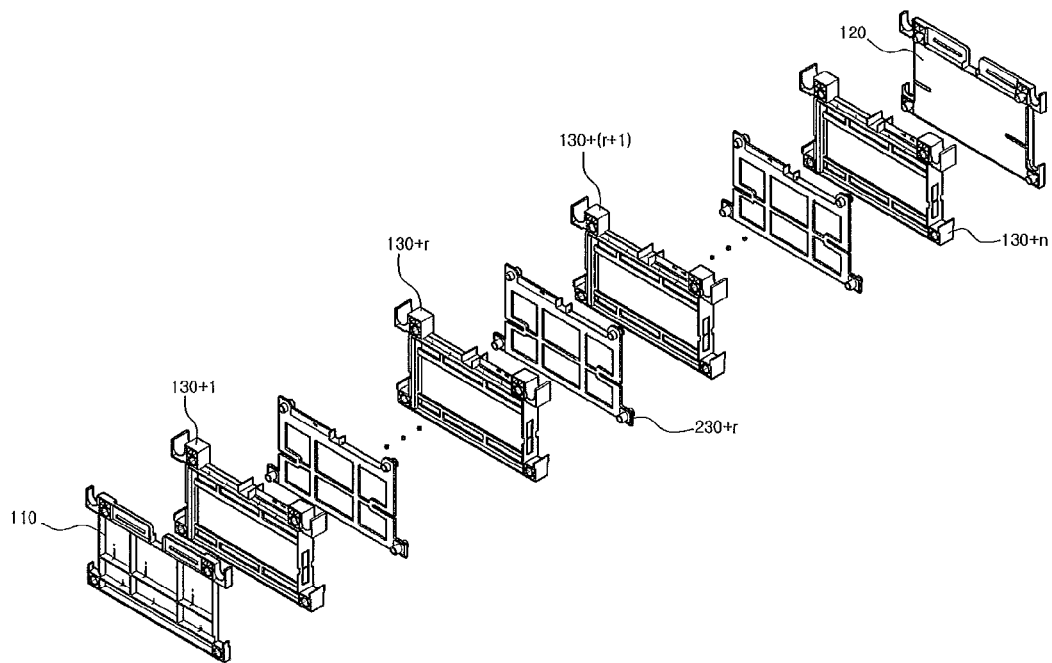
FIG. 3 is an exploded perspective view of a left end frame, a main frame, a center frame, and a right end frame according to a first Exemplary embodiment of the present invention.

Exemplary Embodiment 1 relates to a lithium secondary battery unit set with a bus bar according to the present invention. FIG. 3 is an exploded perspective view of a left end frame, a main frame, a center frame, and a right end frame according to Exemplary Embodiment 1.

Referring to FIG. 3, Exemplary Embodiment 1 includes a left end frame 110, a right end frame 120, and a plurality of main frames 130+1, ..., 130+r, 130+(r+1), ..., 130+n. The plurality of main frames 130+1, ..., 130+r, 130+(r+1), ..., 130+n are mounted to be adjacent to each other between the left end frame 110 and the right end frame 120 and a center frame 230+r is mounted between any two main frames 130+r and 130+(r+1) mounted to be adjacent to each other. In this case, r is any natural number from 1 to (n−1). The rest is the same as above.

Figure 4:
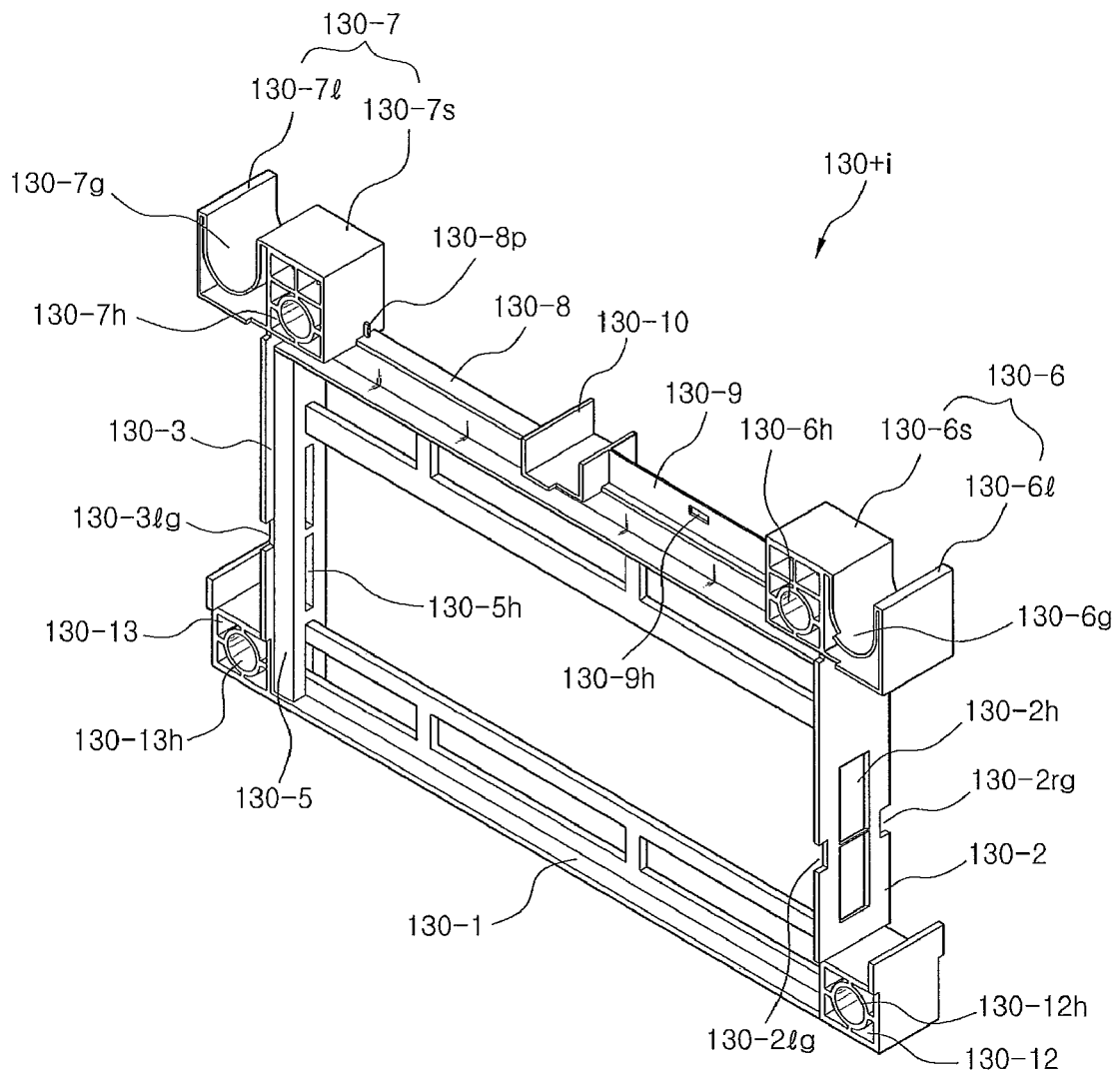
FIG. 4 is a perspective view of a main frame according to Exemplary Embodiment 1.

FIG. 4 is a perspective view of a main frame according to Exemplary Embodiment 1.

Referring to FIG. 4, any main frame 130+i has a linear type base plate 130-1. In this case, i is any natural number from 1 to n. The rest is the same as above.

Referring to FIG. 4, a front side end of the base plate 130-1 is mounted with a front vertical plate 130-2 upwardly. The front vertical plate 130-2 has an air hole 130-2h formed at the central portion thereof and is provided with a left groove 130-21g and a right groove 130-2rg drawn in the central portion from the left end and the right end thereof. The left groove 130-21g and the right groove 130-2rg are formed at a position opposite to each other based on the central portion.

Referring to FIG. 4, a back side end of the base plate 130-1 is mounted with a back vertical plate 130-3 upwardly. The back vertical plate 130-3 has an air hole (not shown) formed at the central portion thereof and is provided with a left groove 130-31g and a right groove (not shown) that are drawn in the central portion from the left end and the right end thereof. The inner side surface of the back vertical plate 130-3 is mounted with a back vertical supporter 130-5. The back vertical supporter 130-5 is provided with an air hole 130-5h communicating with an air hole (not shown) having the central portion of the back vertical plate 130-3 formed at the central portion thereof. Although not shown in FIG. 4, similar to the back vertical plate 130-3, the inner side surface of the front vertical plate 130-2 is mounted with the front vertical supporter (not shown). The front vertical supporter (not shown) is provided with the air hole (not shown) communicating with the air hole 130-2h formed at the central portion of the front vertical plate 130-2. Referring to FIG. 4, the top portion of the front vertical plate 130-2 is provided with a front spacing protrusion 130-6 to be protruded forwardly. The front spacing protrusion 130-6 is provided with a seating groove 130-6g, in which a linear type pipe (not shown) may be seated in left and right directions, to be drawn in from above. The front spacing protrusion 130-6 is configured to include a small width part 130-6s formed at a back end and a large width part 130-61 formed connecting with the small width part 130-6s, wherein the large width part 130-61 is protruded to the left and right of the small width part 130-6s to have a width larger than that of the small width part 130-6s. A portion of the seating groove 130-6g of the front spacing protrusion 130-6 is formed at the small width part 130-6s of the front spacing protrusion 130-6 and the remaining thereof is formed at the large width part 130-61 of the front spacing protrusion 130-6. The small width part 130-6s of the front spacing protrusion 130-6 is provided with a fastening hole 130-6h penetrating through the left and right thereof.

Referring to FIG. 4, the top portion of the back vertical plate 130-3 is provided with a back spacing protrusion 130-7 to be protruded backwardly. The back spacing protrusion 130-7 is provided with a seating groove 130-7g, in which a linear type pipe (not shown) may be seated in left and right directions, to be drawn in from above. The back spacing protrusion 130-7 is configured to include a small width part 130-7s formed at a front end and a large width part 130-71 formed connecting with the small width part 130-7s, wherein the large width part 130-71 is protruded to the left and right of the small width part 130-7s to have a width larger than that of the small width part 130-7s. A portion of the seating groove 130-7g of the back spacing protrusion 130-7 is formed at the small width part 130-7s of the back spacing protrusion 130-7 and the remaining thereof is formed at the large width part 130-71 of the back spacing protrusion 130-7. The small width part 130-7s of the back spacing protrusion 130-7 is provided with a fastening hole 130-7h penetrating through the left and right thereof.

Referring to FIG. 4, the top end of the main frame 130+i is provided with a first exposed tab support part 130-8. The first tab support part 130-8 is formed in a linear type plate shape and each of the front side end and the back side end of the first tab support part 130-8 are protrudedly provided with a seating protrusion 130-8p.

Referring to FIG. 4, the top end of the main frame 130+i is provided with a first protective cover fixing part 130-9. The first protective cover fixing part 130-9 is formed to be protruded to the top portion of the horizontal extension line of the first tab support part 130-8. The first protective cover fixing part 130-9 is provided with a fastening hole 130-9h. Meanwhile, an "U"-letter first bus bar guide pipe 130-10 that may guide a right bus bar extension 722 (see FIG. 11) as described below is formed between the first tab support part 130-8 and the first protective cover fixing part 130-9. Based on the first bus bar guide pipe 130-10, the first tab support part 130-8 is formed at the back spacing protrusion 130-7 and the first protective cover fixing part 130-9 is formed at the front spacing protrusion 130-6. Referring to FIG. 4, the front vertical plate 130-2 is provided with a lower front coupling protrusion 130-12 to be protruded forwardly. The lower front coupling protrusion 130-12 is provided with a fastening hole 130-12h penetrating through the left and right thereof.

Referring to FIG. 4, the back vertical plate 130-3 is provided with a lower back coupling protrusion 130-13 to be protruded backwardly. The lower back coupling protrusion 130-13 is provided with a fastening hole 130-13h penetrating through the left and right thereof.

Figure 5:
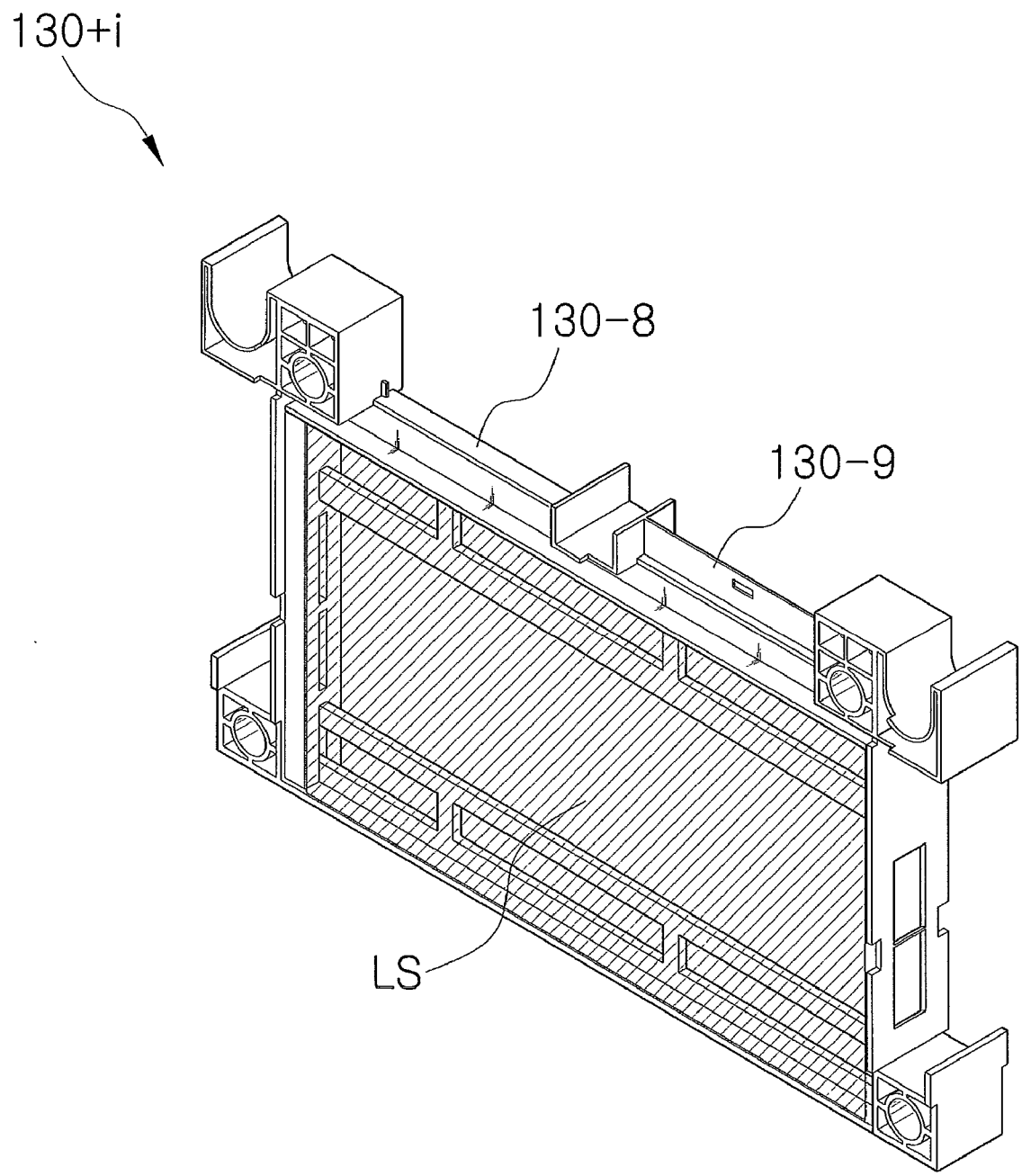
FIGS. 5 and 6 are diagrams schematically showing a left receiving part and a right receiving part formed on the main frame according to Exemplary Embodiment 1.
Figure 6:
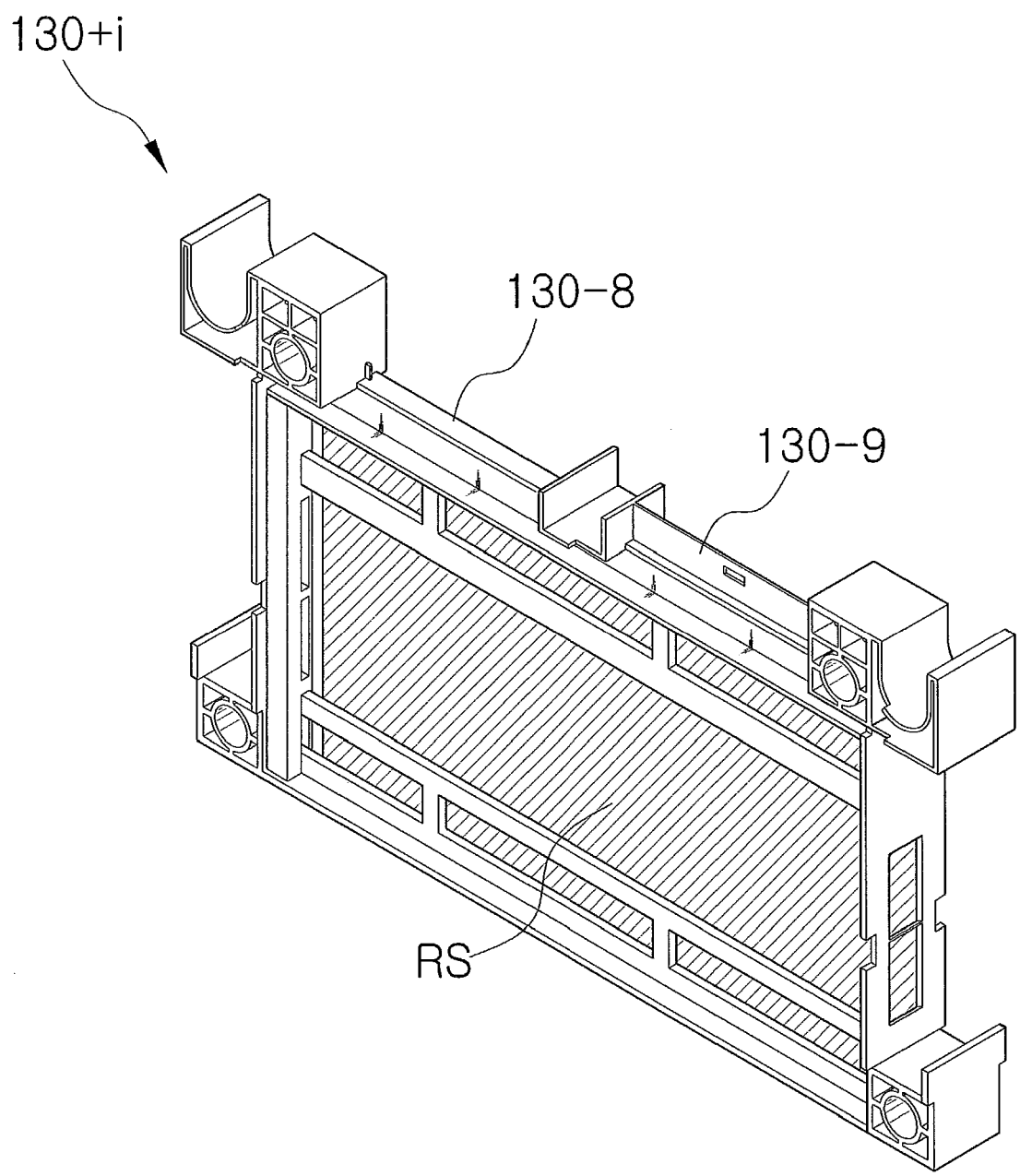

FIGS. 5 and 6 schematically show a left receiving part and a right receiving part formed on the main frame according to Exemplary Embodiment 1.

Referring to FIG. 5, the lower left of the first tab support part 130-8 and the first protective cover fixing part 130-9 of the main frame 130+i is provided with a left receiving part LS that is opened left. Referring to FIG. 6, the lower right of the first tap support part 130-8 and the first protective cover fixing part 130-9 of the main frame 130+i is provided with a right receiving part RS that is opened right.

Figure 7:
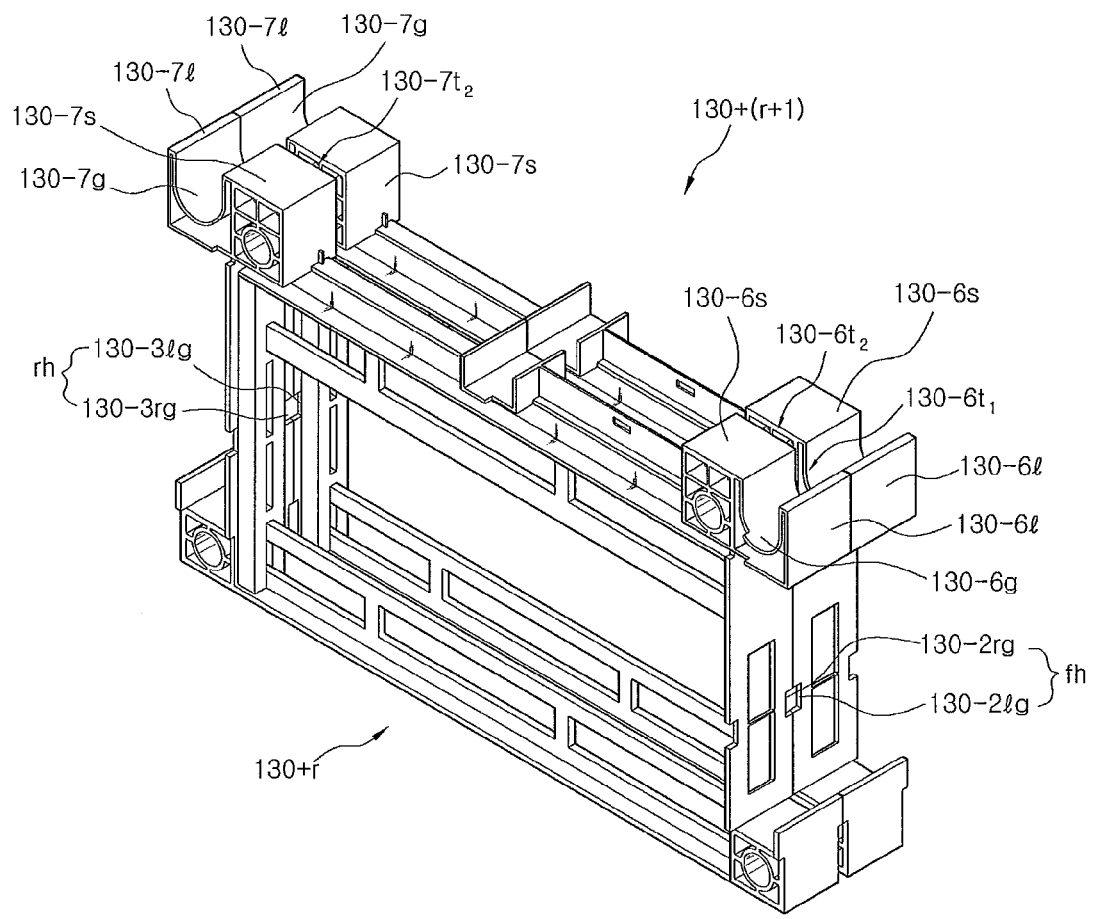
FIG. 7 is a mounting state diagram of the two adjacent main frames in a state where the center frame according to Exemplary Embodiment 1 is not shown.
Figure 8:
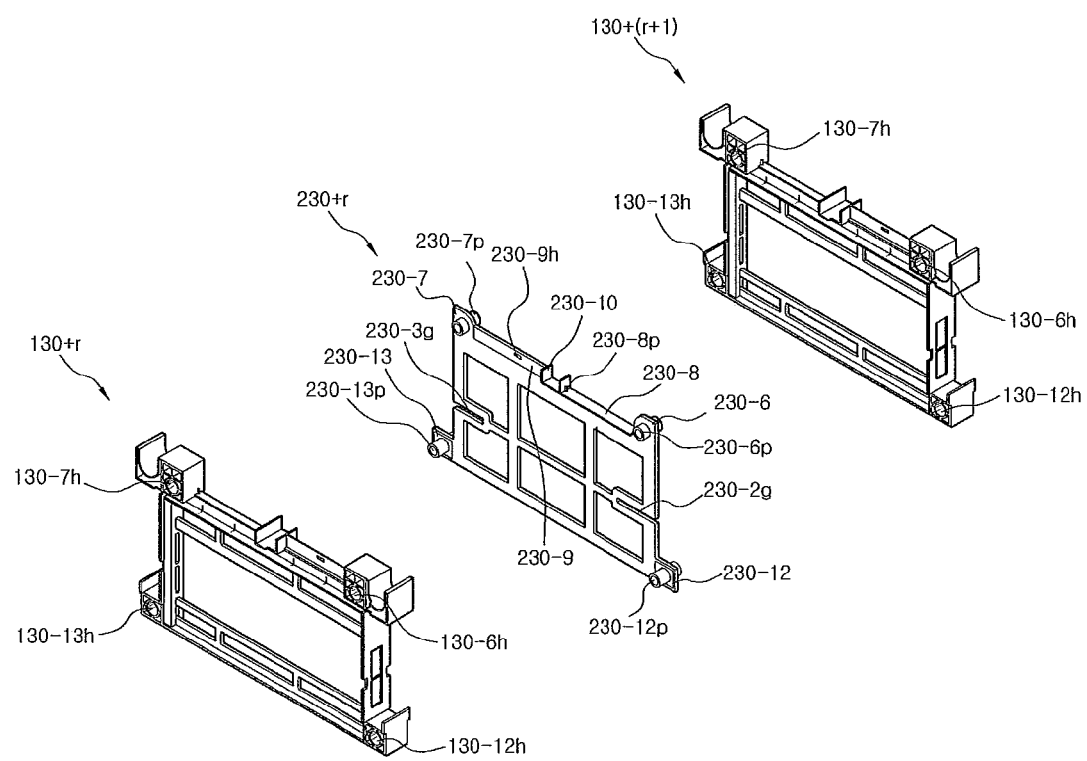
FIG. 8 is an exploded perspective view of the adjacent main frames and a center frame mounted three-week, according to Exemplary Embodiment 1.

FIG. 7 shows a mounting state diagram of two adjacent main frames 130+r and 130+(r+1) in a state where a center frame 230+r (see FIG. 3) according to Exemplary Embodiment 1 is not shown. Referring to FIG. 7, the right surface of the large width part 130-61 of the left main frame 130+r and the left surface of the large width part 130-61 of the right main frame 130+(r+1) are mounted to contact each other, such that a clearance is formed between the right surface of the small width part 130-6s of the left main frame 130+r and the left surface of the small width part 130-6s of the right main frame 130+(r+1). Referring to FIG. 7, similar to the above description, the right surface of the large width part 130-71 of the left main frame 130+r and the left surface of the large width part 130-71 of the right main frame 130+(r+1) are mounted to contact each other, such that a clearance is formed between the right surface of the small width part 130-7s of the left main frame 130+r and the left surface of the small width part 130-7s of the right main frame 130+(r+1). FIG. 8 is an exploded perspective view of the adjacent main frames and the center frame mounted therebetween according to Exemplary Embodiment 1. Referring to FIG. 8, the top edge of the center frame 230+r is protrudedly provided with an upper front coupling protrusion 230-6 and an upper back coupling protrusion 230-7. The upper front coupling protrusion 230-6 and the upper back coupling protrusion 230-7 are protrudedly formed left and right with hollow fastening protrusions 230-6p and 230-7p having a hollow shaft shape that penetrates through the left and right surfaces thereof. The hollow fastening protrusion 230-6p is formed to have a left end fastened to the right of the fastening hole 130-6h of the left main frame 130+r and to have a right end fastened to the left of the fastening hole 130-6h of the right main frame 130+(r+1). Similarly, the hollow fastening protrusion 230-7p is formed to have a left end fastened to the right of the fastening hole 130-7h of the left main frame 130+r and to have a right end fastened to the left of the fastening hole 130-7h of the right main frame 130+(r+1). Referring to FIG. 8, the top end of the center frame 230+r is provided with a second exposed tab support part 230-8. The second tab support part 230-8 is formed in a linear type plate shape and each of the front side end and the back side end of the second tab support part 230-8 are protrudedly provided with a seating protrusion 230-8p.

Referring to FIG. 8, the top end of the center frame 230+r is provided with a second protective cover fixing part 230-9.

The second protective cover fixing part 230-9 is formed to be protruded to the top portion of the horizontal extension line of the second tab support part 230-8. The second protective cover fixing part 230-9 is provided with a fastening hole 230-9h. Meanwhile, an "U"-letter second bus bar guide pipe 230-10 that may guide a right bus bar extension 722 (see FIG. 11) as described below is formed between the second tab support part 230-8 and the second protective cover fixing part 230-9. Based on the second bus bar guide pipe 230-10, the second tab support part 230-8 is formed at the upper front coupling protrusion 230-6 and the second protective cover fixing part 230-9 is formed at the upper back coupling protrusion 230-7.

Referring to FIG. 8, the bottom end of the front outer surface of the center frame 230+r is protrudedly formed forwardly with the lower front coupling protrusion 230-12 and the bottom end of the back outer surface of the center frame 230+r is protrudedly formed backwardly with the lower back coupling protrusion 230-13. The lower front coupling protrusion 230-12 and the lower back coupling protrusion 230-13 are protrudedly formed left and right with hollow fastening protrusions 230-12p and 230-13p having a hollow shaft shape that penetrates through the left and right thereof. The hollow fastening protrusion 230-12p is formed to have a left end fastened to the right of the fastening hole 130-12h of the left main frame 130+r and to have a right end fastened to the left of the fastening hole 130-12h of the right main frame 130+(r+1). Similarly, the hollow fastening protrusion 230-13p is formed to have a left end fastened to the right of the fastening hole 130-13h of the left main frame 130+r and to have a right end fastened to the left of the fastening hole 130-13h of the right main frame 130+(r+1).

Referring to FIG. 8, the center frame 230+r is provided with a temperature sensor front insertion groove 230-2g and a temperature sensor back insertion groove 230-3g. The temperature sensor front insertion groove 230-2g is formed to penetrate through the left surface and the right surface while being drawn in an inner side from the front outer surface of the center frame 230+r and the temperature sensor back insertion groove 230-3g is formed to penetrate through the left surface and the right surface while being drawn in an inner side from the back outer surface of the center frame 230+r. Referring back to FIG. 7, the temperature sensor front insertion groove 230-2g communicates with a front through hole fh that is formed by a right groove 130-2rg of the front vertical plate of the left main frame 130+r and a left groove 130-21g of the front vertical plate of the right main frame 130+(r+1). The front through hole fh is inserted with a front temperature sensor (not shown). Similarly, referring back to FIG. 7, the temperature sensor back insertion groove 230-3g communicates with a back through hole rh that is formed by a right groove 130-3rg of the back vertical plate of the left main frame 130+r and a left groove 130-3lg of the back vertical plate of the right main frame 130+(r+1). The back through hole rh is inserted with a back temperature sensor (not shown).

Referring to FIG. 7, a temperature measurement line (not shown) connected to the front temperature sensor (not shown) inserted into the front through hole fh is guided through a first clearance 130-6t₁ to be drawn in a linear type guide pipe (not shown) seated in the seating groove 130-6g of the main frames 130+1, . . . , 130+r, 130+(r+1), . . . , 130+n. The first clearance 130-6t₁ is a clearance that is formed between the seating groove 130-6g of the left main frame 130+r and the seating groove 130-6g of the right main frame 130+(r+1), among clearances formed by the small width part 130-6s of the left main frame 130+r and the small width part 130-6s of the right main frame 130+(r+1). Similarly, the temperature measurement line (not shown) connected to the back temperature sensor (not shown) inserted into the back through hole rh is guided through a first clearance (not shown) to be drawn in the linear type guide pipe (not shown) seated in the seating groove 130-7g of the main frames 130+1, . . . , 130+r, 130+(r+1), . . . , 130+n. The first clearance (not shown) is a clearance that is formed between the seating groove 130-7g of the left main frame 130+r and the seating groove 130-7g of the right main frame 130+(r+1), among clearances formed by the small width part 130-7s of the left main frame 130+r and the small width part 130-7s of the right main frame 130+(r+1).

Figure 9:
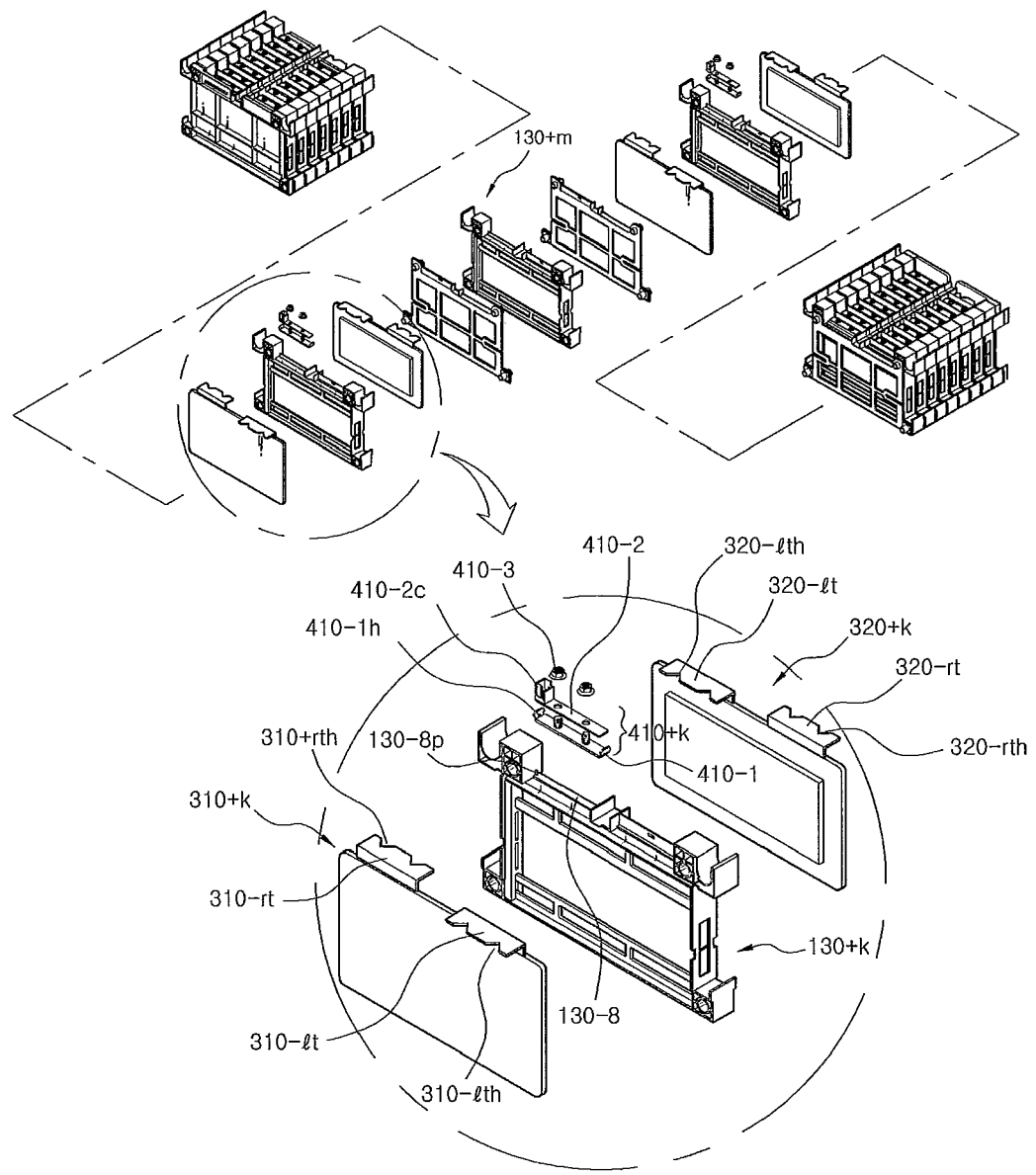
FIG. 9 is an exploded perspective view of the main frame and a first type lithium secondary battery and a second type lithium secondary battery that are fixed to be received in the main frame, according to Exemplary Embodiment 1.

FIG. 9 is an exploded perspective view of the main frame and the first type lithium secondary battery and the second type lithium secondary battery that are fixed to be received in the main frame, according to the first exemplary embodiment of the present invention.

Referring to FIGS. 9 and 3, the plurality of main frames 130+1, ..., 130+r, 130+(r+1), ..., 130+n may be classified into a specific main frame 130+m, a left group main frame (no reference numeral), and a right group main frame (no reference numeral). The specific main frame 130+m is one specific main frame selected from the main frames disposed between the left main frame 130+1 and the right main frame 130+n. The left group main frame (no reference numeral) is configured to include the plurality of main frames that are mounted to be adjacent to the left of the specific main frame 130+m.

The right group main frame (no reference numeral) is configured to include the plurality of main frames that are mounted to be adjacent to the right of the specific main frame 130+m.

Referring to FIG. 9, a first type lithium secondary battery 310+k is received in a left receiving part LS (see FIG. 5) of the main frame 130+k including the left group main frame (no reference numeral) and the right group main frame (no reference numeral). Herein, k is a natural number from 1 to n, excluding m. The rest is the same as above. The first type lithium secondary battery 310+k has a left electrode tab 310-$lt$ and a right electrode tab 310-$rt$, wherein the left electrode tab 310-$lt$ is formed to be bent to the left of the pouch (no reference numeral) so that it is protruded to the left of the circumferential surface of the pouch (no reference numeral) and the right electrode tab 310-$rt$ is formed to be bent to the right of the pouch (no reference numeral) so that it is protruded to the right of the circumferential surface of the pouch (no reference numeral). The left electrode tab 310-$lt$ may be an anode tab or a cathode tab and the right electrode tab 310-$rt$ is an electrode tab having opposite polarity to the left electrode tab 310-$lt$. The left electrode tab 310-$lt$ and the right electrode tab 310-$rt$ are each provided with fastening grooves 310-$lth$ and 310-$rth$. Meanwhile, according to Exemplary Embodiment 1, the left electrode tab 310-$lt$ and the right electrode tab 310-$rt$ may each be provided with the fastening holes (not shown), instead of the fastening grooves 310-$lth$ and 310-$rth$.

Referring to FIG. 9, a second type lithium secondary battery 320+k is received in a right receiving part RS (see FIG. 6) of the main frame 130+k including the left group main frame (no reference numeral) and the right group main frame (no reference numeral). Herein, k is a natural number from 1 to n, excluding m. The rest is the same as above. The second type lithium secondary battery 320+k has the left electrode tab 320-$lt$ and the right electrode tab 320-$rt$, wherein the left electrode tab 320-$lt$ is formed to be bent to the left of the pouch (no reference numeral) so that it is protruded to the left of the circumferential surface of the pouch (no reference numeral) and the right electrode tab 320-$rt$ is formed to be bent to the right of the pouch (no reference numeral) so that it is protruded to the right of the circumferential surface of the pouch (no reference numeral). The left electrode tab 320-$lt$ of the second type lithium secondary battery 320+k is formed to be protruded in a direction opposite to the right electrode tab 310-$rt$ of the first type lithium secondary battery 310+k and is an electrode tab having opposite polarity to the right electrode tab 310-$rt$ of the first type lithium secondary battery 310+k. The right electrode tab 320-$rt$ of the second type lithium secondary battery 320+k is formed to be protruded in a direction opposite to the left electrode tab 310-$lt$ of the first type lithium secondary battery 310+k and is an electrode tab having opposite polarity to the left electrode tab 310-$lt$ of the first type lithium secondary battery 310+k. The left electrode tab 320-$lt$ and the right electrode tab 320-$rt$ are each provided with fastening grooves 320-$lth$ and 320-$rth$. Meanwhile, according to Exemplary Embodiment 1, the left electrode tab 320-$lt$ and the right electrode tab 320-$rt$ may each be provided with the fastening holes (not shown), instead of the fastening grooves 320-$lth$ and 320-$rth$. That is, the main frame 130+k other than the specific main frame 130+m receives the first type lithium secondary battery 310+k and the second type lithium secondary battery 320+k, respectively.

Referring to FIG. 9, the right electrode tab 310-$rt$ of the first type lithium secondary battery 310+k received in the main frame 130+k and the left electrode tab 320-$lt$ of the second type lithium secondary battery 320+k received in the main frame 130+k are connected by a first fastening member 410+K to be conducted in series.

Referring to FIG. 9, the first fastening member 410+k has a first lower fixing plate 410-1, a first upper fixing plate 410-2, and a first fastener 410-3. The first lower fixing plate 410-1, the first upper fixing plate 410-2, and the first fastener 410-3 may each be a conductor. The first lower fixing plate 410-1 is seated in the first tab support part 130-8 of the main frame 130+k and is provided with a seating groove 410-1$h$ inserted into the seating protrusion 130-8$p$. The first lower fixing plate 410-1 is provided with a bolt (no reference numeral) that is protruded upwardly. The first upper fixing plate 410-2 is provided with a through hole (no reference numeral) through which the bolt (no reference numeral) of the first lower fixing plate 410-1 penetrates. The first upper fixing plate 410-2 is attached with a fixing plate connector 410-2$c$.

Referring to FIG. 9, the first fastener 410-3 is inserted into the end of the bolt (no reference numeral) of the first lower fixing plate 410-1. The right electrode tab 310-$rt$ of the first type lithium secondary battery 310+k and the left electrode tab 320-$lt$ of the second type lithium secondary battery 320+k are each inserted between the first lower fixing plate 410-1 and the first upper fixing plate 410-2, such that they are fastened by the first fastener 410-3 to be conducted to each other. In this case, the right electrode tab 310-$rt$ of the first type lithium secondary battery 310+k and the left electrode tab 320-$lt$ of the second type lithium secondary battery 320+k are vertically stacked and the fastening groove 310-$rth$ of the first type lithium secondary battery 310+k and the fastening groove 320-$lth$ of the second type lithium secondary battery 320+k each enclose the bolt (no reference numeral) of the first lower fixing plate 410-1. Therefore, the contact area between the right electrode tab 310-$rt$ of the first type lithium secondary battery 310+k and the left electrode tab 320-$lt$ of the second type lithium secondary battery 320+k is increased, such that a conduction state is good and the fastening force is increased, thereby preventing the separation.

Referring to FIG. 9, the fixing plate connector 410-2$c$ is attached to the first upper fixing plate 410-2, such that the right electrode tab 310-$rt$ of the first type lithium secondary battery 310+k received in the main frame 130+k and the left electrode tab 320-$lt$ of the second type lithium secondary battery 320+k received in the main frame 130+k are connected to be electrically conducted to each other. The fixing plate connector 41-2$c$ is inserted with a connector (not shown) at a k-th back voltage measurement line (not shown) connected to a voltage measurement device (not shown). In the case of k=r, referring back to FIG. 7, an r-th back voltage measurement line (not shown) is guided to the fixing plate connector 410-2$c$ (see FIG. 9) of the first fastening member 410+k (see FIG. 9) through a second clearance 130-7$t_2$ that is formed by the small width part 130-7$s$ of the left main frame 130+(r+1) and the small width part 130-7$s$ of the right main frame 130+(r+1).

Figure 10:
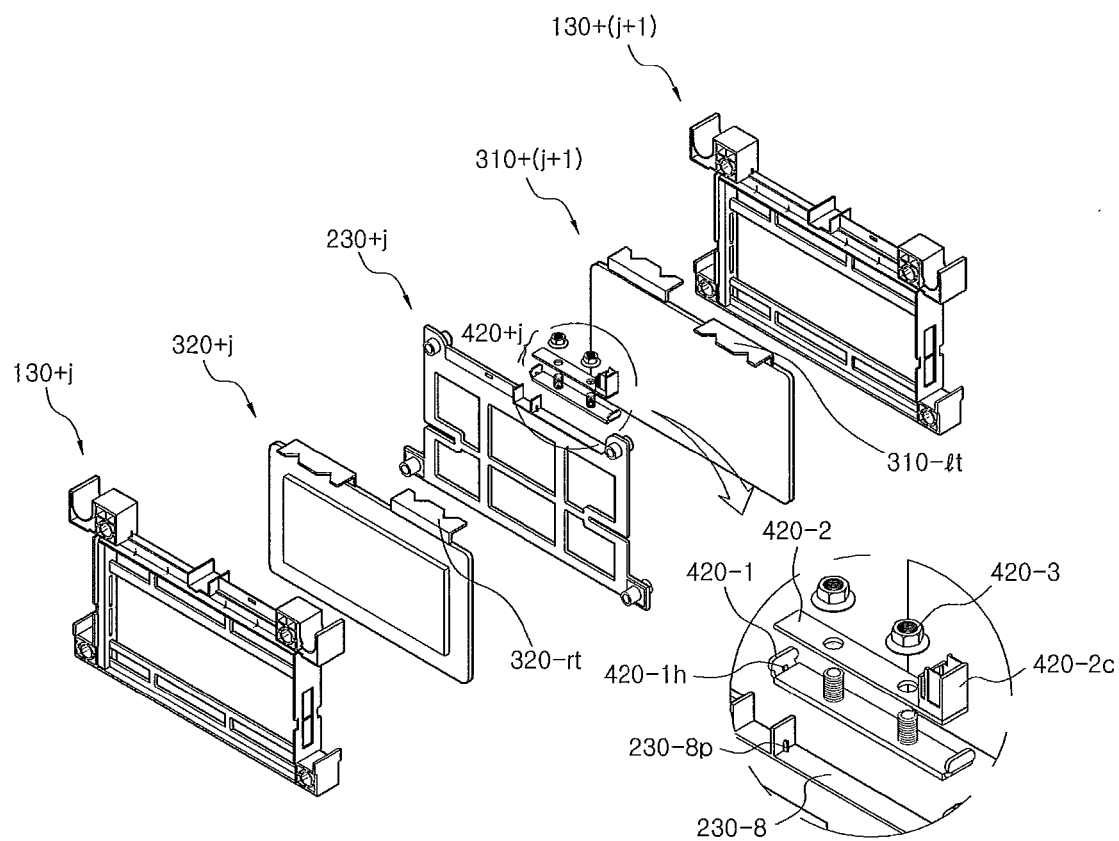
FIG. 10 is an exploded perspective view of the center frame and the first type lithium secondary battery and the second type lithium secondary battery that are fixed to be received in the center frame, according to Exemplary Embodiment 1.

FIG. 10 is an exploded perspective view of the center frame and the first type lithium secondary battery and the second type lithium secondary battery that are fixed to the center frame, according to Exemplary Embodiment 1.

Referring to FIG. 10, the right electrode tab 320-*rt* of the second type lithium secondary battery 320+j received in the left main frame 130+j and the left electrode tab 310-*lt* of the first type lithium secondary battery 310+(j+1) received in the right main frame 130+(j+1) are connected by the second fastening member 420+j to be conducted in series. Herein, j is a natural number from 1 to n, excluding m−1 and m.

Referring to FIG. 10, the second fastening member 420+j has a second lower fixing plate 420-1, a second upper fixing plate 420-2, and a second fastener 420-3. The second lower fixing plate 420-1, the second upper fixing plate 420-2, and the second fastener 420-3 may each be a conductor. The second lower fixing plate 420-1 is seated in the second tab support part 230-8 of the center frame 230+j and is provided with a seating groove 420-1*h* inserted into the seating protrusion 230-8*p*. The second lower fixing plate 420-1 is provided with a bolt (no reference numeral) that is protruded upwardly. The second upper fixing plate 420-2 is provided with a through hole (no reference numeral) through which the bolt (no reference numeral) of the second lower fixing plate 420-1 penetrates. The second upper fixing plate 420-2 is attached with a fixing plate connector 420-2*c*.

Referring to FIG. 10, the second fastener 420-3 is inserted into the end of the bolt (no reference numeral) of the second lower fixing plate 420-1. The right electrode tab 310-*rt* of the second type lithium secondary battery 320+j and the left electrode tab 320-*lt* of the first type lithium secondary battery 320+(j+1) are each inserted between the second lower fixing plate 420-1 and the second upper fixing plate 420-2, such that they are fastened by the second fastener 420-3 to be conducted to each other. In this case, the right electrode tab 310-*rt* of the second type lithium secondary battery 310+j and the left electrode tab 320-*lt* of the first type lithium secondary battery 310+(j+1) are vertically stacked one on another and the fastening groove 320-*rth* of the second type lithium secondary battery 320+j and the fastening groove 320-*lth* of the first type lithium secondary battery 310+(j+1) each enclose the bolt (no reference numeral) of the second lower fixing plate 420-1. Therefore, the contact area between the right electrode tab 310-*rt* of the second type lithium secondary battery 320+j and the left electrode tab 320-*lt* of the first type lithium secondary battery 310+(j+1) is increased, such that a conduction state is good and the fastening force is increased, thereby preventing the separation.

Referring to FIG. 10, the fixing plate connector 420-2*c* is attached to the second upper fixing plate 420-2, such that the right electrode tab 320-*rt* of the second type lithium secondary battery 320+j received in the left main frame 130+j and the left electrode tab 320-*lt* of the first type lithium secondary battery 320+(j+1) received in the left main frame 130+(j+1) are connected to be electrically conducted to each other. The fixing plate connector 420-2*c* is inserted with a connector (not shown) at a j-th front voltage measurement line (not shown) side connected to a voltage measurement device (not shown). Referring back to FIG. 7, a j-th front voltage measurement line (not shown) is guided to the fixing plate connector 420-2*c* of the second fastening member 420+j through a second clearance 130-6$t_2$ that is formed by the small width part 130-6*s* of the left main frame 130+j and the small width part 130-6*s* of the right main frame 130+(j+1).

Figure 11:
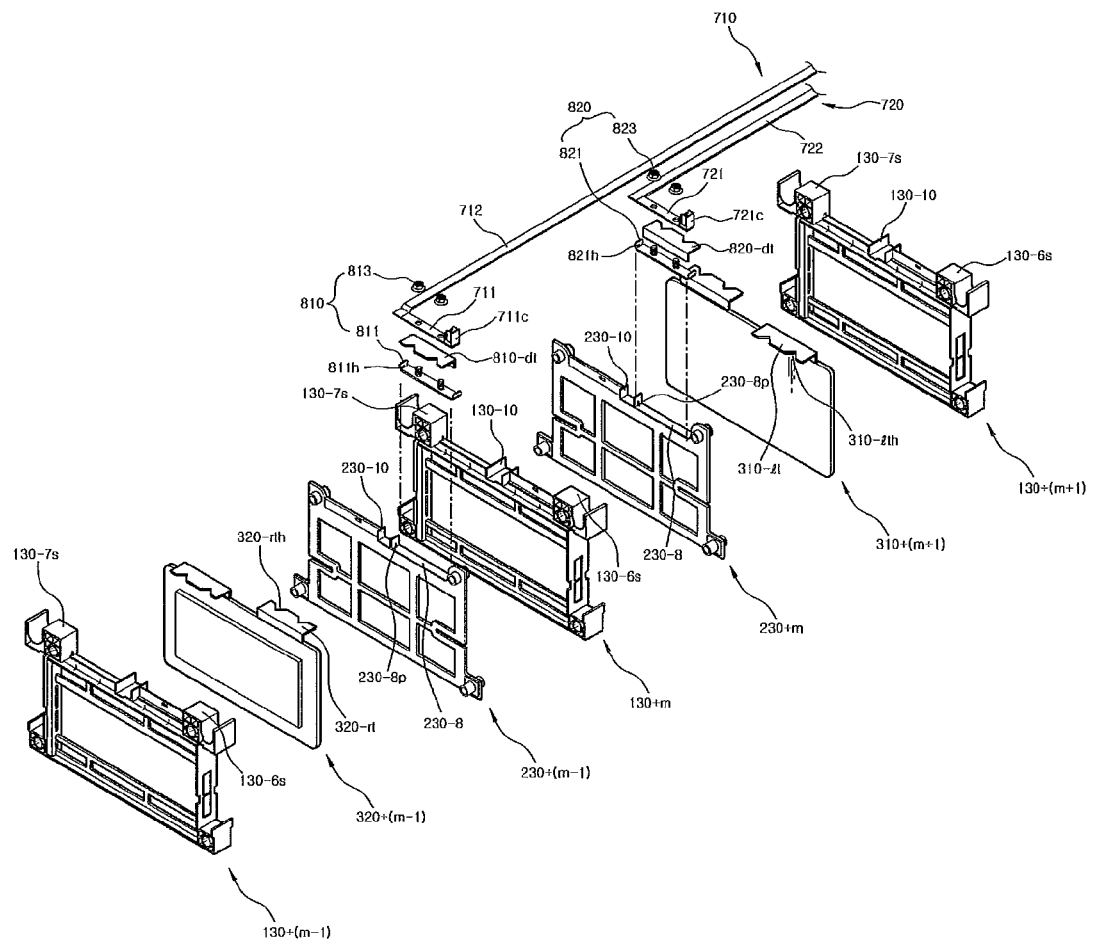
FIG. 11 is an exploded perspective view for explaining a fastening state of a left bus bar and a right bus bar according to Exemplary Embodiment 1.

FIG. 11 is an exploded perspective view for explaining a fastening state of a left bus bar and a right bus bar according to the first exemplary embodiment of the present invention.

Referring to FIG. 11, the right electrode tab 320-*rt* and a left bus bar 710 of the second type lithium secondary battery 320+(m−1) received in the right main frame 130+(m−1) mounted at the right among the left group main frames (no reference numeral) are connected by a left bus bar fastening member 810 to be conducted to each other.

Referring to FIG. 11, the left bus bar fastening member 810 has a left bus bar fixing plate 811 and a left bus bar fastener 813. A left bus bar fixing plate 811 and a left bus bar fastener 813 may each be a conductor. The left bus bar fixing plate 811 is seated in the second tab support part 230-8 of the center frame 230+(m−1) and is provided with a seating groove 811*h* inserted into the seating protrusion 230-8*p*. The left bus bar fixing plate 811 is provided with a bolt (no reference numeral) that is protruded upwardly.

Referring to FIG. 11, the left bus bar 710 includes a left bus bar fastening plate 711 and a left bus bar extension 712. The left bus bar fastening plate 711 is provided with a through hole (no reference numeral) through which the bolt (no reference numeral) of the left bus bar fixing plate 811 penetrates. The left bus bar fastening plate 711 is attached with a fastening plate connector 711*c*.

Referring to FIG. 11, the left bus bar fastener 813 is inserted into the end of the bolt (no reference numeral) of the left bus bar fixing plate 811. The right electrode tab 320-*rt* of the second type lithium secondary battery 320+(m−1) is inserted between the left bus bar fixing plate 811 and the left bus bar fastening plate 711, which is fixed by the left bus bar fastener 813. In this case, the fastening groove 320-*rth* of the second type lithium secondary battery 320+(m−1) encloses the bolt (no reference numeral) of the left bus bar fixing plate 811.

Meanwhile, referring to FIG. 11, a dummy electrode tab 810-*dt* is drawn and fixed between the left bus bar fixing plate 811 and the left bus bar fastening plate 711. The dummy electrode tab 810-*dt* is an electrode tab made of the same material as the left electrode tab 310-*lt* (see FIG. 9) of the first type lithium secondary battery 310+k (see FIG. 9). Therefore, the resistance between the left bus bar fixing plate 811 and the left bus bar fastening plate 711 may be controlled to be equal to the resistance between the second lower fixing plate 420-1 (see FIG. 10) and the second upper fixing plate 420-2 (see FIG. 10) of the second fastening member 420+j (see FIG. 10).

Referring to FIG. 11, the fastening plate connector 711*c* is attached to the left bus bar fastening plate 711 so that it is connected to the right electrode tab 320-*rt* and the dummy electrode tab 810-*dt* of the second type lithium secondary battery 320+(m−1) received in the right main frame 130+(m−1) of the left group main frame (no reference numeral) to be electrically conducted to each other. The fastening plate connector 711*c* is inserted with a connector (not shown) of an m−1-th front voltage measurement line (not shown) side connected to the voltage measurement device (not shown). The (m−1)-th front voltage measurement line (not shown) is guided to the fastening plate connector 711*c* of the left bus bar fastening plate 711 through the clearance formed by the small width part 130-6*s* of the right main frame 130+(m−1) and the small width part 130-6*s* of the specific main frame 130+m.

Meanwhile, referring to FIG. 11, the (m−1)-th back voltage measurement line (not shown) is guided to the fixing plate connector (not shown) of the first fastening member (not shown) seated in the right main frame 130+(m−1) through the clearance formed by the small width part 130-7*s* of the right main frame 130+(m−1) of the left group main frame (no reference numeral) and the small width part 130-7*s* of the specific main frame 130+m. Referring to FIG. 11, the left bus bar extension 712 is guided to the right through a second bus bar guide pipe 230-10 of the center frames 230+(m−1), 230+m, . . . and the first bus bar guide pipe 130-10 of the main frames 130+m, 130+(m+1), . . . . The left bus bar extension 712 is formed to be bent upwardly in the vicinity of one end connected to the left bus bar fastening plate 711. The front side wall of the second bus bar guide pipe 120-10 formed on the center frame 230+(m−1) seated with the left bus bar fastening plate 711 is removed, so that the left bus bar extension 712 is guided to the right through the second bus bar guide pipe 230-10 of the center frame 230+(m−1), 230+m, . . . and the first bus bar guide pipe 130-10 of the main frame 130+m, 130+(m+1), . . . . The left bus bar extension 712 is coated with an insulator.

Referring to FIG. 11, the left electrode tab 310-*lt* and the right bus bar 720 of the first type lithium secondary battery 310+(m+1) received in the right main frame 130+(m−1) mounted at the left among the right group main frames (no reference numeral) are connected by a right bus bar fastening member 820 to be conducted to each other.

Referring to FIG. 11, the right bus bar fastening member 820 has a right bus bar fixing plate 821 and a right bus bar fastener 823. The right bus bar fixing plate 821 and the right bus bar fastener 823 may each be a conductor. The right bus bar fixing plate 821 is seated in the second tab support part 230-8 of the center frame 230+m and is provided with a seating groove 821*h* inserted into the seating protrusion 230-8*p*. The right bus bar fixing plate 821 is provided with a bolt (no reference numeral) that is protruded upwardly.

Referring to FIG. 11, the right bus bar 720 includes the right bus bar fastening plate 721 and the right bus bar extension 722. The right bus bar fastening plate 721 is provided with a through hole (no reference numeral) through which the bolt (no reference numeral) of the right bus bar fixing plate 821 penetrates. The right bus bar fastening plate 721 is attached with a fastening plate connector 721*c*.

Referring to FIG. 11, the right bus bar fastener 823 is inserted into the end of the bolt (no reference numeral) of the right bus bar fixing plate 821. The left electrode tab 310-*lt* of the first type lithium secondary battery 310+(m−1) is inserted between the right bus bar fixing plate 821 and the right bus bar fastening plate 721, which is fixed by the right bus bar fastener 823. In this case, the fastening groove 310-*lth* of the first type lithium secondary battery 310+(m−1) encloses the bolt (no reference numeral) of the right bus bar fixing plate 821.

Meanwhile, referring to FIG. 11, a dummy electrode tab 821-*dt* is drawn and fixed between the right bus bar fixing plate 821 and the right bus bar fastening plate 721. The dummy electrode tab 820-*dt* is an electrode tab made of the same material as the right electrode tab 320-*rt* (see FIG. 9) of the second type lithium secondary battery 320+k (see FIG. 9). Therefore, the resistance between the right bus bar fixing plate 821 and the right bus bar fastening plate 721 may be controlled to be equal to the resistance between the second lower fixing plate 420-1 (see FIG. 10) and the second upper fixing plate 420-2 (see FIG. 10) of the second fastening member 420+j (see FIG. 10).

Referring to FIG. 11, the fastening plate connector 721*c* is attached to the right bus bar fastening plate 721 so that it is connected to the left electrode tab 310-*lt* and the dummy electrode tab 820-*dt* of the first type lithium secondary battery 310+(m−1) received in the left main frame 130+(m+1) of the right group main frame (no reference numeral) to be electrically conducted to each other. The fastening plate connector 721*c* is inserted with a connector (not shown) of an m+1-th front voltage measurement line (not shown) side connected to the voltage measurement device (not shown). The (m−1)-th front voltage measurement line (not shown) is guided to the fastening plate connector 721*c* of the right bus bar fastening plate 721 through the clearance formed by the small width part 130-6*s* of the left main frame 130+(m+1) of the right group main frame (no reference numeral) and the small width part 130-6*s* of the specific main frame 130+m.

Meanwhile, referring to FIG. 11, the (m+1)-th back voltage measurement line (not shown) is guided to the fixing plate connector (not shown) of the first fastening member (not shown) seated in the left main frame 130+(m+1) through the clearance formed by the small width part 130-7*s* of the left main frame 130+(m+1) of the right group main frame (no reference numeral) and the small width part 130-7*s* of the specific main frame 130+m.

Referring to FIG. 11, the right bus bar extension 722 is guided to the right through the second bus bar guide pipe 230-10 of the center frames 230+m, . . . and the first bus bar guide pipe 130-10 of the main frames 130+(m+1), . . . . The right bus bar extension 722 is disposed under the left bus bar extension 712. In this case, the left bus bar extension 712 is formed to be bent upwardly so that the right bus bar extension 722 is stacked under the left bus bar extension 712 while contacting the left bus bar extension 712. The front side wall of the second bus bar guide pipe 230-10 formed on the center frame 230+m seated with the right bus bar fastening plate 722 is removed, so that the right bus bar extension 722 is guided to the right through the second bus bar guide pipe 230-10 of the center frame 230+m, . . . and the first bus bar guide pipe 130-10 of the main frame 130+(m+1). The right bus bar extension 722 is coated with an insulator.

Figure 12:
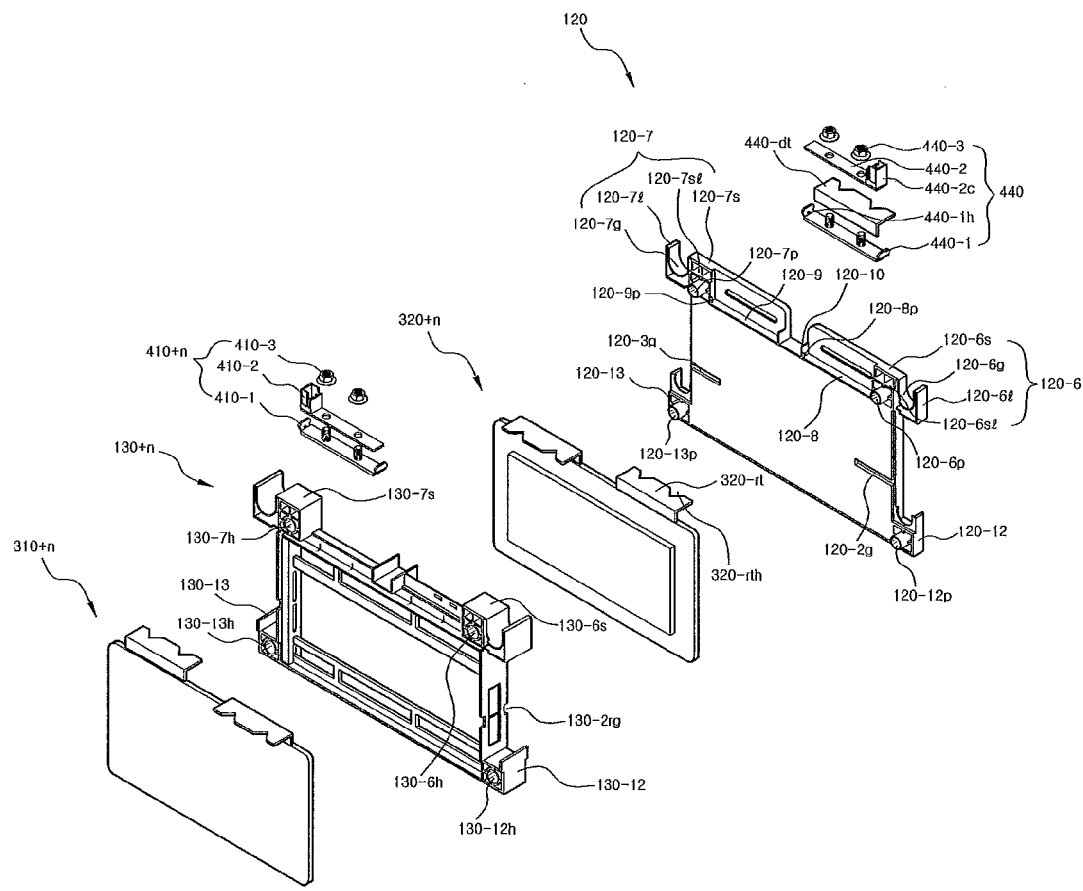
FIG. 12 is an exploded perspective view of a right end frame and a second type lithium secondary battery fixed to the right end frame, according to Exemplary Embodiment 1.

FIG. 12 is an exploded perspective view of the right end frame and the second type lithium secondary battery fixed to the right end frame, according to Exemplary Embodiment 1.

Referring to FIG. 12, the top end of the right end frame 120 is provided with a fourth exposed tab support part 120-8. The fourth tab support part 120-8 is formed in a linear type plate shape and each of the front side end and the back side end of the fourth tab support part 120-8 are protrudedly provided with a seating protrusion 120-8*p*.

Referring to FIG. 12, the top end of the right end frame 120 is provided with a fourth virtual tab support part 120-9 having the same shape as the fourth tab support part 120-8. Therefore, each of the front side end and the back side end of the fourth virtual tab support part 120-9 are protrudedly formed with virtual seating protrusions 120-9*p*. The fourth virtual tab support part 120-9 is formed on a horizontal extension line of the fourth tab support part 120-8.

Referring to FIG. 12, an "u"-letter fourth bus bar guide pipe 120-10 that may guide the bus bar extensions 712 and 722 is formed between the fourth tab support part 120-8 and the fourth virtual tab support part 120-9. The fourth tab support part 120-8 is formed at the front and the fourth virtual tab support part 120-9 is formed at the back, based on the fourth bus bare guide pipe 120-10.

Referring to FIG. 12, the front side end of the fourth tab support part 120-8 is provided with the front spacing protrusion 120-6 of which the front end is protruded forwardly. The seating groove 120-6*g* in which a linear type pipe may be seated in left and right directions is drawn in the front spacing protrusion from above. The front spacing protrusion 120-6 is configured to include the small width part 120-6*s* formed at the back end and the large width part 120-6*l* formed connecting with the small width part 120-6*s* and the left protrusion 120-6*sl* that is protrudedly formed left under the left of the small width part 120-6*s* while being spaced apart from the large width part 120-6*l*. The large width part 130-6*l* is protruded to the left of the small width part 130-6*s* to have a width larger than the small width part 120-6*s* and the left end of the large width part 120-6*l* and the left end of the left protrusion 120-6*sl* are disposed on a same plane. A portion of the seating groove 120-6*g* of the front spacing protrusion 120-6 is formed at the small width part 120-6s of the front spacing protrusion 120-6 and the rest thereof is formed at the large width part 120-6l of the front spacing protrusion 120-6. The front spacing protrusion 120-6 is provided with the hollow fastening protrusion 120-6p having a hollow shape that is protruded to the left of the left protrusion 120-6sl while penetrating through the small width part 120-6s and the left and right of the left protrusion 120-6sl.

Referring to FIG. 12, the back side end of the fourth virtual tab support part 120-9 is provided with the back spacing protrusion 120-7 of which the back end is protruded forwardly. The seating groove 120-7g in which a linear type pipe may be seated in left and right directions is drawn in the back spacing protrusion 120-7 from above. The back spacing protrusion 120-7 is configured to include the small width part 120-7s formed at the front end and the large width part 120-7l formed connecting with the small width part 120-7s and the left protrusion 120-7sl that is protrudedly formed left under the left of the small width part 120-7s while being spaced apart from the large width part 120-7l. The large width part 120-7l is protruded to the left of the small width part 120-7s to have a width larger than the small width part 120-7s and the left end of the large width part 120-7l and the left end of the left protrusion 120-7sl are disposed on the same plane. A portion of the seating groove 120-7g of the back spacing protrusion 120-7 is formed at the small width part 120-7s of the back spacing protrusion 120-7 and the remaining thereof is formed at the large width part 120-7l of the back spacing protrusion 120-7. The back spacing protrusion 120-7 is provided with the hollow fastening protrusion 120-7p having a hollow shape that is protruded to the left of the left protrusion 120-7sl while penetrating through the small width part 120-7s and the left and right of the left protrusion 120-7sl.

Referring to FIG. 12, the bottom end of the front outer surface of the right end frame 120 is protrudedly formed forwardly with the lower front coupling protrusion 120-12 and the bottom end of the back outer surface of the right end frame 120 is protrudedly formed backwardly with the lower back coupling protrusion 120-13. The lower front coupling protrusion 120-12 and the lower back coupling protrusion 120-13 are protrudedly formed left and right with the hollow fastening protrusions 120-12p and 120-13p, respectively, having a hollow shaft shape that penetrate through the left and right thereof. The hollow fastening protrusion 120-12p is formed to have the left end fastened to the right of the fastening hole 130-12h of the left main frame 130+n. Similarly, the hollow fastening protrusion 120-13p is formed to have the left end fastened to the right of the fastening hole 130-13h of the left main frame 130+n.

Referring to FIG. 12, the right end frame 120 is provided with a temperature sensor front insertion groove 120-2g and a temperature sensor back insertion groove 120-3g. The temperature sensor front insertion groove 120-2g is formed to be indented in the left surface of the right end frame and the front end thereof is formed to be opened at the front. The temperature sensor front insertion groove 120-2g may be inserted with the back temperature sensor (not shown) by allowing the opened front end thereof to be adjacent the right groove 130-2rg of the front vertical plate of the left main frame 130+n in order to form a through hole. The temperature measurement line (not shown) connected to the front temperature sensor (not shown) inserted into the temperature sensor front insertion groove 120-2g is guided through a clearance formed by the small width part 130-6s of the right main frame 130+n and the small width part 120-6s of the right end frame 120 to be drawn in the linear type guide pipe (not shown) seated in the seating groove 130-6g of the main frames 130+1, . . . , 130+r, 130+(r+1), . . . , 130+n. The description of the temperature sensor back insertion groove 120-3g and the temperature measurement line (not shown) connected to the back temperature sensor (not shown) inserted into the temperature sensor back insertion groove 120-3g depends on the description of the temperature sensor front insertion groove 120-2g and the temperature measurement line (not shown) connected to the front temperature sensor (not shown) inserted into the temperature sensor front insertion groove 120-2g.

Referring to FIG. 12, the right electrode tab 320-rt of the second type lithium secondary battery 320+n received in the right main frame 130+n is seated and fixed to the fourth tab support part 120-8 by a fourth fastening member 440.

Referring to FIG. 12, the fourth fastening member 440 has a fourth lower fixing plate 440-1, a fourth upper fixing plate 440-2, and a fourth fastener 440-3. The fourth lower fixing plate 440-1, the fourth upper fixing plate 440-2, and the fourth fastener 440-3 may each be a conductor. The fourth lower fixing plate 440-1 is seated in the fourth tab support part 120-8 of the right end frame 120 and is provided with a seating groove 440-1h inserted into the seating protrusion 120-8p. The fourth lower fixing plate 440-1 is provided with a bolt (no reference numeral) that is protruded upwardly. The fourth upper fixing plate 440-2 is provided with the through hole (no reference numeral) through which the bolt (no reference numeral) of the fourth lower fixing plate 440-1 penetrates. The fourth upper fixing plate 440-2 is attached with a fixing plate connector 440-2c.

Referring to FIG. 12, the fourth fastener 440-3 is inserted into the end of the bolt (no reference numeral) of the fourth lower fixing plate 440-1. The right electrode tab 320-rt of the second type lithium secondary battery 320+n is inserted into the fourth lower fixing plate 440-1 and the fourth upper fixing layer 440-2, which is fixed by the fourth fastener 440-3. In this case, the fastening groove 320-rth of the second type lithium secondary battery 320+n encloses the bolt (no reference numeral) of the fourth lower fixing plate 440-1.

Meanwhile, referring to FIG. 12, the dummy electrode tab 4-dt is drawn and fixed between the fourth lower fixing plate 440-1 and the fourth upper fixing plate 440-2. The dummy electrode tab 440-dt is an electrode tab made of the same material as the left electrode tab 310-lt of the first type lithium secondary battery 310+k (see FIG. 9). Therefore, the resistance between the fourth lower fixing plate 440-1 and the fourth upper fixing plate 440-2 of the fourth fastening member 440 may be controlled to be equal to the resistance between the first lower fixing plate 410-1 and the first upper fixing plate 410-2 of the first fastening member 410+n.

Referring to FIG. 12, the fastening plate connector 440-2c is attached to the fourth upper fixing plate 440-2 so that it is connected to the right electrode tab 320-rt and the dummy electrode tab 440-dt of the second type lithium secondary battery 320+n received in the right main frame 130+n to be conducted to each other. The fixing plate connector 440-2c is inserted with a connector (not shown) at an n-th front voltage measurement line (not shown) side connected to a voltage measurement device (not shown). The n-th front voltage measurement line (not shown) is guided to the fixing plate connector 440-2c of the fourth fastening member 440 through the clearance formed by the small width part 130-6s of the right main frame 130+n and the small width part 120-6s of the right end frame 120.

Meanwhile, referring to FIG. 12, the n-th back voltage measurement line (not shown) is guided to the fixing plate connector 410-2c of the first fastening member 410+n through the clearance formed by the small width part 130-7s of the right main frame 130+n and the small width part 120-7s of the right end frame 120.

Figure 13:
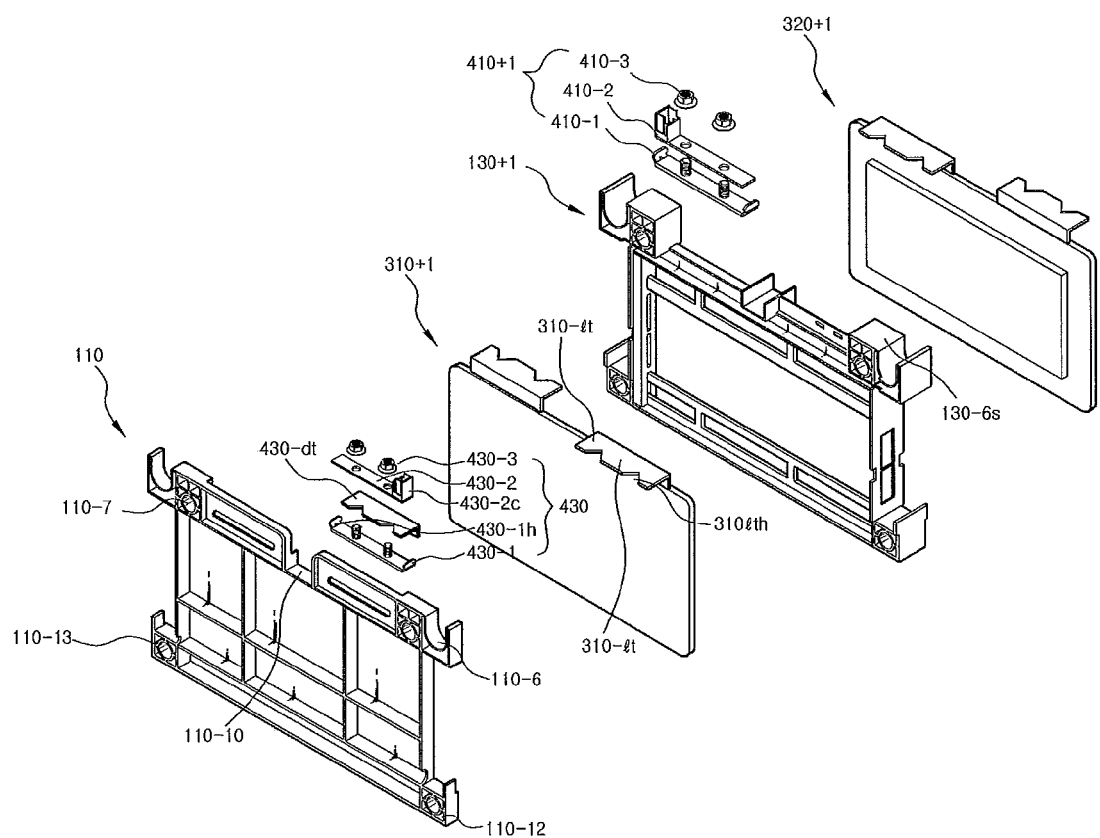
FIG. 13 is an exploded perspective view of a left end frame and the first type lithium secondary battery fixed to the left end frame, according to Exemplary Embodiment 1.

FIG. 13 is an exploded perspective view of the left end frame and the first type lithium secondary battery fixed to the left end frame, according to Exemplary Embodiment 1.

The left end frame 110 shown in FIG. 13 is a mirror image of the right end frame 120 shown in FIG. 12. Therefore, the top end of the left end frame 110 is provided with a third tab support part (not shown) exposed in a direction opposite to the fourth tab support part 120-8. Each of the front side end and the back side end of the third tab support part (not shown) is protrudedly provided with the seating protrusion (not shown), similar to the fourth tab support part 120-8. In addition, the top end of the left end frame 110 is provided with the third virtual tab support part (not shown) in a direction opposite to the fourth virtual tab support part 120-9. Each of the front side end and the back side end of the third virtual tab support part (not shown) is protrudedly provided with the virtual seating protrusion (not shown), similar to the fourth virtual tab support part 120-9. In addition, the left end frame 110 is provided with the "u"-letter third bus bar guide pipe 110-10. In addition, the top end of the left end frame 110 is provided with the front spacing protrusion 110-6 and the back spacing protrusion 110-7. In addition, the bottom end of the left end from 110 is provided with the lower front coupling protrusion 110-12 and the lower back coupling protrusion 110-13. Similarly, the left end frame 110 is provided with the temperature sensor front insertion groove (not shown) and the temperature sensor back insertion groove (not shown). The description thereof and the description of other components of the other left end frames 110 depend on the description of the right end frame 120.

Referring to FIG. 13, the left electrode tab 310-*lt* of the first type lithium secondary battery 310+1 received in the left main frame 130+1 is seated and fixed to the third tab support part (Not shown) by the third fastening member 430+0.

Referring to FIG. 13, the third fastening member 430+O has the third lower fixing plate 430-1, the third upper fixing plate 430-2, and the third fastener 430-3. The third lower fixing plate 430-1, the third upper fixing plate 430-2, and the third fastener 430-3 may each be a conductor. The third lower fixing plate 430-1 is seated in the third tab support part (not shown) of the left end frame 110 and is provided with a seating groove 430-1*h* inserted into the seating protrusion (not shown). The third lower fixing plate 430-1 is provided with a bolt (no reference numeral) that is protruded upwardly. The third upper fixing plate 430-2 is provided with a through hole (no reference numeral) through which the bolt (no reference numeral) of the third lower fixing plate 430-1 penetrates. The third upper fixing plate 430-2 is attached with the fixing plate connector 430-2*c*.

Referring to FIG. 13, the third fastener 430-3 is inserted into the end of the bolt (no reference numeral) of the third lower fixing plate 430-1. The left electrode tab 310-*lt* of the first type lithium secondary battery 310+1 is inserted into the third lower fixing plate 430-1 and the third upper fixing plate 430-2, which is fixed by the third fastener 430-3. In this case, the fastening groove 310-*lth* of the first type lithium secondary battery 310+1 encloses the bolt (no reference numeral) of the third lower fixing plate 430-1.

Meanwhile, referring to FIG. 13, the dummy electrode tab 3-*dt* is drawn and fixed between the third lower fixing plate 430-1 and the third upper fixing plate 430-2. The dummy electrode tab 430-*dt* is an electrode tab made of the same material as the right electrode tab 320-*rt* (see FIG. 9) of the second type lithium secondary battery 320+k (see FIG. 9).

Therefore, the resistance between the third lower fixing plate 430-1 and the third upper fixing plate 430-2 of the third fastening member 430+0 may be controlled to be equal to the resistance between the first lower fixing plate 410-1 and the first upper fixing plate 410-2 of the first fastening member 410+1.

Referring to FIG. 13, the fixing plate connector 430-2*c* is connected to the left electrode tap 310-*lt* and the dummy electrode tab 430-*dt* of the first type lithium secondary battery 310+1 received in the left main frame 130+1 to be electrically conducted to each other. The fixing plate connector 430-2*c* is inserted with a connector (not shown) at a 0-th front voltage measurement line (not shown) side connected to a voltage measurement device (not shown. The 0-th front voltage measurement line (not shown) is guided to the fixing plate connector 430-2*c* of the third fastening member 430+O through the clearance formed by the small width part 130-6*s* of the left main frame 130+1 and the small width part (no reference numeral) of the left end frame 110.

In Exemplary Embodiment 1, referring to FIG. 13, the voltage of the first type lithium secondary battery 310+1 received in the left main frame 130+1 may be measured using the 0-th voltage measurement line (not shown) and the 1-th back voltage measurement line (not shown), referring to FIG. 12, the voltage of the second type lithium secondary battery 320+n received in the right main frame 130+n using the n-th front voltage measurement line (not shown) and the n-th back voltage measurement line (not shown), referring to FIG. 10, the voltage of the second type lithium secondary battery (320+j) received in the left main frame 130+j among the main frames adjacent to each other may be measured using the j-th front voltage measurement line (not shown) and the j-th back voltage measurement line (not shown), and referring back to FIG. 10, the voltage of the first type lithium secondary battery 310+(j+1) received in the right main frame 130+(j+1) among the main frames adjacent to each other may be measured using the j-th front voltage measurement line (not shown) and the (j+1)-th back voltage measurement line (not shown). In this case, the resistor connected to the first type lithium secondary battery 310+1 received in the left main frame 130+1 and the second type lithium secondary battery 320+n received in the right main frame 130+n by the dummy electrode tabs 430-*dt* and 440-*dt* may have the same value as the resistor connected to the remaining lithium secondary battery, such that the voltage of each lithium secondary battery may be measured under the same conditions. Similarly, referring to FIG. 11, the voltage of the second type lithium secondary battery 320+(m−1) received in the right main frame 130+(m−1) of the left group main frame may be measured using the (m−1)-th front voltage measurement line (not shown) and the (m−1)-th back voltage measurement line (not shown) and the voltage of the first type lithium secondary battery 310+(m+1) received in the left main frame 130+(m+1) may be measured using the m-th front voltage measurement line (not shown) and the (m+1)-th back voltage measurement line (not shown). In this case, the resistor connected to the second type lithium secondary battery 320+(m−1) received in the right main frame 130+(m−1) of the left group main frame by the dummy electrode tabs 810-*dt* and 820-*dt* and the resistor connected to the first type lithium secondary battery 310+(m+1) received in the left main frame 130+(m+1) of the right group main frame may have the same value as the resistor connected to the remaining lithium secondary battery, such that the voltage of each lithium secondary battery may be measured under the same conditions.

Figure 14:
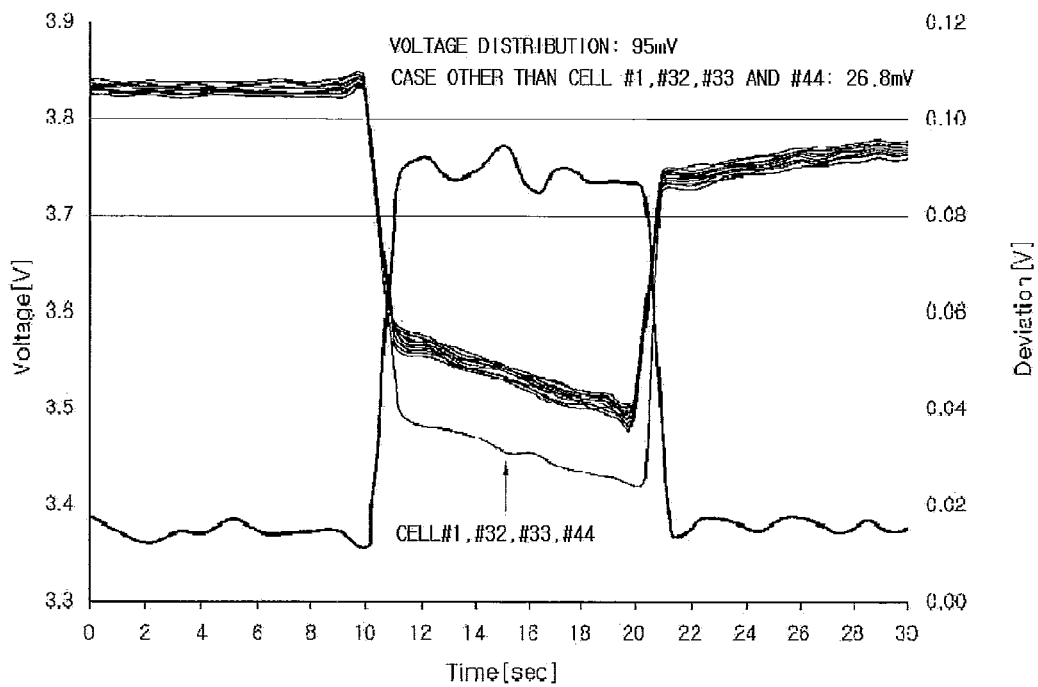
FIG. 14 is a voltage distribution graph in the case where a dummy electrode tab is not mounted.
Figure 15:
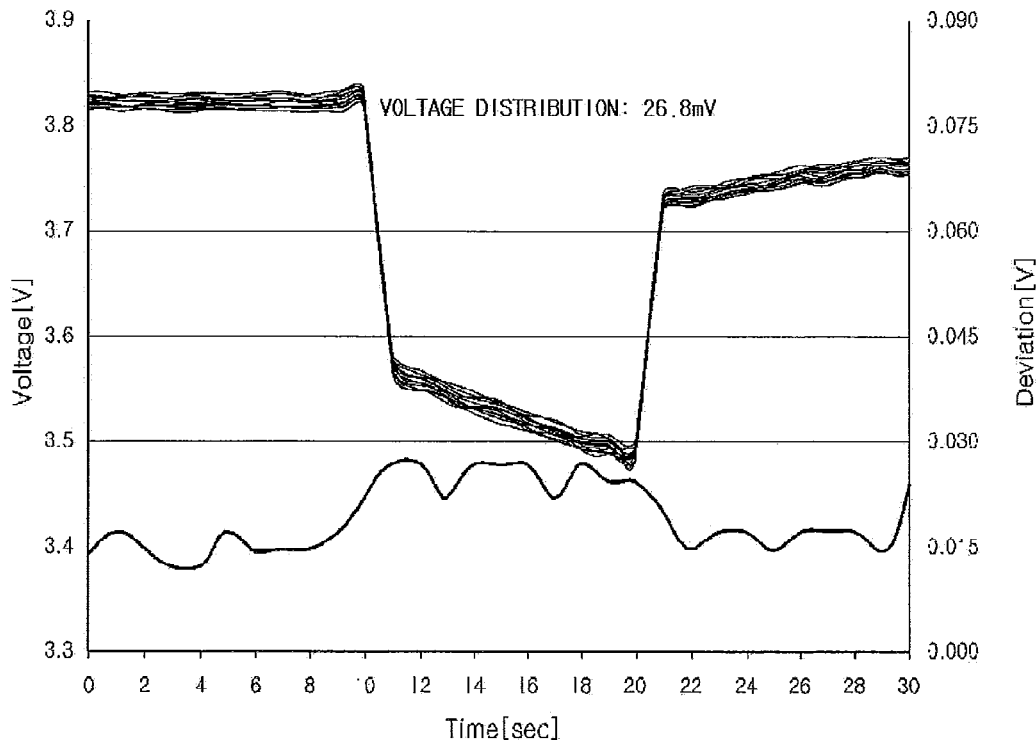
FIG. 15 is a voltage distribution graph in the case where a dummy electrode tab is mounted.

FIG. 14 is a voltage distribution graph when the dummy electrode tab is not mounted and FIG. 15 shows a voltage distribution graph when the dummy electrode tab is mounted.

When the left group main frame is 16 and the right group main frame is 6, if the stacked lithium secondary battery is referred to as cell #1, cell #2, . . . , cell#32, cell#33, . . . , cell#33, . . . , cell#43, cell#44 from the left, FIG. 14 shows a voltage distribution graph when the dummy electrode tab is not stacked in the left electrode tab of cell #1, the right electrode tab of cell #32, and the left electrode tab of cell #33, and the right electrode tab of cell #44, respectively, and FIG. 15 shows a voltage distribution graph when the dummy electrode tab is stacked in the left electrode tab of cell #1, the right electrode tab of cell #32, and the left electrode tab of cell #33, and the right electrode tab of cell #44, respectively.

Referring to FIG. 14, the voltage reduction width of cell#1, cell#32, cell#33, and cell#44 is relatively larger than that of the remaining cells at the time of instantaneous discharge. In this case, it can be appreciated that the voltage distribution value may be about 95 mV. However, even in this case, it was confirmed that the voltage distribution value other than cell#1, cell#32, cell#33, and cell#44 is about 26.8 mV.

Referring to FIG. 15, the voltage reduction width of cell#1, cell#32, cell#33, and cell#44 is similar to that of the remaining cells at the time of instantaneous discharge. In this case, it can be appreciate that the voltage distribution value may be about 26.8 Mv.

That is, referring to FIGS. 14 and 15, resistors are uniformly connected to each lithium secondary battery when the dummy electrode tab is mounted, such that the voltage distribution is reduced.

Figure 16:
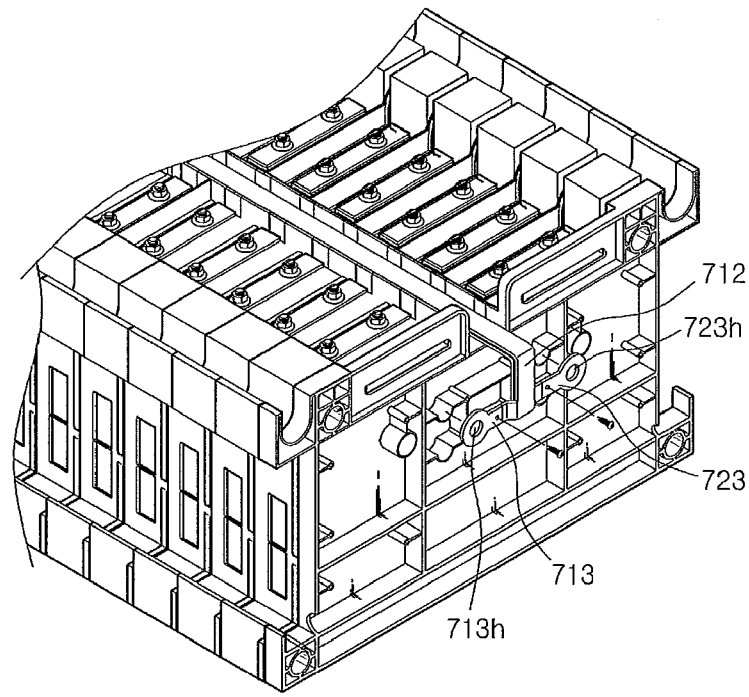
FIG. 16A is a state diagram before the left bus bar and the right bus bar are fastened to the right end frame.
FIG. 16B is a state diagram where the left bus bar and the right bus bar are fastened to the right end frame.
Figure 16:
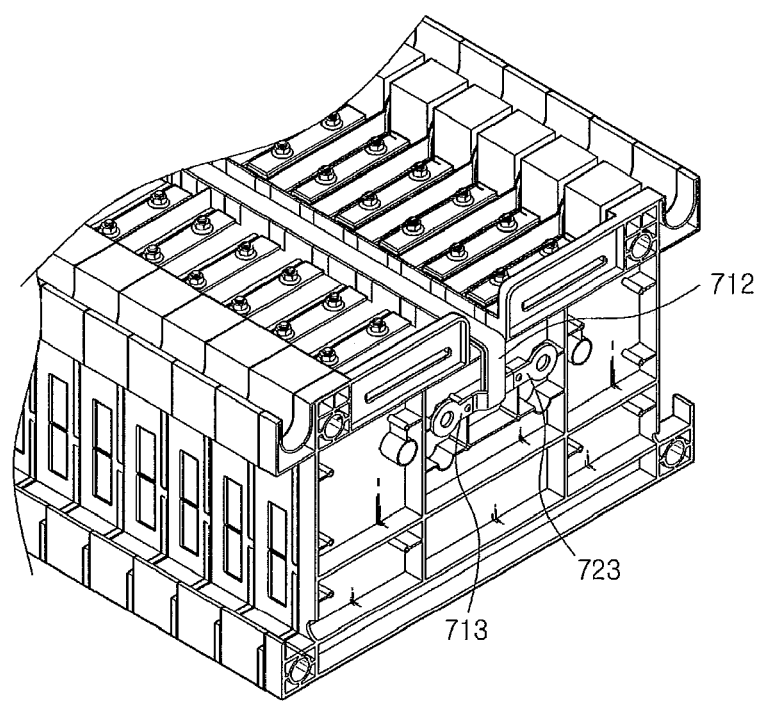

FIG. 16A shows a state before the left bus bar 710 and the right bus bar 720 are fastened to the right end frame 120 and FIG. 16B shows a state where the left bus bar 710 and the right bus bar 720 are fastened to the right end frame 120.

Referring to FIG. 16A, the other end of the left bus extension 712 is formed to be bent downwardly. The other end of the left bus extension 712 is provided with the left bus bar fastening tab 713 bent forwardly. The left bus bar fastening tab 713 is provided with the fastening groove for fastening to a first connection tab (not shown) connected to an overcurrent circuit breaker (not shown) and a fixing screw groove for fixing the left bus bar fastening tab 713 to the right end frame 120.

Referring to FIG. 16A, the other end of the right bus extension 722 (see FIG. 11) is formed to be bent downwardly. The other end of the right bus extension 722 (see FIG. 11) is provided with the right bus bar fastening tab 723 to be bent backwardly. The right bus bar fastening tab 723 is provided with a fixing screw groove (no reference numeral) that fixes the fastening groove 723h for fastening to a second connection tab (not shown) connected to the overcurrent circuit breaker (not shown) and a fixing screw groove (not shown) for fixing the right bus bar fastening tab 723 to the right end frame 120. The left bus bar fastening tab 713 and the right bus bar fastening tab 723 are connected to each other in series through the overcurrent circuit breaker (not shown). The overcurrent circuit breaker (not shown) is an apparatus for breaking a circuit when current having a predetermined magnitude or more, which may generally be a fuse. Therefore, when overcurrent flow in the lithium secondary battery received in the left group main frame and the right group main frame, the current is broken by the overcurrent circuit breaker (not shown), such that the risk caused due to the overcurrent at the time of charge and discharge is removed.

Figure 17:
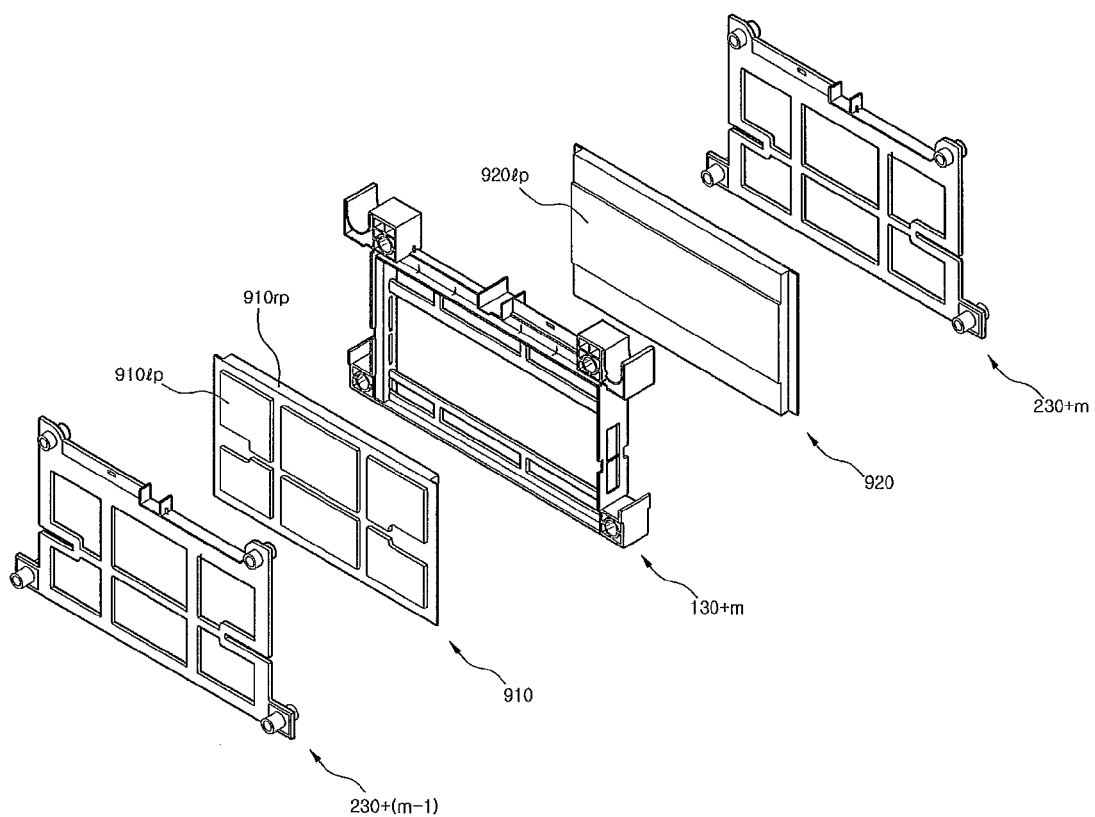
FIG. 17 is an exploded perspective view of a specific main frame and a thermal pad received in the specific main frame.

FIG. 17 is an exploded perspective view of a thermal pad received in the specific main frame 130+m and the specific main frame 130+m.

Referring to FIG. 17, the left receiving part LS (see FIG. 5) of the specific main frame 130+m receives a left thermal pad 910 and the right receiving part RS (see FIG. 6) receives a right thermal pad 920. The thermal pads 910 and 920 are made of a material of which the shape is freely changed by an external force, such as rubber clay. Therefore, when the left thermal pad 910 is received in the left receiving part LS (see FIG. 5) of the specific main frame 130+m, the left surface of the left thermal pad 910 is protrudedly provided with a left protrusion 9101p and the right surface thereof is protrudedly formed with a right protrusion 910rp. The left protrusion 9101p is formed in plural. Each left protrusion 9101p contacts the right surface of the second type lithium secondary battery 320+(m−1) (see FIG. 11) received in the right main frame 130+(m−1) (see FIG. 11) of the left group main frame through each lattice hole (no reference numeral) formed on the center frame 230+(m−1). The right protrusion 910rp is formed at the intermediate portion of the specific main frame 130+m to be drawn in the left and right communication hole (no reference numeral) communicating the left receiving part LS (see FIG. 5) with the right receiving part RS (see FIG. 6).

Referring to FIG. 17, when the right thermal pad 920 is received in the right receiving part RS (see FIG. 6), the left surface of the right thermal pad 920 is protrudedly provided with the left protrusion 920lp and the right surface thereof is protrudedly provided with the right protrusion (not shown). The right protrusion (not shown) is formed in plural. Each right protrusion (not shown) contacts the left surface of the first type lithium secondary battery 310+(m+1) (see FIG. 11) received in the left main frame 130+(m+1) (see FIG. 11) of the right group main frame through each lattice hole (no reference numeral) formed on the center frame 230+m. The left protrusion 920lp is formed at the intermediate portion of the specific main frame 130+m to be drawn in the left and right communication holes (no reference numeral) communicating the left receiving part LS (see FIG. 5) with the right receiving part RS (see FIG. 6), thereby contacting the right protrusion 910rp of the left thermal pad 910. That is, the left thermal pad 910 and the right thermal pad 920 become a heat transfer path between the second type lithium secondary battery 320+(m−1) received in the right main frame 130+(m−1) (see FIG. 11) of the left group main frame and the first type lithium secondary battery 310+(m+1) (see FIG. 11) received in the left main frame 130+(m+1) (see FIG. 11) of the right group main frame. Therefore, the reduction in temperature of the second type lithium secondary battery 320+(m−1) received in the right main frame 130+(m−1) (see FIG. 11) of the left group main frame and the first type lithium secondary battery 310+(m+1) (see FIG. 11) received in the left main frame 130+(m+1) (see FIG. 11) of the right group main frame is reduced, such that the temperature difference with the lithium secondary battery received in the remaining main frame is reduced.

FIG. 18A shows the temperature graph measured by the temperature sensor when the thermal pad is not received in the specific main frame and FIG. 18B shows the temperature graph measured by the temperature sensor when the thermal pad is received in the specific main frame.

Figure 18:
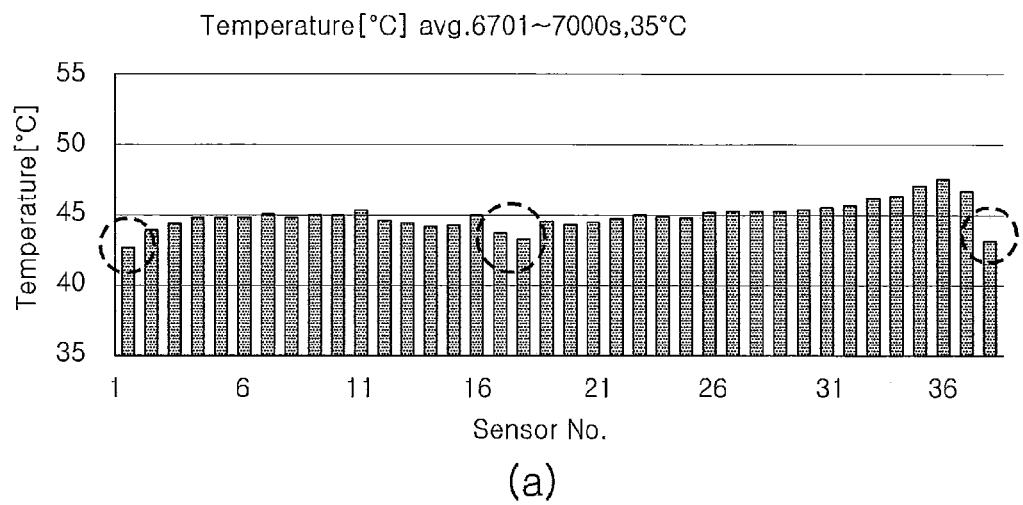
FIG. 18A is a temperature graph measured by a temperature sensor in the case where the thermal pad is not received in the specific main frame.
FIG. 18B is a temperature graph measured by the temperature sensor in the case where the thermal pad is received in the specific main frame.
Figure 18:
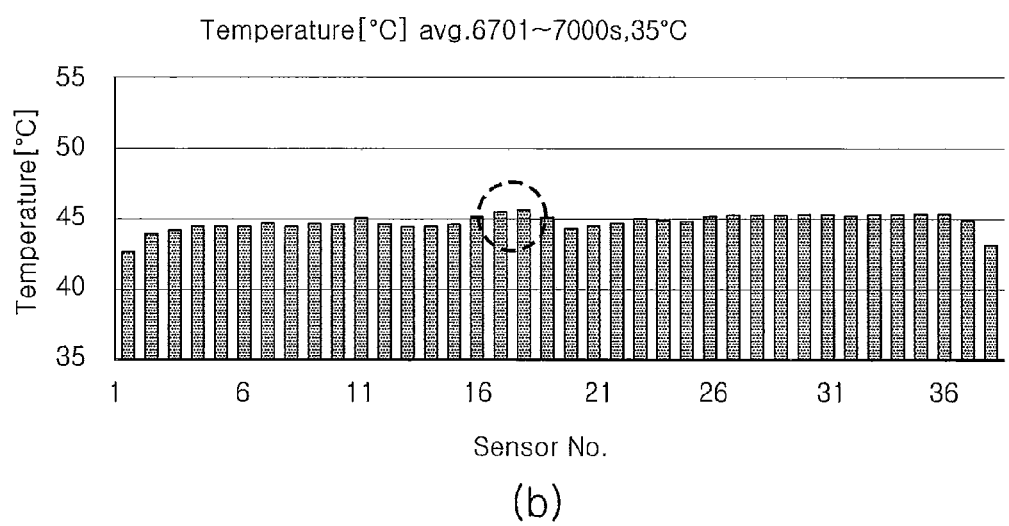

Referring to FIGS. 18 A and B, Arabic numeral 1 of a horizontal axis represents the temperature sensor mounted in the temperature sensor front insertion groove or the temperature sensor back insertion groove of the left end frame, Arabic numeral 2 represents the temperature sensor mounted in the temperature sensor front insertion groove or the temperature sensor back insertion groove of the center frame on the left, . . . , Arabic numeral 17 represents the temperature sensor mounted in the temperature sensor front insertion groove or the temperature sensor back insertion groove of the sixteenth center frame on the left, Arabic numeral 18 represents the temperature sensor mounted in the temperature sensor front insertion groove or the temperature sensor back insertion groove of the seventeenth center frame on the left, . . . , Arabic numeral 38 represents the temperature sensor mounted in the temperature sensor front insertion groove or the temperature sensor back insertion groove of the right end frame. FIG. 18A shows a graph when the specific main frame not receiving the lithium secondary battery is the seventeenth main frame on the left. Referring to FIG. 18A, it is confirmed that the temperature measured by the temperature sensor mounted in the temperature sensor front insertion groove or the temperature sensor back insertion groove of the left end frame, the temperature measured by the temperature sensor mounted in the temperature sensor front insertion groove or the temperature sensor back insertion groove of the sixteenth center frame on the left, the temperature measured by the temperature sensor mounted in the temperature sensor front insertion groove or the temperature sensor back insertion groove of the seventeenth center frame on the left, and the temperature measured by the temperature sensor mounted in the temperature sensor front insertion groove or the temperature sensor back insertion groove of the right end frame are relatively low. FIG. 18B shows a graph obtained in the state where the thermal pad is mounted in the specific main frame at the stacking structure obtaining the graph of FIG. 18A. Referring to FIG. 18B, it is confirmed that the temperature measured by the temperature sensor mounted in the temperature sensor front insertion groove or the temperature sensor back insertion groove of the sixteenth center frame on the left and the temperature of the temperature sensor front insertion groove or the temperature sensor back insertion groove of the seventeenth center frame on the left are relatively high, as compared to FIG. 18A.

In view of the performance and lifespan of the lithium secondary battery in the center frame, it is preferable to uniformly distribute the temperature of each of the lithium secondary battery received in the left group main frame and the right group main frame. In the case of Exemplary Embodiment 1, there is an advantage in that the lifespan of each of the lithium secondary battery is expanded and the performance thereof is excellent, as compared to when the left thermal pad 910 and the right thermal pad 920 are not received in the specific main frame 130+m.

Figure 19:
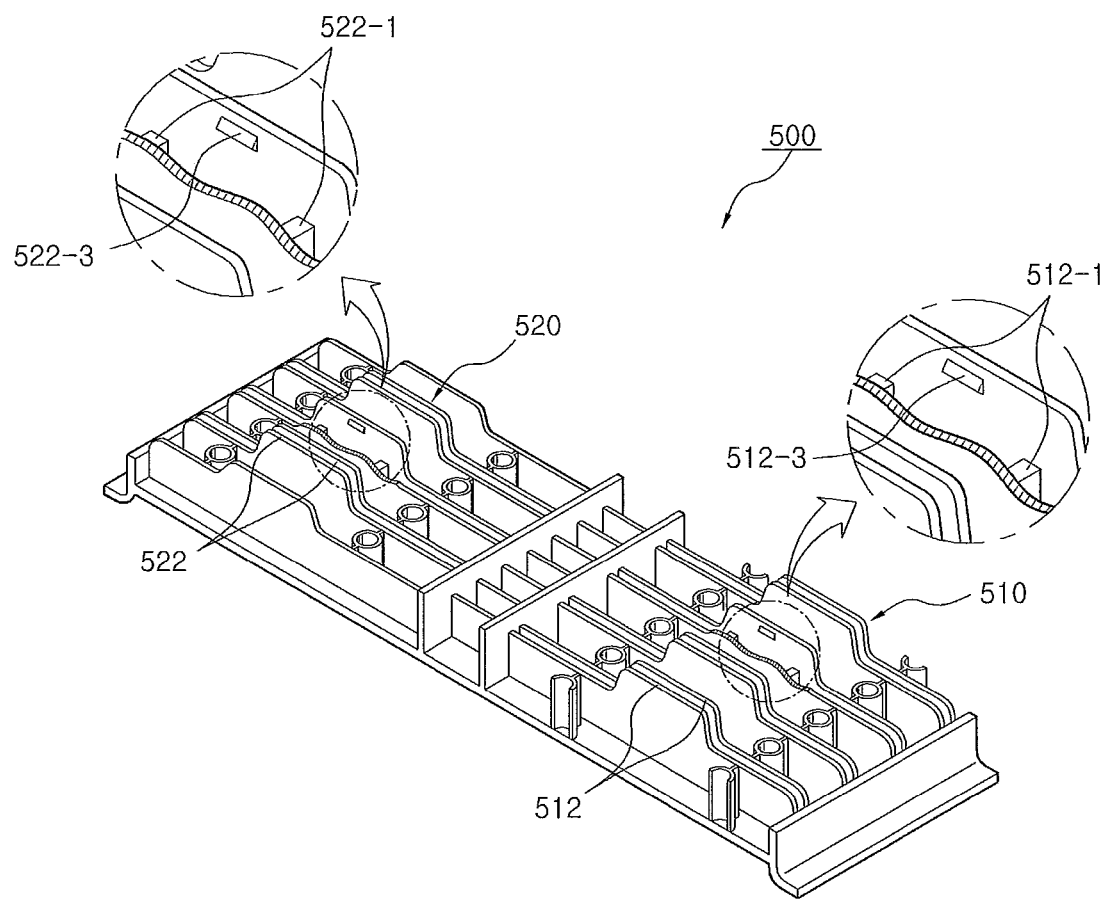
FIG. 19 shows a rear perspective view of a protective cover.

FIG. 19 shows a rear perspective view of a protective cover 500. The rear of the protective cover 500 includes a first protective cover part 510 seated and fixed to a first protective cover fixing part 130-9 and a second protective cover part 520 seated and fixed to a second protective cover fixing part 230-9.

Referring to FIG. 19, the first protective cover part 510 includes a first fastening plate 512 formed of two plates that are extrapolated into the first protective cover fixing part 130-9. A supporter 512-1 supported to the top end of the first protective cover fixing part 130-9 is provided between two plates configuring the first fastening plate 512. In addition, any one of the two plates configuring the first fastening plate is provided with a fastening protrusion 512-3 that is inserted into the fastening hole 130-9h of the first protective cover fixing part 130-9.

Similarly, referring to FIG. 19, the second protective cover part 520 includes a second fastening plate 522 and the fastening plate 522 is provided with a supporter 522-1 and a fastening protrusion 522-3.

The protective cover 500 is seated and fixed to the first protective cover fixing part 130-9 and the second protective cover fixing part 230-9, such that the first fastening member 410+k (see FIG. 9) seated in the first tab support part 130-8 (see FIG. 9) and the second fastening member 420+j (see FIG. 10) seated in the second tab support part 230-8 (see FIG. 10) are protected while not being exposed to the outside.

Meanwhile, in Exemplary Embodiment 1, each of the front vertical plate and the back vertical plate of each main frame is provided with each air hole, such that air flows between the first type lithium secondary battery and the second type lithium secondary battery received in each main frame other than the specific main frame, thereby preventing the lithium secondary battery from being damaged due to heat generated during the charging and discharging process. Exemplary Embodiment 1 is not limited thereto.

When the receiving part that does not receive the lithium secondary battery is referred to as the specific group receiving part, the specific group receiving part may be the right receiving part of the left main frame and the left receiving part of the right main frame among the main frames adjacent to each other. That is, in the case of Exemplary Embodiment 1, the specific group receiving part may be the right receiving part of the left main frame and the left receiving part of the right main frame among the main frames adjacent to each other rather than the left main frame and the right main frame of the specific main frame 130+m.

In this case, the first type lithium secondary battery is received in each left receiving part of the left group receiving part disposed to be adjacent to the left of the specific group receiving part and each left receiving part of the right group receiving part disposed to be adjacent to the right of the specific group receiving part and the second type lithium secondary battery is received in each left receiving part of the left group receiving part and each left receiving part of the right group receiving part. The left group receiving part is configured of the plurality of left receiving parts and the plurality of right receiving parts disposed to be adjacent to the left of the specific group receiving part and the right group receiving part is configured of the plurality of right receiving parts and the plurality of left receiving parts disposed to be adjacent to the right of the specific group receiving part.

In this case, the left bus bar fastening member is seated in the first tab support part disposed between the left group receiving part and the specific group receiving part and the right bus bar fastening member is seated in the first tab support part disposed between the specific group receiving part and the right group receiving part.

In this case, the thermal pad is received in the right receiving part and the left receiving part configuring the specific group receiving part, which becomes a heat transfer path between the first type lithium secondary battery received in the right receiving part of the left group receiving part and the second type lithium secondary battery received in the left receiving part of the right group receiving part.

Other matters are omitted since the specific group receiving part may be derived from the case where the specific group receiving part is the specific main frame 130+m.

Exemplary Embodiment 2

Exemplary Embodiment 2 is another exemplary embodiment of a lithium secondary battery unit set with a bus bar according to the present invention. Hereinafter, the case where the specific group receiving part is the specific main frame 130+m will be described.

Figure 20:
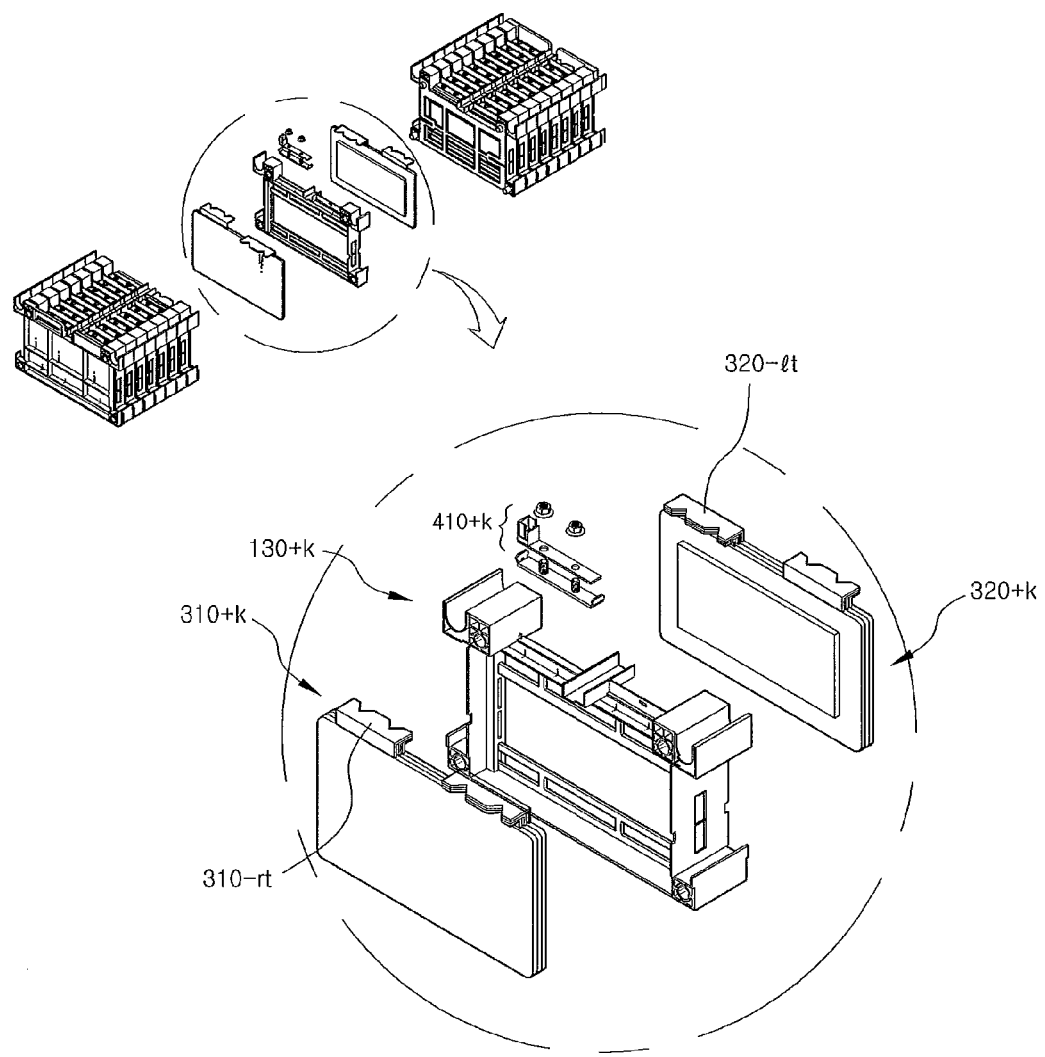
FIG. 20 is an exploded perspective view of a main frame and a lithium secondary battery received in the main frame, according to Exemplary Embodiment 2.

FIG. 20 is an exploded perspective view of the main frame and the lithium secondary battery received in the main frame, according to Exemplary Embodiment 2.

Unlike Exemplary Embodiment 1, referring to FIG. 20, in the case of Exemplary Embodiment 2, the plurality of first type lithium secondary batteries 310+k are received in the left receiving part of the main frame 130+k and the plurality of second type lithium secondary batteries 320+k are received in the right receiving part of the main frame 130+k. The first type lithium secondary battery 310+k and the second type lithium secondary battery 320+k may each be received by x number. Similar to Exemplary Embodiment 1, even in the case of Exemplary Embodiment 2, the specific main frame disposed between the left group main frame and the right group main frame receives the thermal pad, instead of the lithium secondary battery.

Figure 21:
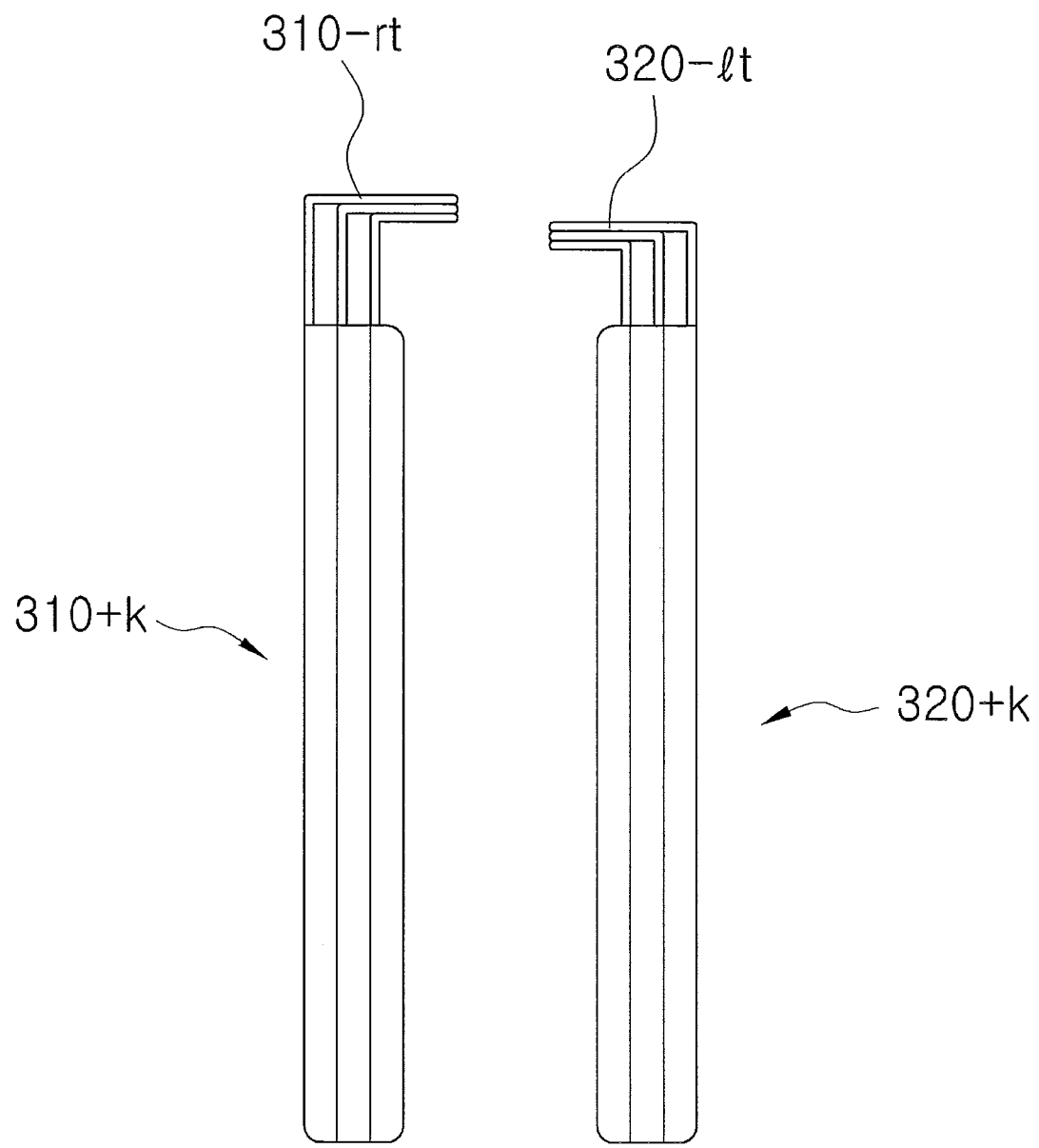
FIG. 21 is a front view of a stacking state of a right electrode tab of the first type lithium secondary battery and a left electrode tab of the second type lithium secondary battery received in the main frame.

FIG. 21 is a front view of a stacking state of the right electrode tab 310-*rt* of the first type lithium secondary battery 310+k received in the main frame 130+k (see FIG. 20) and the left electrode tab 320-*lt* of the second type lithium secondary battery 320+k. Referring to FIGS. 21 and 20, each of the right electrode tabs 310-*rt* of the first type lithium secondary battery 310+k is vertically stacked to be conducted in parallel and each of the left electrode tabs 320-*lt* of the second type lithium secondary battery 320+k is vertically stacked to be conducted to each other in parallel.

Figure 22:
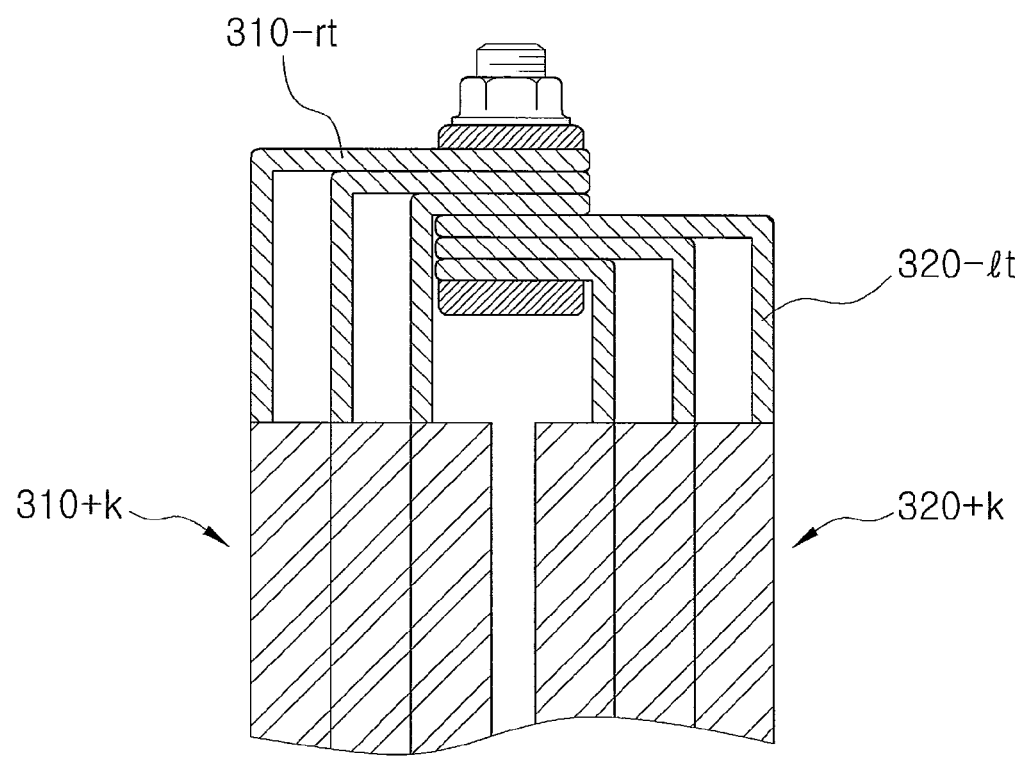
FIG. 22 is a front view of a stacking state of the right electrode tab of the first type lithium secondary battery and the left electrode tab of the second type lithium secondary battery received in the main frame.

FIG. 22 is a front view of a fastening state of the right electrode tab 310-*rt* of the first type lithium secondary battery 310+k received in the main frame 130+k (see FIG. 20) and the left electrode tab 320-*lt* of the second type lithium secondary battery 320+k.

Referring to FIGS. 22 and 20, the right electrode tab 310-*rt* of the first type lithium secondary battery 310+k received in the main frame 130+k and the left electrode tab 320-*lt* of the second type lithium secondary battery 320+k received in the main frame 130+k are connected by the first fastening member 410+K to be conducted in series. Similar to Exemplary Embodiment 1, the right electrode tab 310-*rt* and the left electrode tab 320-*lt* may be provided with the fastening hole (not shown), instead of the fastening groove (not shown).

Although not shown in the drawings, similarly, the right electrode tabs of the second type lithium secondary battery received in the left main frame among the main frames disposed to be adjacent to each other of the left group main frame are vertically stacked to be conducted to each other in parallel and the left electrode tabs of the first type lithium secondary battery received in the right main frame are vertically stacked to be conducted to each other in parallel. Similarly, they are connected by the second fastening member to be conducted in series.

Although not shown in the drawings, even in the case of Exemplary Embodiment 2, the dummy electrode tab is drawn and fixed between the fourth lower fixing plate and the fourth upper fixing plate of the fourth fastening member that fixes the right electrode tab of the second type lithium secondary battery received in the right main frame of the right group main frame. The number of dummy electrode tabs fixed between the fourth lower fixing plate and the fourth upper fixing plate of the fourth fastening member is equal to the number of first type lithium secondary batteries and the number of second type lithium secondary batteries received in each main frame other than the specific main frame of Exemplary Embodiment 1 and these dummy electrode tabs are each fixed to be stacked vertically.

Similarly, in the case of Exemplary Embodiment 2, the dummy electrode tab is drawn and fixed between the third lower fixing plate and the third upper fixing plate of the third fastening member that fixes the left electrode tab of the first type lithium secondary battery received in the left main frame of the left group main frame. The number of dummy electrode tabs fixed between the third lower fixing plate and the third upper fixing plate of the third fastening member is equal to the number of first type lithium secondary batteries and the number of second type lithium secondary batteries received in each main frame other than the specific main frame of Exemplary Embodiment and these dummy electrode tabs are each fixed to be stacked vertically. In addition, in the case of Exemplary Embodiment 2, the dummy electrode tab is drawn and fixed between the left bus bar fixing plate and the left bus bar fastening plate that fixes the right electrode tab of the second type lithium secondary battery received in the right main frame of the left group main frame. The number of dummy electrode tabs fixed between the left bus bar fixing plate and the left bus bar fastening plate is equal to the number of first type lithium secondary batteries and the number of second type lithium secondary batteries received in each main frame other than the specific main frame of Exemplary Embodiment 1 and these dummy electrode tabs are each fixed to be stacked vertically. Similarly, in the case of Exemplary Embodiment 2, the dummy electrode tab is drawn and fixed between the right bus bar fixing plate and the right bus bar fastening plate that fixes the left electrode tab of the first type lithium secondary battery received in the left main frame of the right group main frame. The number of dummy electrode tabs fixed between the right bus bar fixing plate and the right bus bar fastening plate is equal to the number of first type lithium secondary batteries and the number of second type lithium secondary batteries received in each main frame other than the specific main frame of Exemplary Embodiment 1 and these dummy electrode tabs are each fixed to be stacked vertically.

Therefore, in the case of Exemplary Embodiment 2, each main frame other than the specific main frame is mounted with the plurality of lithium secondary batteries. The mounting structure of the lithium secondary battery according to Exemplary Embodiment 2 has an xP(n−1)s type. In this case, P represents that the lithium secondary batteries of one set received in the same receiving part of the same main frame are connected to each other in parallel, x represents the number of lithium secondary batteries received in the same receiving part of the same main frame and connected to each other in parallel, S represent that the lithium secondary batteries received in different receiving parts are connected to each other in series, and (n−1) represents the number of battery sets connected to each other in series. In the case of 2P50S, it shows that 50 battery sets are connected to each other in series and each battery set has two lithium secondary batteries connected in parallel. That is, a total number of main frames is 26 and a total number of receiving parts (the combined total of left receiving parts and right receiving parts) is 52. The two lithium secondary batteries connected in parallel are received in the receiving part of each main frame other than the specific main frame receiving the thermal pad and a total number of lithium secondary batteries is 100.

Therefore, Exemplary Embodiment 2 may change capacity by changing x and may easily change voltage by changing (n−1).

In the case of Exemplary Embodiment 2, the width between the left ends and the right ends of each main frame is widened as the number of first type lithium secondary batteries and the number of second type lithium secondary batteries received in each main frame is increased.

Exemplary Embodiment 2 is the same as Exemplary Embodiment 1 except for the difference due to the case where the number of the first type lithium secondary batteries and the number of the second type lithium secondary batteries received in each main frame other than the specific main frame are x and therefore, the following description will be omitted.

Exemplary Embodiment 3

Exemplary Embodiment 3 is another exemplary embodiment of a lithium secondary battery unit set with a bus bar according to the present invention.

Figure 23:
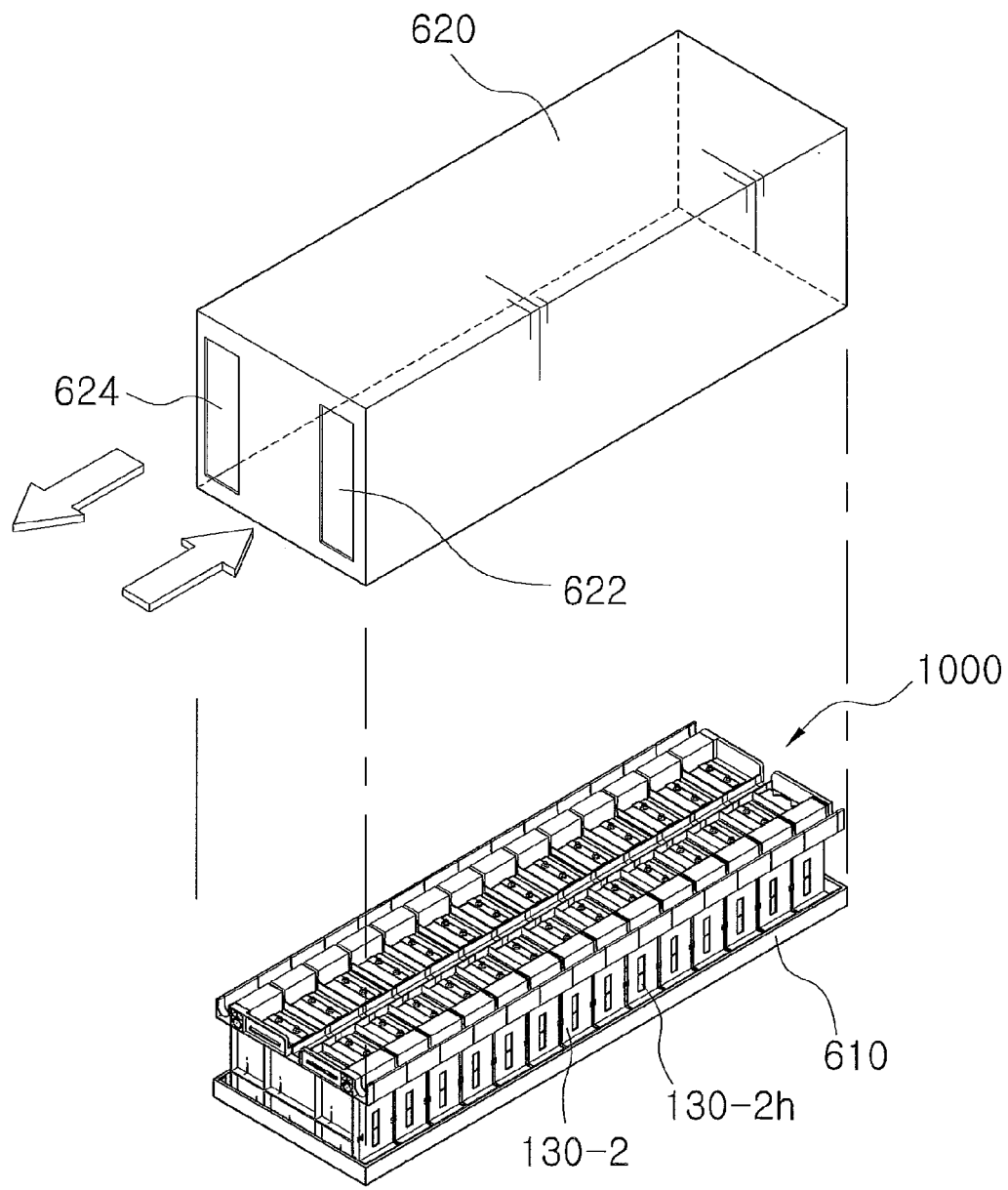
FIG. 23 is a perspective view of a state where an upper housing according to Exemplary Embodiment 3 is removed.

FIG. 23 is a perspective view of a state where an upper housing according to Exemplary Embodiment 3 is removed.

Referring to FIG. 23, Exemplary Embodiment 3 has a lithium secondary battery unit set 1000 according to Exemplary Embodiment 1 or Exemplary Embodiment 2. The lithium secondary battery unit set 1000 according to Exemplary Embodiment 1 or Exemplary Embodiment 2 is mounted in the lithium secondary battery housing (no reference numeral).

Referring to FIG. 23, the lithium secondary battery housing (no reference numeral) has a lower housing 610 and an upper housing 620. The upper housing 620 is provided with a housing air inlet 622 and a housing air outlet 624.

Referring to FIG. 23, the housing air inlet 622 is formed on an extension line of a front air passage (not shown) formed between the inner surface of the upper housing 620 and the front vertical plate 130-2 of each main frame (no reference numeral).

Referring to FIG. 23, the housing air outlet 624 is formed on an extension line of a back air passage (not shown) formed between the inner surface of the upper housing 620 and the back vertical plate (not shown) of each main frame (no reference numeral).

Referring to FIG. 23, the left of the housing air inlet 622 is mounted with a ventilating fan (not shown) for introducing cooling air. Therefore, the cooling air guided by the ventilating fan (not shown) is introduced into the lithium secondary battery housing (no reference numeral) through the housing air inlet 622 and is then discharged through the housing air outlet 624 through the front air passage (not shown) and the back air passage (not shown). In this case, a portion of the cooling air passing through the front air passage (not shown) is introduced into the air hole 130-2h of the front vertical plate 130-2 and discharged to the air hole (not shown) of the back vertical plate (not shown), thereby preventing the overheat of the first type lithium secondary battery and the second type lithium secondary battery received in each main frame.

Exemplary Embodiment 4

Exemplary Embodiment 4 is another exemplary embodiment of a lithium secondary battery unit set with a bus bar according to the present invention.

Figure 24:
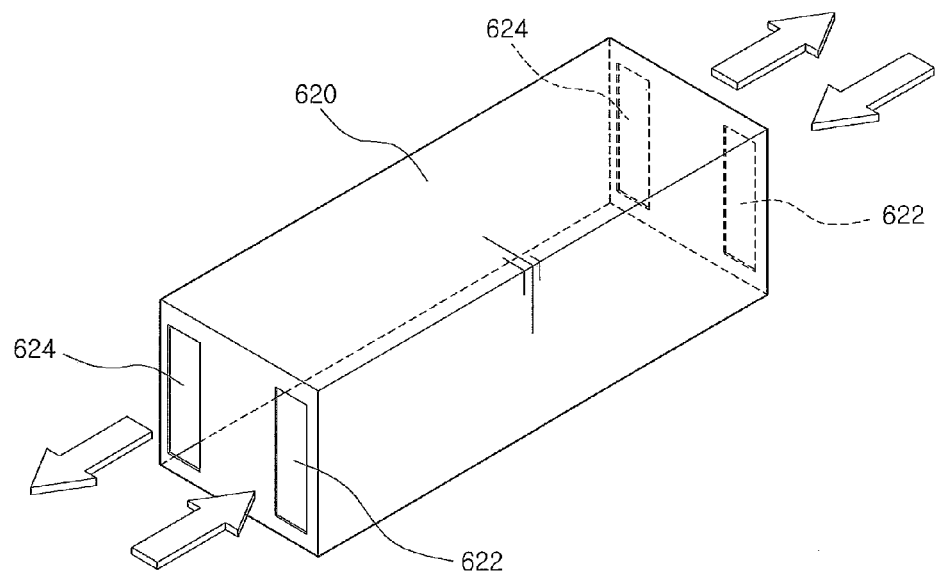
FIG. 24 is a perspective view of an upper housing of a lithium secondary battery housing according to Exemplary Embodiment 4.

FIG. 24 is a perspective view of the upper housing 620 of the lithium secondary battery housing according to Exemplary Embodiment 4. Exemplary Embodiment 4 is the same as Exemplary Embodiment 3 other than the number of housing air inlets 622 and housing air outlet 624 formed in the upper housing 620.

Referring to FIG. 24, the housing air inlet 622 is formed on the extension line of the front air passage (not shown) formed between the inner surface of the upper housing 620 and the front vertical plate 130-2 (see FIG. 23) of each main frame (no reference numeral), similar to Exemplary Embodiment 3. However, differently from Exemplary Embodiment 3, in Exemplary Embodiment 4, the housing air inlet 622 is formed on the left surface and the right surface of the upper housing 620 of the extension line of the front air passage (not shown), respectively. Although not shown in drawings, the outsides of the housing air inlet 622 are each mounted with the ventilation fans (not shown) for introducing cooling air, respectively.

Referring to FIG. 24, similar to Exemplary Embodiment 3, the housing air outlet 624 is formed on the extension line of the back air passage (not shown) formed between the inner surface of the upper housing 620 and the back vertical plate (not shown) of each main frame (no reference numeral). However, differently from Exemplary Embodiment 3, in Exemplary Embodiment 4, the housing air outlet 624 is formed on the left surface and the right surface of the upper housing 620 of the extension line of the back air passage (not shown), respectively.

Exemplary Embodiment 4 is the same as Exemplary Embodiment 3 other than the ventilation path and therefore, the following description will be omitted Exemplary Embodiment 5

Exemplary Embodiment 5 is another exemplary embodiment of a lithium secondary battery unit set with a bus bar according to the present invention.

Figure 25:
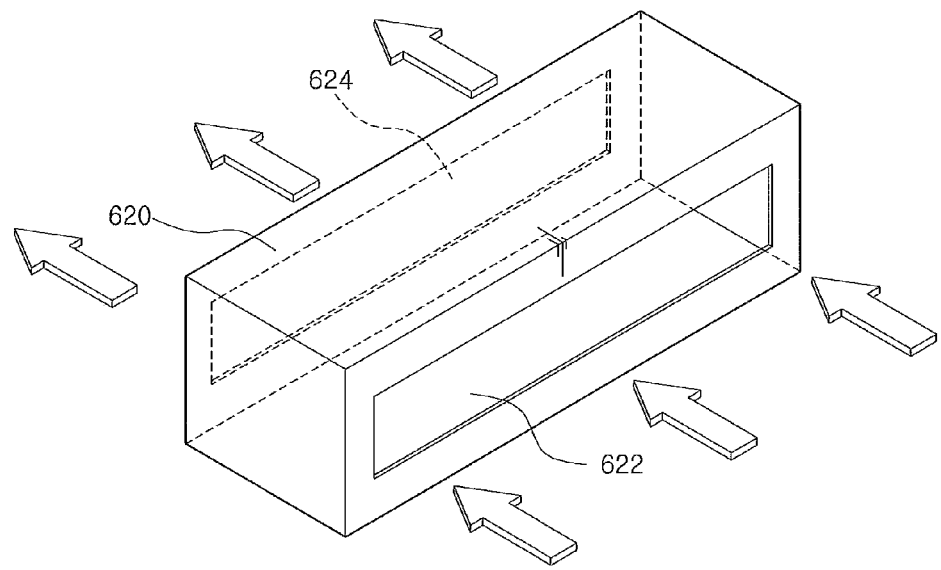
FIG. 25 is a perspective view of an upper housing of a lithium secondary battery housing according to Exemplary Embodiment 5.

FIG. 25 is a perspective view of the upper housing 620 of the lithium secondary battery housing according to Exemplary Embodiment 5. Exemplary Embodiment 5 is the same as Exemplary Embodiment 3 other than the number of housing air inlets 622 and the housing air outlet 624 formed in the upper housing 620.

Referring to FIG. 25, the housing air inlet 622 is formed on the front of the upper housing 620. In this case, referring to FIG. 23, the housing air inlet 622 is integrally formed in one hole from the front of the air hole 130-2h formed on the front vertical plate 130-2 of the left main frame (no reference numeral) among the main frames (no reference numeral) to the front of the air hole 130-2h formed on the front vertical plate 130-2 of the right main frame (no reference numeral). Although not shown in FIG. 25, the front of the housing air inlet 622 is mounted with the ventilation fan (not shown) for introducing cooling air.

Referring to FIG. 25, the housing air outlet 624 is formed on the back of the upper housing 620, which is formed in the same shape at a position opposite to the housing air inlet 622.

Exemplary Embodiment 5 is the same as Exemplary Embodiment 3 other than the ventilation path and therefore, the following description will be omitted.

Exemplary Embodiment 6

Exemplary Embodiment 6 relates to a lithium secondary battery unit set with a bus bar according to the present invention.

Figure 26:
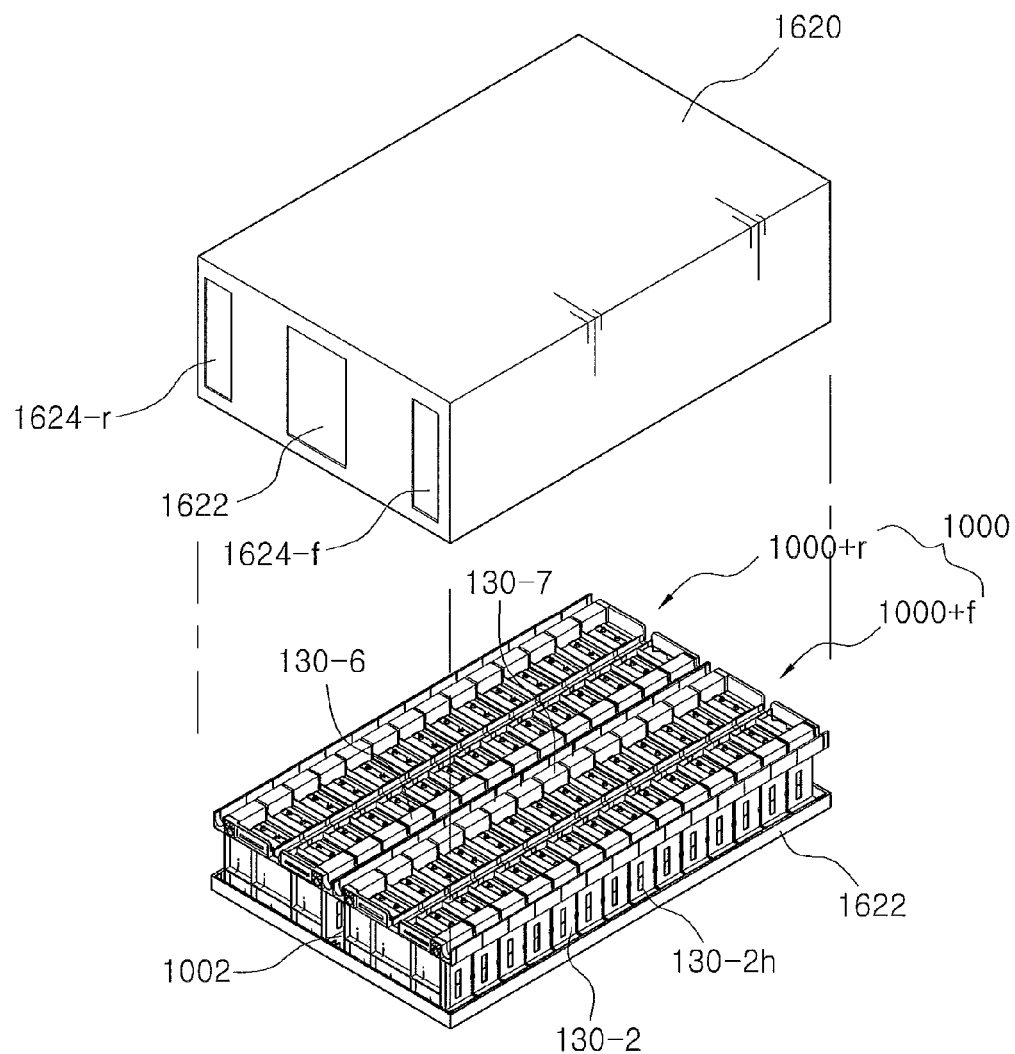
FIG. 26 is a perspective view of a state where an upper housing according to Exemplary Embodiment 6 is removed.

FIG. 26 is a perspective view of a state where an upper housing according to Exemplary Embodiment 6 is removed. Referring to FIG. 26, Exemplary Embodiment 6 has the lithium secondary battery unit set 1000 according to Exemplary Embodiment 1 or Exemplary Embodiment 2. The lithium secondary battery unit set 1000 according to Exemplary Embodiment 1 or Exemplary Embodiment 2 is mounted in the lithium secondary battery housing (no reference numeral). The lithium secondary battery unit set 1000 according to Exemplary Embodiment 1 or Exemplary Embodiment 2 is mounted in plural to be adjacent back and forth. Hereinafter, the case where two lithium secondary battery unit sets are mounted to be adjacent back and forth will be described.

Referring to FIG. 26, the two lithium secondary battery unit sets 1000 is mounted to form a central air passage 1002 between the back vertical plate (not shown) of a front lithium secondary unit set 1000+f and the front vertical plate (no reference numeral) of a back lithium secondary battery unit set 1000+r by contacting the back end of the back spacing protrusion 130-7 of the front lithium secondary battery unit set 1000+f to the front end of the front spacing protrusion 130-6 of the front lithium secondary battery unit set 1000+r.

Referring to FIG. 26, the lithium secondary battery housing (no reference numeral) has a lower housing 1610 and an upper housing 1620. The upper housing 1620 is provided with a housing air inlet 1622 and housing air outlets 1624-f and 1624-r.

Referring to FIG. 26, the housing air inlet 1622 is formed on the extension line of the central air passage 1002 that is formed between the back vertical plate (not shown) of the front lithium secondary battery unit set 1000+f and the front vertical plate (no reference numeral) of the back lithium secondary battery unit set 1000+r. Referring to FIG. 26, the housing air outlet 1624-f is formed on the extension line of the front air passage 1004-f (see FIG. 27) formed between the front vertical plates 130-2 of each main frame (no reference numeral) forming the inner surface of the upper housing 1620 and the front lithium secondary battery unit set 1000+f. The housing air outlet 1624-r is formed on the extension line of the back air passage 1004-r (see FIG. 27) that is formed between the inner surface of the upper housing 1620 and the back vertical plates (not shown) of each main frame (no reference numeral) configuring the back lithium secondary battery unit set 1000+r. Referring to FIG. 26, the left of the housing air inlet 1622 is mounted with a ventilation fan (not shown) for introducing cooling air. Therefore, the cooling air guided by the ventilating fan (not shown) is introduced into the lithium secondary battery housing (no reference numeral) through the housing air inlet 1622 and is then discharged through the housing air outlets 1624-f and 1624-r through the central air passage 1002, the front air passage 1004-f (see FIG. 25), and the back air passage 1004-r (see FIG. 25).

Figure 27:
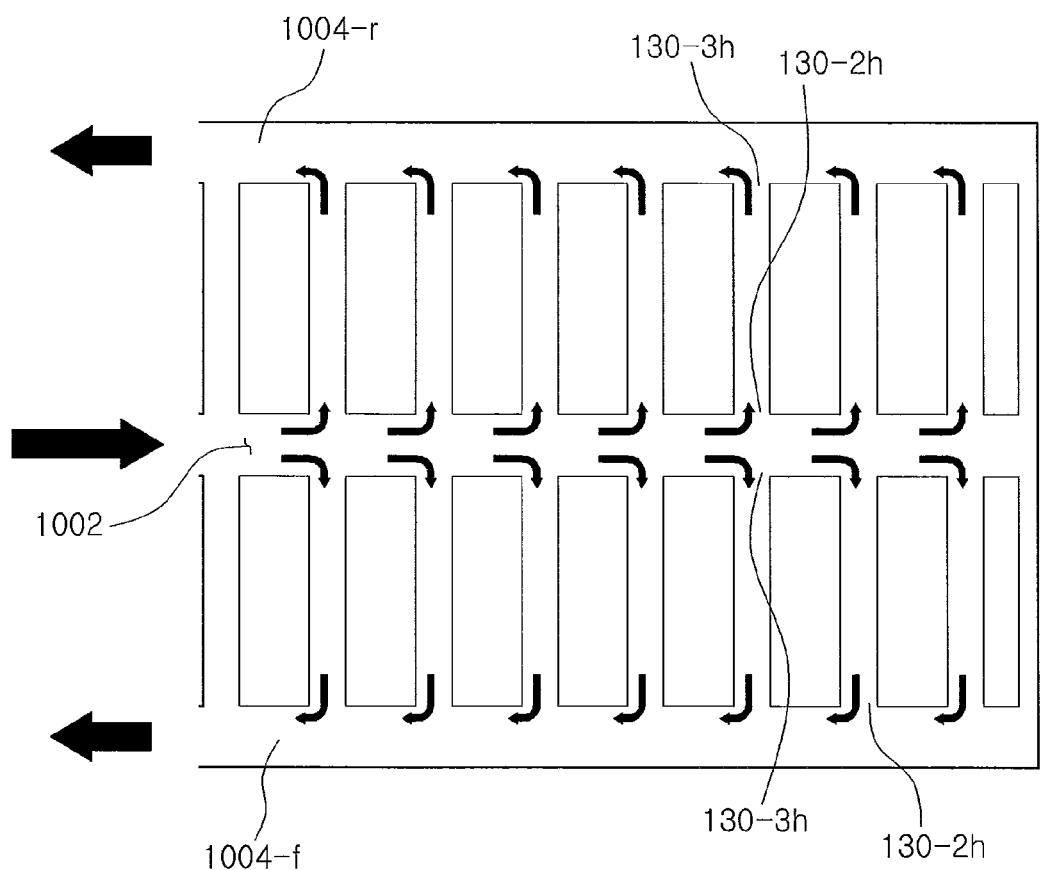
FIG. 27 is a diagram schematically showing a ventilation path according to Exemplary Embodiment 6.

FIG. 27 schematically shows a ventilation path according to Exemplary Embodiment 6. Referring to FIG. 27, a portion of the cooling air passing through the central air passage 1002 is introduced into the air hole 130-3h of the front lithium secondary battery unit set 1000+f and the air hole 130-2h of the back lithium secondary unit set 1000 and is discharged to the air hole 130-2h of the front lithium secondary battery unit set 1000+f and the air hole 130-3h of the back lithium secondary battery unit set 1000+r, respectively.

Exemplary Embodiment 7

Exemplary Embodiment 7 is another exemplary embodiment of a lithium secondary battery unit set with a bus bar according to the present invention.

FIG. 28A is a perspective view of an upper housing according to Exemplary Embodiment 7. Exemplary Embodiment is the same as Exemplary Embodiment 6 other than the housing air inlet 1622 and the housing air outlets 1624-f and 1624-r formed in the upper housing 1620. Referring to FIG. 26, Exemplary Embodiment 7 has the lithium secondary battery unit set 1000 according to Exemplary Embodiment 1 or Exemplary Embodiment 2, similar to Exemplary Embodiment 6. The lithium secondary battery unit set 1000 according to Exemplary Embodiment 1 or Exemplary Embodiment 2 is mounted in the lithium secondary battery housing (no reference numeral), similar to Exemplary Embodiment 6. The lithium secondary battery unit set 1000 according to Exemplary Embodiment 1 or Exemplary Embodiment 2 is mounted in plural to be adjacent back and forth, similar to Exemplary Embodiment 6. Hereinafter, the case where two lithium secondary battery unit sets are mounted to be adjacent back and forth will be described. Referring to FIG. 28A, the upper housing 1620 is provided with a housing air inlet 1622 and housing air outlets 1624-f and 1624-r.

Referring to FIG. 26, the housing air inlet 1622 is formed on the extension line of the central air passage 1002 that is formed between the back vertical plate (not shown) of the front lithium secondary battery unit set 1000+f and the front vertical plate (no reference numeral) of the back lithium secondary battery unit set 1000+r, similar to Exemplary Embodiment 6.

However, differently from Exemplary Embodiment 6, in Exemplary Embodiment 7, the housing air inlet 1622 is formed on the left surface and the right surface of the upper housing 1620 of the extension line of the central air passage 1002, respectively. Although not shown in drawings, the outsides of the housing air inlet 1622 are each mounted with the ventilation fans (not shown) for introducing cooling air, respectively.

Referring to FIG. 26, similar to Exemplary Embodiment 6, the housing air outlet 1624-f is formed on the extension line of the front air passage 1004-f (see FIG. 28B) that is formed between the inner surface of the upper housing 1620 and the front vertical plate 130-2 of each main frame (no reference numeral) configuring the front lithium secondary battery unit set 1000+f.

However, differently from Exemplary Embodiment 6, in Exemplary Embodiment 7, the housing air outlet 1624-f is formed on the left surface and the right surface of the upper housing 1620 of the extension line of the front air passage 1004-f (see FIG. 27), respectively.

Referring to FIG. 26, similar to Exemplary Embodiment 6, the housing air outlet 1624-r is formed on the extension line of the back air passage 1004-r (see FIG. 28B) that is formed between the inner surface of the upper housing 1620 and the back vertical plate 130-2 of each main frame (no reference numeral) configuring the back lithium secondary battery unit set 1000+r.

Figure 28:
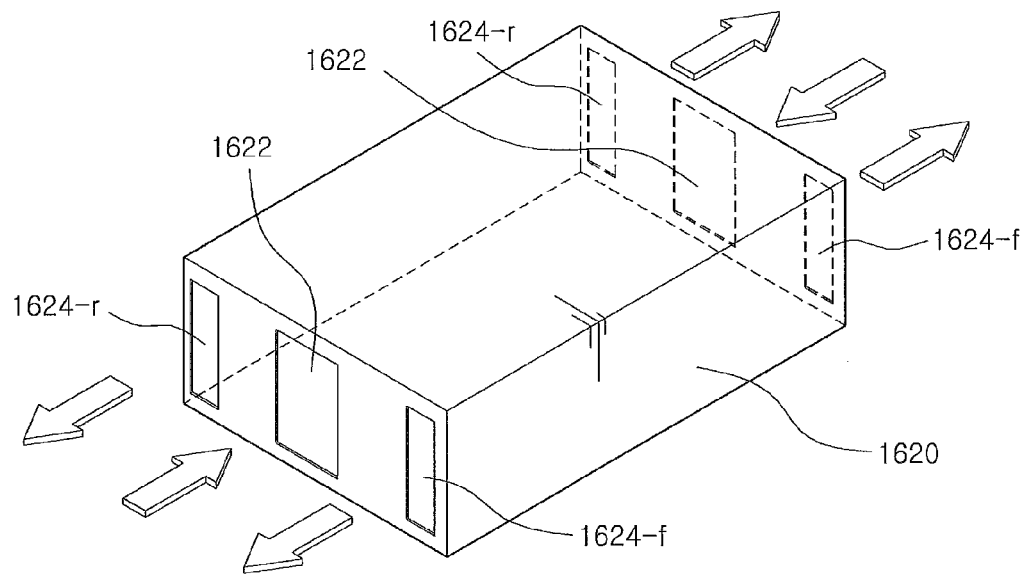
FIG. 28A is a perspective view of an upper housing according to Exemplary Embodiment 7.
FIG. 28B is a diagram schematically showing a ventilation path according to Exemplary Embodiment 7.
Figure 28:
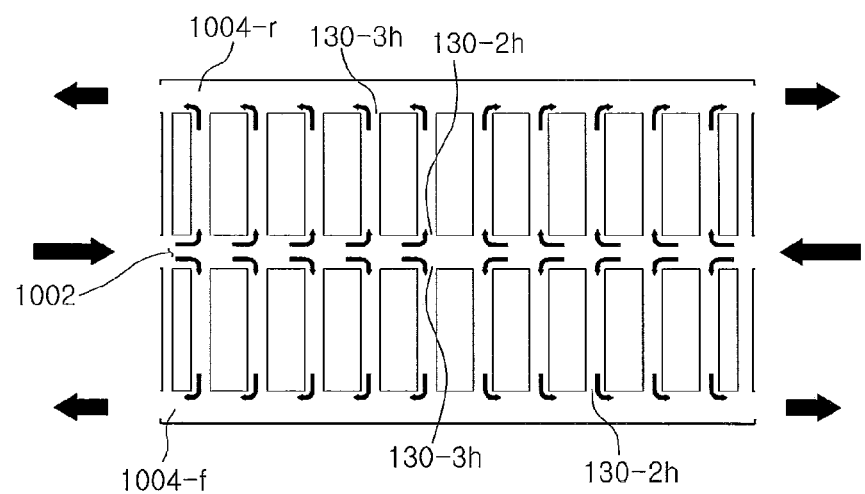

However, differently from Exemplary Embodiment 6, in Exemplary Embodiment 7, the housing air outlet 1624-r is formed on the left surface and the right surface of the upper housing 1620 of the extension line of the back air passage 1004-r (see FIG. 28), respectively. FIG. 28B schematically shows a ventilation path according to Exemplary Embodiment 7.

Exemplary Embodiment 8

Exemplary Embodiment 8 is another exemplary embodiment of a lithium secondary battery unit set with a bus bar according to the present invention.

Figure 29:
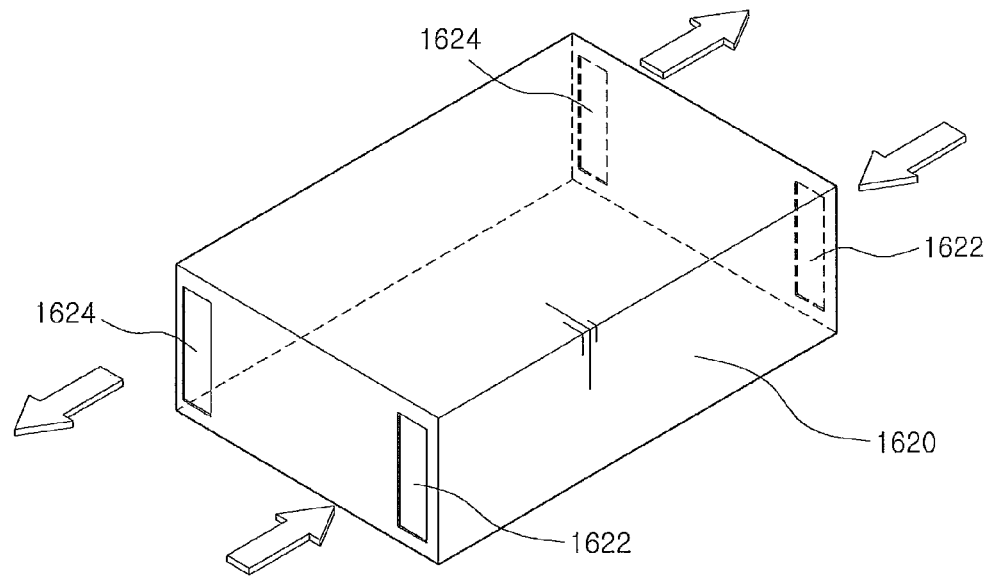
FIG. 29A is a perspective view of an upper housing according to Exemplary Embodiment 8.
FIG. 29B is a diagram schematically showing the ventilation path according to Exemplary Embodiment 8.
Figure 29:
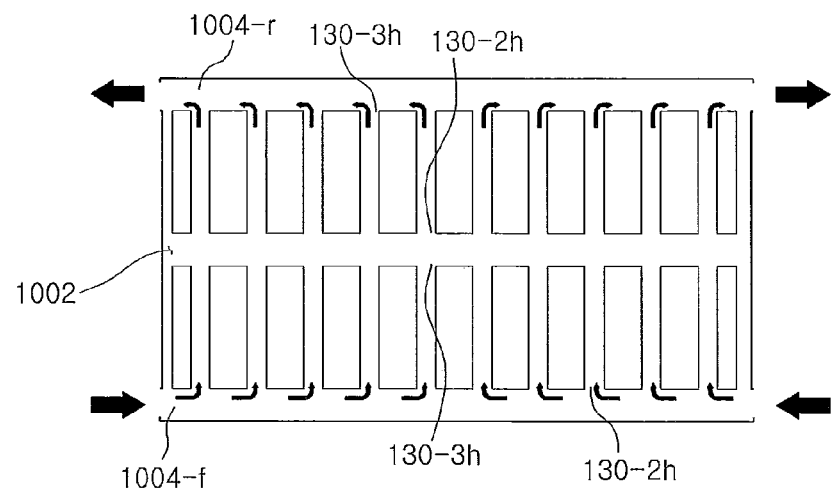

FIG. 29A is a perspective view of an upper housing according to Exemplary Embodiment 8. Exemplary Embodiment is the same as Exemplary Embodiment 6 other than the housing air inlet 1622 and the housing air outlet 1624 formed in the upper housing 1620.

Referring to FIG. 26, Exemplary Embodiment 8 has the lithium secondary battery unit set 1000 according to Exemplary Embodiment 1 or Exemplary Embodiment 2, similar to Exemplary Embodiment 6, The lithium secondary battery unit set 1000 according to Exemplary Embodiment 1 or Exemplary Embodiment 2 is mounted in the lithium secondary battery housing (no reference numeral), similar to Exemplary Embodiment 6. The lithium secondary battery unit set 1000 according to Exemplary Embodiment 1 or Exemplary Embodiment 2 is mounted in plural to be adjacent back and forth, similar to Exemplary Embodiment 6. Hereinafter, the case where two lithium secondary battery unit sets are mounted to be adjacent back and forth will be described. Referring to FIG. 29A, the upper housing 1620 is provided with the housing air inlet 1622 and the housing air outlet 1624.

Referring to FIG. 26, the housing air inlet 1622 is formed on the extension line of the front air passage 1004-$f$ (see FIG. 29B) that is formed between the inner surface of the upper housing 1620 and the front vertical plate 130-2 of each main frame (no reference numeral) configuring the front lithium secondary battery unit set 1000+f. The housing air inlet 1622 is formed on the left surface and the right surface of the upper housing 1620 of the extension line of the front air passage 1004-$f$ (see FIG. 29B), respectively. Although not shown in drawings, the outsides of the housing air inlet 1622 are each mounted with the ventilation fans (not shown) for introducing cooling air, respectively.

Referring to FIG. 26, the housing air outlet 1624 is formed on the extension line of the back air passage 1004-$r$ (see FIG. 29B) that is formed between the inner surface of the upper housing 1620 and the back vertical plate 130-2 of each main frame (no reference numeral) configuring the back lithium secondary battery unit set 1000+r. The housing air outlet 1624 is formed on the left surface and the right surface of the upper housing 1620 of the extension line of the back air passage 1004-$r$ (see FIG. 29B), respectively.

FIG. 29B schematically shows a ventilation path according to Exemplary Embodiment 8.

Exemplary Embodiment 9

Exemplary Embodiment 9 is another exemplary embodiment of a lithium secondary battery unit set with a bus bar according to the present invention.

Figure 30:
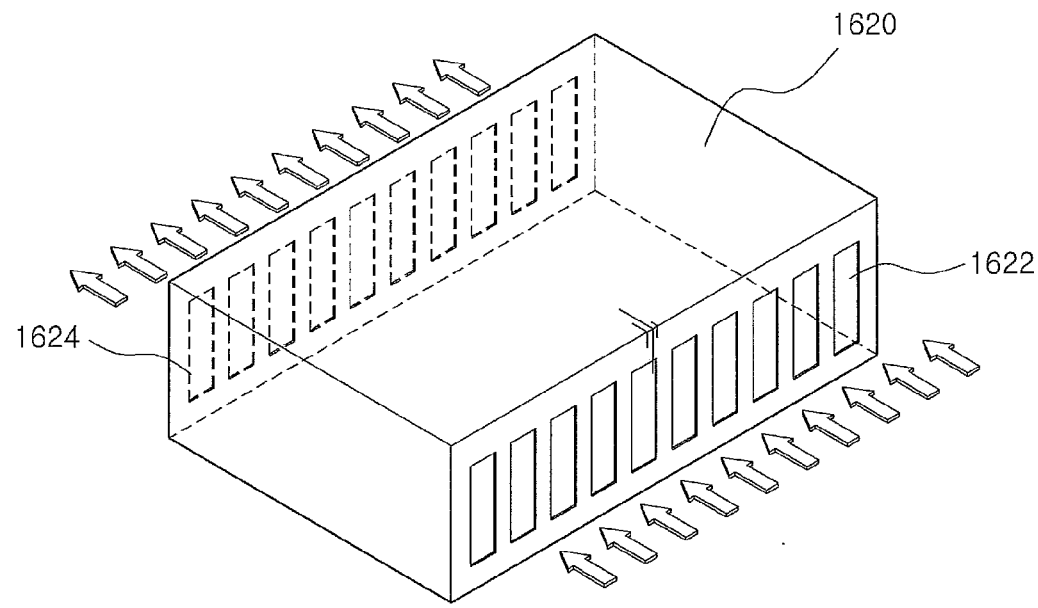
FIG. 30A is a perspective view of an upper housing according to Exemplary Embodiment 9.
FIG. 30B is a diagram schematically showing the ventilation path according to Exemplary Embodiment 9.
Figure 30:
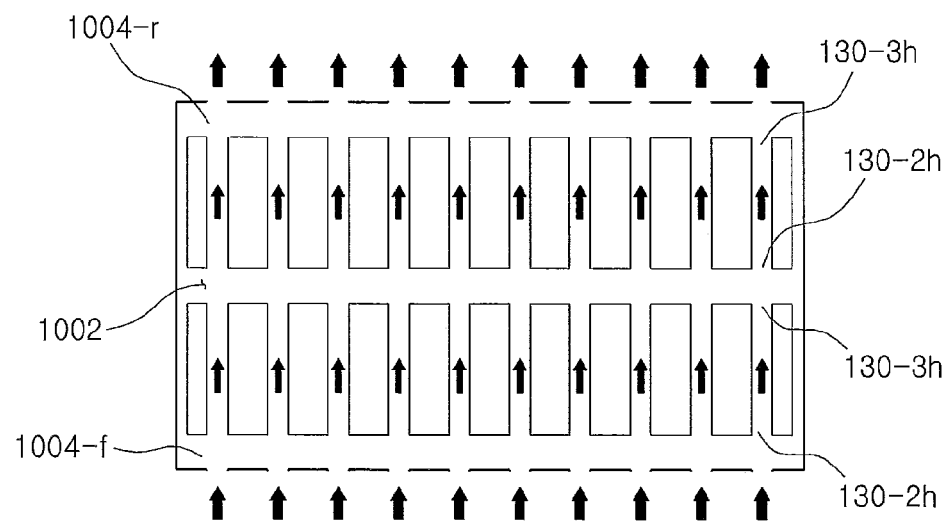

FIG. 30A is a perspective view of an upper housing according to Exemplary Embodiment 9. Exemplary Embodiment is the same as Exemplary Embodiment 6 other than the number of housing air inlets 1622 and the housing air outlet 1624 formed in the upper housing 1620.

Referring to FIG. 26, Exemplary Embodiment 9 has the lithium secondary battery unit set 1000 according to Exemplary Embodiment 1 or Exemplary Embodiment 2, similar to Exemplary Embodiment 6. The lithium secondary battery unit set 1000 according to Exemplary Embodiment 1 or Exemplary Embodiment 2 is mounted in the lithium secondary battery housing (no reference numeral), similar to Exemplary Embodiment 6. The lithium secondary battery unit set 1000 according to Exemplary Embodiment 1 or Exemplary Embodiment 2 is mounted in plural to be adjacent back and forth, similar to Exemplary Embodiment 6. Hereinafter, the case where two lithium secondary battery unit sets are mounted to be adjacent back and forth will be described.

Referring to FIG. 30A, the upper housing 1620 is provided with the housing air inlet 1622 and the housing air outlet 1624.

Referring to FIG. 30A, the plurality of housing air inlets 1622 are formed on the front of the upper housing 1620. Each housing air inlet 1622 is formed in front of the air hole 130-2$h$ (see FIG. 30B) formed on each front vertical plate of the lithium secondary battery unit set disposed at most front side among the lithium secondary battery unit sets.

Although not shown, the front of the housing air inlet 1622 is mounted with the ventilation fan (not shown) for introducing cooling air.

Referring to FIG. 30A, the housing air outlet 1624 is formed at the position opposite to the housing air inlet 1622, corresponding to the number of the housing air inlet 1622.

FIG. 30B schematically shows a ventilation path according to Exemplary Embodiment 9.

Meanwhile, similar to one shown in FIG. 25, the housing air inlet 1622 of Exemplary Embodiment 9, may be integrally formed in one hole from the front of the air hole (no reference numeral, see FIG. 26) formed on the front vertical plate (no reference numeral, see FIG. 26) of the left main frame (no reference numeral) among the front lithium secondary battery unit sets 1000+f to the front of the air hole (no reference numeral, see FIG. 26) formed on the front vertical plate (no reference numeral, see FIG. 26) of the right main frame (no reference numeral, see FIG. 26. In this case, the housing air outlet 1624 is formed in the same shape at a position opposite to the housing air inlet 1622.

The invention claimed is:

1. A lithium secondary battery unit set with a bus bar, comprising:
   a left end frame and a right end frame;
   a plurality of main frames having a first exposed tab support part formed at the top end thereof, the lower left of the first tab support part being formed with left receiving parts that are opened left and the lower right of the first tab support part being formed with right receiving parts that are opened right, and adjacently formed between the left end frame and the right end frame;
   a center frame having a second exposed tab support part formed at the top end thereof and having a left main frame fastened to the left thereof and a right main frame fastened to the right thereof to be mounted between the right receiving part of the left main frame and the left receiving part of the right main frame in two adjacent main frames among the plurality of main frames;
   a first type lithium secondary battery having a left electrode tab bent to the left of circumferential surface of a pouch and a right electrode tab bent to the right thereof, the first type lithium secondary battery is formed to be protruded and received in each left receiving part of a left group receiving part disposed to be adjacent to the left of a specific group receiving part including two receiving parts adjacent to each other among the plurality of left receiving parts and the plurality of right receiving parts and each left receiving part of a right group receiving part disposed to be adjacent to the right of the specific group receiving part;
   a second type lithium secondary battery having a left electrode tab having opposite polarity and formed to be protruded in a direction opposite to a right electrode tab of the first type lithium secondary battery and a right electrode tab having opposite polarity and formed to be protruded in a direction opposite to a left electrode tab of the first type lithium secondary battery and the second type lithium secondary battery being received in each right receiving part of the left group receiving part and each right receiving part of the right group receiving part;
   a first fastening member seated on the first tab support part to fixedly connect the right electrode tab of the first type lithium secondary battery and the left electrode tab of the second type lithium secondary battery in order to be conducted in series;
   a second fastening member seated on the second tab support part to fixedly connect the right electrode tab of the second type lithium secondary battery and the left electrode tab of the first type lithium secondary battery in order to be conducted in series;

a left bus bar connected to the right electrode tab of the lithium secondary battery received in the right receiving part of the left group receiving part to be conducted to each other by a left bus bar fastening member seated on the tab support part disposed between the left group receiving part and the specific group receiving part;

a right bus bar connected to the left electrode tab of the lithium secondary battery received in the left receiving part of the right group receiving part to be conducted to each other by a right bus bar fastening member seated on the tab support part disposed between the specific group receiving part and the right group receiving part; and an overcurrent circuit breaker connected to the left bus bar and the right bus bar in order to be conducted in series.

2. The lithium secondary battery unit set with a bus bar of claim 1, wherein the first fastening member includes a first lower fixing plate of which a bolt is formed to be protruded upwardly, a first upper fixing plate through which the bolt of the first lower fixing plate penetrates, and a first fastener fastened to the bolt end of the first lower fixing plate penetrating through the first upper fixing plate, the second fastening member includes a second lower fixing plate of which a bolt is formed to be protruded upwardly, a second upper fixing plate through which the bolt of the second lower fixing plate penetrates, and the second fastener fastened to the bolt end of the second lower fixing plate penetrating through the second upper fixing plate, the left bus bar fastening member includes a left bus bar fixing plate of which the bolt is formed to be protruded upwardly and a left bus bar fastener fastened to the bolt end of the left bus bar fixing plate penetrating through the left bus bar fixing plate, the left bus bar includes a left bus bar fastening plate seated on the left bus bar fixing plate to have the bolt of the left bus bar fixing plate penetrate therethrough, the right bus bar fastening member includes a right bus bar fixing plate of which the bolt is formed to be protruded upwardly and a right bus bar fastener fastened to the bolt end of the right bus bar fixing plate penetrating through the right bus bar fixing plate, and the right bus bar includes a right bus bar fastening plate seated on the right bus bar fixing plate to have the bolt of the right bus bar fixing plate penetrate therethrough.

3. The lithium secondary battery unit set with a bus bar of claim 2, wherein a dummy electrode tab having the same material as the left electrode tab of the first type lithium secondary battery is fixed between the left bus bar fixing plate and the left bus bar fastening plate and a dummy electrode tab having the same material as the right electrode tab of the second type lithium secondary battery is fixed between the right bus bar fixing plate and the right bus bar fastening plate.

4. The lithium secondary battery unit set with a bus bar of claim 3, wherein the left end frame has a third exposed tab support part formed at the top end thereof and is fastened to the left of the left main frame among the plurality of main frames, the right end frame has a fourth exposed tab support part formed at the top end thereof and is fastened to the right of the right main frame among the plurality of main frames, the third tab support part is seated with a third fastening member including a third lower fixing plate of which the bolt is formed to be protruded upwardly, a third upper fixing plate through which the bolt of the third lower fixing plate penetrates, and a third fastener fastened to the bolt end of the third lower fixing plate penetrating through the third upper fixing plate, the fourth tab support part is seated with a fourth fastening member including a fourth lower fixing plate of which the bolt is formed to be protruded upwardly, a fourth upper fixing plate through which the bolt of the fourth lower fixing plate penetrates, and a fourth fastener fastened to the bolt end of the fourth lower fixing plate penetrating through the fourth upper fixing plate, the third fastening member fixes the left electrode tab of the first type lithium secondary battery received in the left main frame among the plurality of main frames between the third lower fixing plate and the third upper fixing plate, and the fourth fastening member fixes the left electrode tab of the second type lithium secondary battery received in the right main frame among the plurality of main frames between the fourth lower fixing plate and the fourth upper fixing plate.

5. The lithium secondary battery unit set with a bus bar of claim 4, wherein a dummy electrode tab having the same material as the right electrode tab of the second type lithium secondary battery is fixed between the third lower fixing plate and the third upper fixing plate and a dummy electrode tab having the same material as the left electrode tab of the first type lithium secondary battery is fixed between the fourth lower fixing plate and the fourth upper fixing plate.

6. The lithium secondary battery unit set with a bus bar of claim 5, wherein each left receiving part of the left group receiving part and each left receiving part of the right group receiving part receive the left electrode tab and the right electrode tab, respectively, to be vertically stacked in order to conduct the n first type lithium secondary batteries to each other in parallel and each right receiving part of the left group receiving part and each right receiving part of the right group receiving part receive the left electrode tab and the right electrode tab, respectively, to be vertically stacked in order to conduct the n second type lithium secondary batteries to each other in parallel, where n is an natural number of 2 or more.

7. The lithium secondary battery unit set with a bus bar of claim 2, wherein the left bus bar includes a linear type left bus bar extension bent from the left bus bar fastening plate and coated with an insulator, the right bus bar includes a linear type extension bent from the right bus bar fastening plate and coated with an insulator, the top ends of each main frame are provided with "U"-letter first bus bar guide pipes guiding the left bus bar extension and the right bus bar extension on a horizontal extension line of the first tab support part, and the top ends of each center frame are provided with "U"-letter second bus bar guide pipes guiding the left bus bar extension and the right bus bar extension on a horizontal extension line of the second tab support part.

8. The lithium secondary battery unit set with a bus bar of claim 7, wherein any one of the one end of the left bus bar extension and the right bus bar extension are bent vertically so that the left bus bar extension and the right bus bar extension are vertically stacked one on another.

9. The lithium secondary battery unit set with a bus bar of claim 8, wherein the other end of the left bus bar extension is provided with a left bus bar fastening tab bent forwardly and backwardly to be fixed to the left end frame or the right end frame and connected to the overcurrent circuit breaker, the other end of the right bus bar extension is provided with a right bus bar fastening tab bent in an opposite direction to a direction in which the left bus bar fastening tab is bent to be fixed to the end frame to which the left bus bar fastening tab is fixed among the left end frame and the right end frame and connected to the overcurrent circuit breaker.

10. The lithium secondary battery unit set with a bus bar of claim 1, wherein the left receiving part and the right receiving part forming the specific group receiving part receives a thermal pad that is a heat transfer path between the lithium secondary battery received in the right receiving part of the left group receiving part and the lithium secondary battery received in the left receiving part of the right group receiving part.

11. The lithium secondary battery unit set with a bus bar of claim 10, wherein each main frame includes linear type base plates, a front vertical plate mounted upwardly from the front side end of the base plate and having an air hole formed at the central portion thereof, a back vertical plate mounted upwardly from the back side end of the base plate and having an air hole formed at the central portion thereof, a front spacing protrusion disposed on the top portion of the front vertical plate and protruded forwardly, a back spacing protrusion disposed on the top portion of the back vertical plate and protruded backwardly, the front spacing protrusion and the back spacing protrusion each being formed to have seating grooves, in which a linear type pipe is seated in left and right directions, drawn therein from above.

12. The lithium secondary battery unit set with a bus bar of claim 11, wherein the specific group receiving part is the left receiving part and the right receiving part that are formed in any one specific main frame disposed between the left main frame and the right main frame among the plurality of main frames.

13. The lithium secondary battery unit set with a bus bar of claim 12, wherein the front vertical plate and the back vertical plate are provided left grooves and right grooves drawn in from the left end and right end, respectively, the center frame is provided with a temperature sensor front insertion groove communicating with a through hole that penetrates through the left surface and the right surface while being drawn in the inner side from the front outer surface and is provided with the right groove of the front vertical plate of the left main frame and the left groove of the front vertical plate of the right main frame among the adjacent main frames, and a temperature sensor back insertion groove communicating with a through hole that penetrates through the left surface and the right surface while being drawn in the inner side from the back outer surface and is provided with the right groove of the back vertical plate of the left main frame and the left groove of the back vertical plate of the right main frame among the adjacent main frames.

14. The lithium secondary battery unit set with a bus bar of claim 13, wherein the front spacing protrusion includes a small width part formed at the back end and a large width part formed at the front end while being protruded left and right connecting with the small width part, the back spacing protrusion includes a small width part formed at the front end and a large width part formed at the back end while being protruded left and right connecting with the small width part, a portion of the seating groove of the front spacing protrusion is formed at the small width part of the front spacing protrusion and the remaining thereof is formed at the large width part and a portion of the seating groove of the back spacing protrusion is formed at the small width part of the back spacing protrusion and the remaining thereof is formed at the large width part, a temperature measurement line guided through a clearance formed by the small width part of the front spacing protrusion of the left main frame and the small width part of the front spacing protrusion of the right main frame among the two adjacent main frames, among temperature measurement lines connected to a temperature measurement device, is connected to a temperature sensor inserted into the temperature sensor front insertion groove, and the temperature measurement line guided through a clearance formed by the small width part of the back spacing protrusion of the left main frame and the small width part of the back spacing protrusion of the right main frame among the two adjacent main frames, among the temperature measurement lines connected to the temperature measurement device is connected to the temperature sensor inserted into the temperature sensor back insertion groove.

15. The lithium secondary battery unit set with a bus bar of claim 12, wherein the front spacing protrusion includes a small width part formed at the back end and a large width part formed at the front end while being protruded left and right connecting with the small width part, the back spacing protrusion includes a small width part formed at the front end and a large width part formed at the back end while being protruded left and right connecting with the small width part, a portion of the seating groove of the front spacing protrusion is formed at the small width part of the front spacing protrusion and the remaining thereof is formed at the large width part, a portion of the seating groove of the back spacing protrusion is formed at the small width part of the back spacing protrusion and the remaining thereof is formed at the large width part, the voltage measurement line guided through the clearance formed by the small width part of the front spacing protrusion of the left main frame and the small width part of the front spacing protrusion of the right main frame among the main frames mounted to be adjacent to each other, among the left group main frame formed with the left group receiving part and the right group main frame formed with the right group receiving part, is connected to the second fastening member seated in the center frame disposed between the left main frame and the right main frame to be conducted to each other, the voltage measurement line guided through the clearance formed by the small width part of the front spacing protrusion of the right main frame and the small width part of the front spacing protrusion of the specific main frame among the right group main frames is connected to the left bus bar fastening member to be conducted to each other, the voltage measurement line guided through the clearance formed by the small width part of the front spacing protrusion of the left main frame and the small width part of the front spacing protrusion of the specific main frame among the right group main frames is connected to the right bus bar fastening member to be conducted to each other, and the voltage measurement line guided through the clearance formed by the small width part of the back spacing protrusion of the left main frame and the small width part of the back spacing protrusion of the right main frame among the main frames mounted to be adjacent to each other among the left group main frames and the right group main frames is connected to the first fastening member seated in the left main frame to be conducted to each other.

16. The lithium secondary battery unit set with a bus bar of claim 11, further comprising a lithium secondary battery housing provided with a housing air inlet and a housing air outlet and enclosing the lithium secondary battery set, wherein the housing air inlet is formed on any one of the extension line to the front air passage formed between the housing inner surface and the front vertical plate or the extension line to the back air passage formed between the housing inner surface and the back vertical plate and the housing air outlet on the remaining one of the extension line of the front air passage formed between the housing inner surface and the front vertical plate or the extension line to the back air passage formed between the housing inner surface and the back vertical plate.

17. The lithium secondary battery unit set with a bus bar of claim 11, further comprising a lithium secondary battery housing provided with a housing air inlet and a housing air outlet and enclosing the lithium secondary battery set, wherein the housing air inlet is formed on any one of the front surface and the back surface of the housing and the housing air outlet is formed on the remaining surface of the front surface and the back surface of the housing.

18. A lithium secondary battery unit set with a bus bar, comprising:
- a plurality of lithium secondary battery unit sets claimed in claim 11 mounted front and back to be adjacent to each other; and
- a lithium secondary battery housing provided with a housing air inlet and a housing air outlet and enclosing the plurality of lithium secondary battery unit set,
- wherein the two lithium secondary battery unit sets adjacent to each other among the plurality of lithium secondary battery unit sets are mounted so that the back end of the back spacing protrusion of the front lithium secondary battery unit set contacts the front end of the front spacing protrusion of the back lithium secondary battery unit set, the housing air inlet and the housing air outlet are each formed at least any one of the extension line of the front air passage formed between the housing inner surface and the front vertical plate of the lithium secondary battery unit set disposed at the most front side among the plurality of lithium secondary battery unit sets, the extension line of the back air passage formed between the housing inner surface and the back vertical plate of the lithium secondary battery unit set disposed at the most back side among the lithium secondary battery unit sets, and an extension line of an intermediate air passage formed between the back vertical plate and the front vertical plate of the two adjacent lithium secondary battery unit sets.

19. A lithium secondary battery set with a bus bar, comprising:
- a plurality of lithium secondary battery unit sets claimed in claim 11 mounted front and back to be adjacent to each other; and
- a lithium secondary battery housing provided with a housing air inlet and a housing air outlet and enclosing the plurality of lithium secondary battery unit set,
- wherein the two lithium secondary battery unit sets adjacent to each other among the plurality of lithium secondary battery unit sets are mounted so that the back end of the back spacing protrusion of the front lithium secondary battery unit set contacts the front end of the front spacing protrusion of the back lithium secondary battery unit set, wherein the housing air inlet is formed on any one of the front surface and the back surface of the housing and the housing air outlet is formed on the remaining one of the front surface and the back surface of the housing.

20. The lithium secondary battery set with a bus bar of claim 19, wherein the housing air inlet is mounted in plural, the housing air inlets are each formed in front of the air passage formed with each front vertical plate of the lithium secondary battery set disposed at the most front side among the lithium secondary battery unit sets, the housing air outlet is mounted in plural, and the housing air outlets are each formed at the back of the air passage formed with each back vertical plate of the lithium secondary battery unit set disposed at the most back side among the lithium secondary battery unit sets.

* * * * *